(12) United States Patent
Park et al.

(10) Patent No.: US 11,924,529 B2
(45) Date of Patent: Mar. 5, 2024

(54) CAMERA ACTUATOR, AND CAMERA MODULE AND CAMERA DEVICE COMPRISING SAME

(71) Applicant: LG INNOTEK CO., LTD., Seoul (KR)

(72) Inventors: Sang Ok Park, Seoul (KR); Sung Guk Lee, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 225 days.

(21) Appl. No.: 17/629,315

(22) PCT Filed: Jul. 15, 2020

(86) PCT No.: PCT/KR2020/009298
§ 371 (c)(1),
(2) Date: Jan. 21, 2022

(87) PCT Pub. No.: WO2021/015482
PCT Pub. Date: Jan. 28, 2021

(65) Prior Publication Data
US 2022/0263981 A1    Aug. 18, 2022

(30) Foreign Application Priority Data

Jul. 23, 2019 (KR) .................. 10-2019-0089226
Aug. 7, 2019 (KR) .................. 10-2019-0096281

(51) Int. Cl.
| | | |
|---|---|---|
| H04N 23/51 | (2023.01) | |
| G02B 7/18 | (2021.01) | |
| H04N 23/57 | (2023.01) | |
| H04N 23/68 | (2023.01) | |

(52) U.S. Cl.
CPC .......... *H04N 23/51* (2023.01); *G02B 7/1805* (2013.01); *H04N 23/57* (2023.01); *H04N 23/687* (2023.01)

(58) Field of Classification Search
CPC ...... H04N 23/51; H04N 23/57; H04N 23/687; H04N 23/55; H04N 23/52; H04N 23/50; G02B 7/1805; G02B 27/646; G03B 5/02
See application file for complete search history.

(56) References Cited

U.S. PATENT DOCUMENTS

| | | | |
|---|---|---|---|
| 9,596,394 | B2 | 3/2017 | Chung et al. |
| 10,133,152 | B2 | 11/2018 | Kang et al. |
| 10,394,046 | B2 | 8/2019 | Jeong et al. |
| 10,534,194 | B2 | 1/2020 | Lee et al. |

(Continued)

FOREIGN PATENT DOCUMENTS

| | | |
|---|---|---|
| CN | 101995742 A | 3/2011 |
| CN | 106461909 A | 2/2017 |

(Continued)

*Primary Examiner* — Padma Haliyur
(74) *Attorney, Agent, or Firm* — Birch, Stewart, Kolasch & Birch, LLP

(57) ABSTRACT

A camera actuator according to an embodiment can comprise: a housing; a prism unit disposed inside the housing; a driving part for tilting the prism unit; and a rotation unit for tilting the prism unit about a first axis or a second axis. The rotation unit can comprise: a rotation housing; a rotation guide disposed inside the rotation housing; and a guide pin member coupled to the rotation guide.

20 Claims, 31 Drawing Sheets

(56) References Cited

U.S. PATENT DOCUMENTS

| | | | |
|---|---|---|---|
| 10,678,062 B2 | 6/2020 | Im et al. | |
| 10,866,430 B2 | 12/2020 | Kim et al. | |
| 2010/0321751 A1* | 12/2010 | Yamada | G02B 26/101 |
| | | | 359/200.7 |
| 2011/0267692 A1* | 11/2011 | Watanabe | H04N 23/68 |
| | | | 359/557 |
| 2016/0212312 A1 | 7/2016 | Chung et al. | |
| 2018/0024329 A1* | 1/2018 | Goldenberg | H04N 23/45 |
| | | | 359/557 |
| 2020/0174270 A1* | 6/2020 | Enta | G02B 7/08 |
| 2021/0223567 A1* | 7/2021 | Li | G03B 30/00 |
| 2021/0247674 A1* | 8/2021 | Shimizu | G03B 21/147 |
| 2021/0286193 A1* | 9/2021 | Kwon | G02B 13/02 |
| 2022/0269146 A1* | 8/2022 | Lee | G02B 27/646 |

FOREIGN PATENT DOCUMENTS

| | | |
|---|---|---|
| FR | 740.172 A | 1/1933 |
| JP | 2007-171829 A | 7/2007 |
| JP | 2015-092285 A | 5/2015 |
| KR | 10-2017-0105236 A | 9/2017 |
| KR | 10-2018-0085460 A | 7/2018 |
| KR | 10-2018-0092251 A | 8/2018 |
| KR | 10-2018-0097228 A | 8/2018 |
| KR | 10-1892857 B1 | 8/2018 |
| KR | 10-1942743 B1 | 1/2019 |
| KR | 10-1973434 B1 | 4/2019 |

* cited by examiner

[FIG. 1]
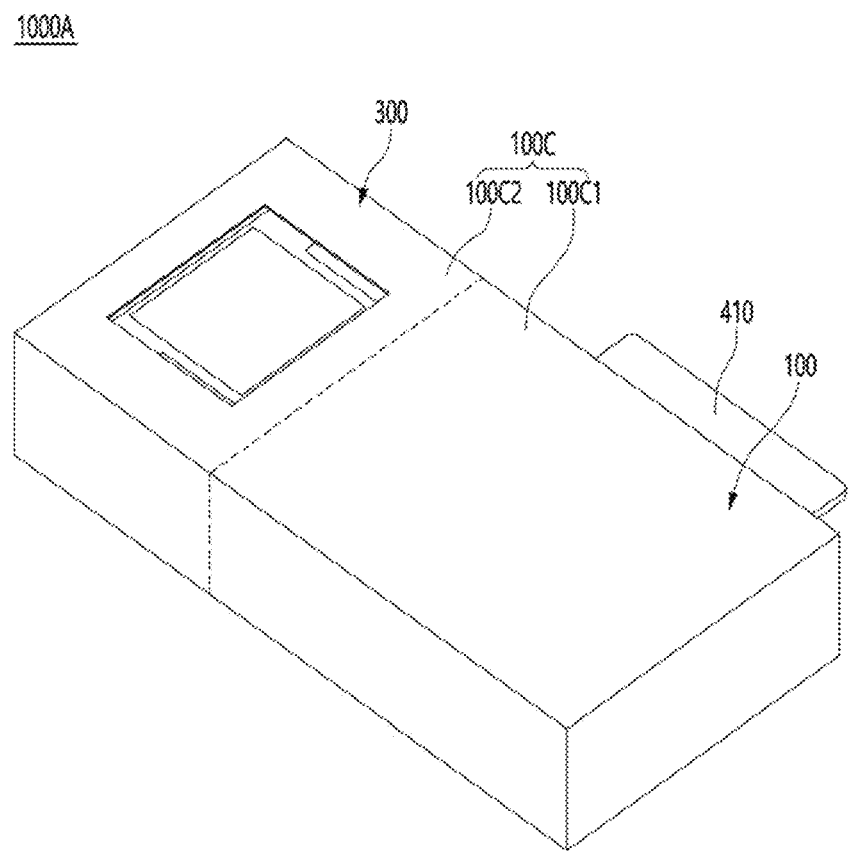

[FIG. 2]
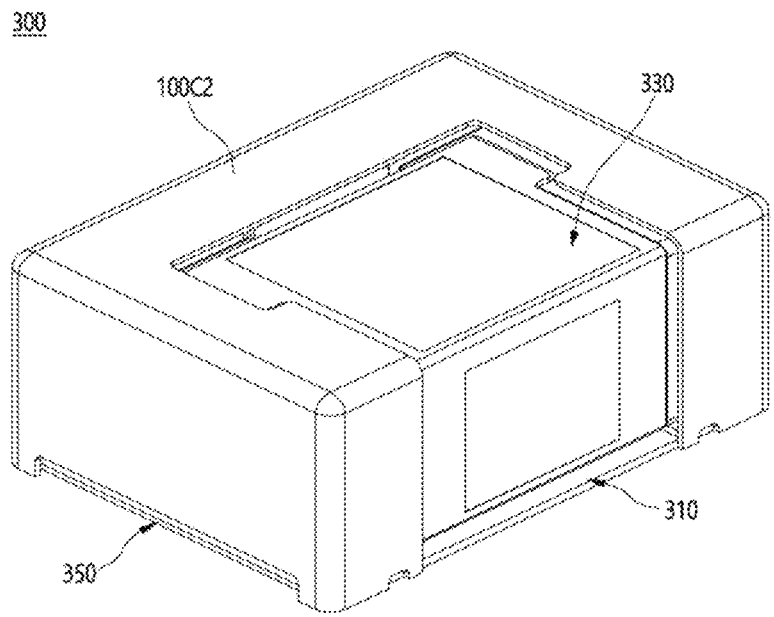
[FIG. 3a]
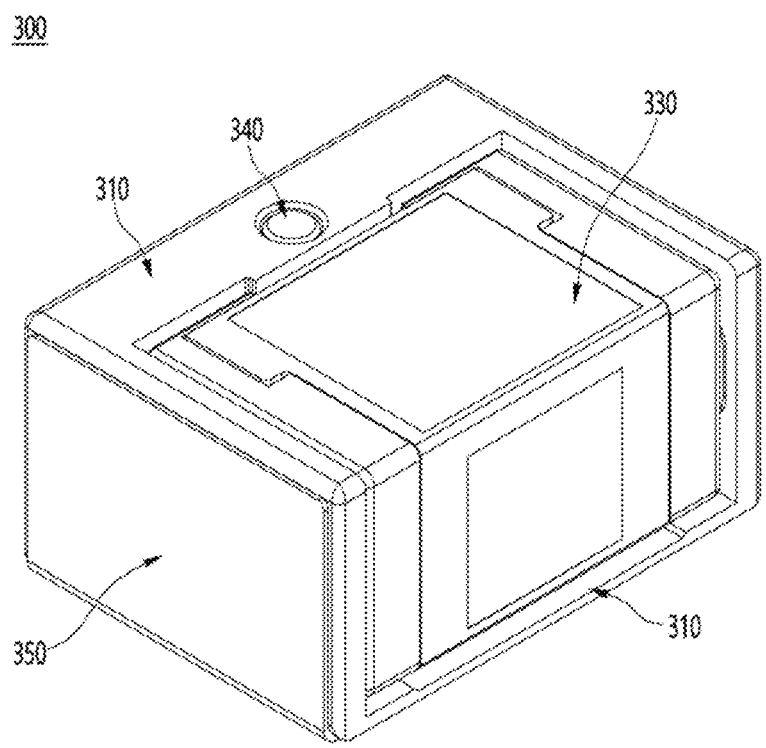

[FIG. 3b]
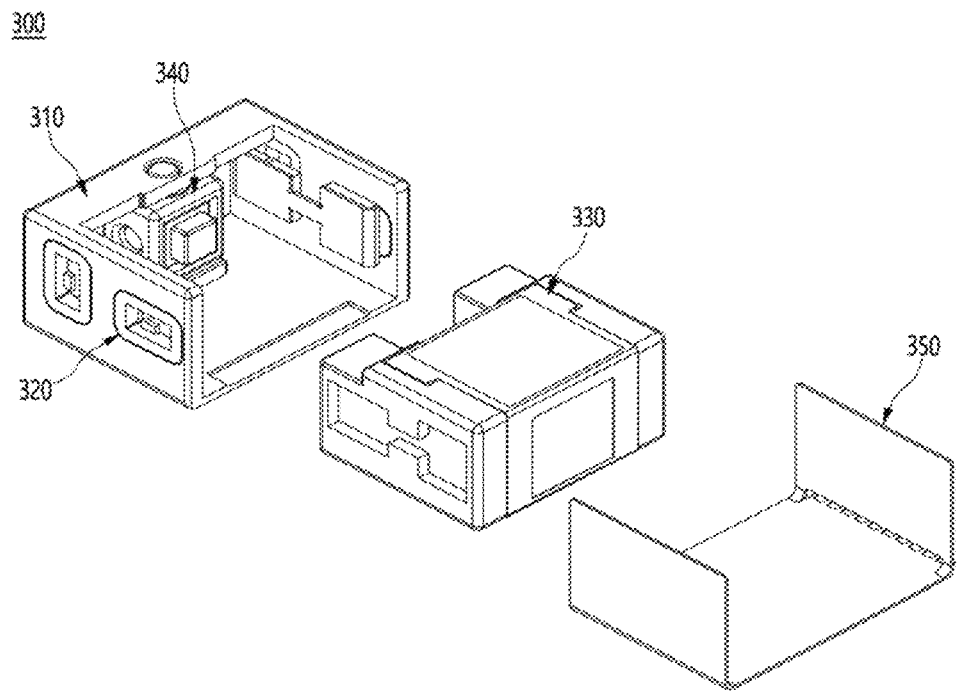
[FIG. 4a]
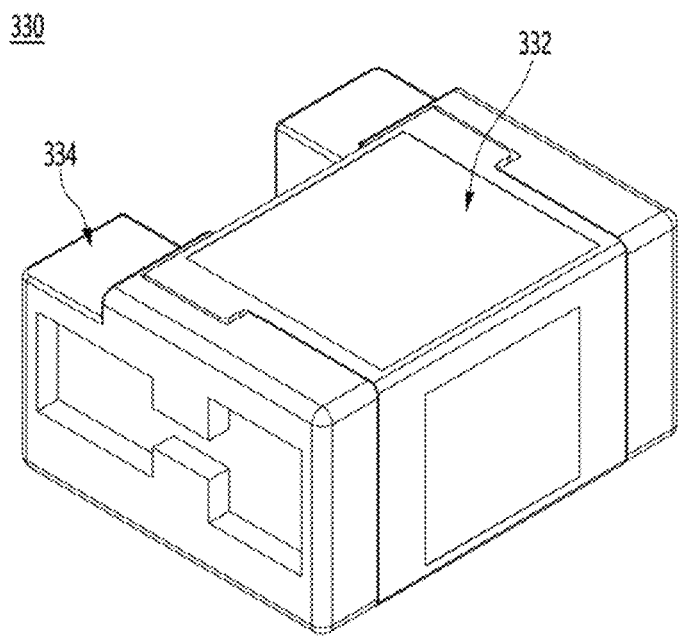

[FIG. 4b]
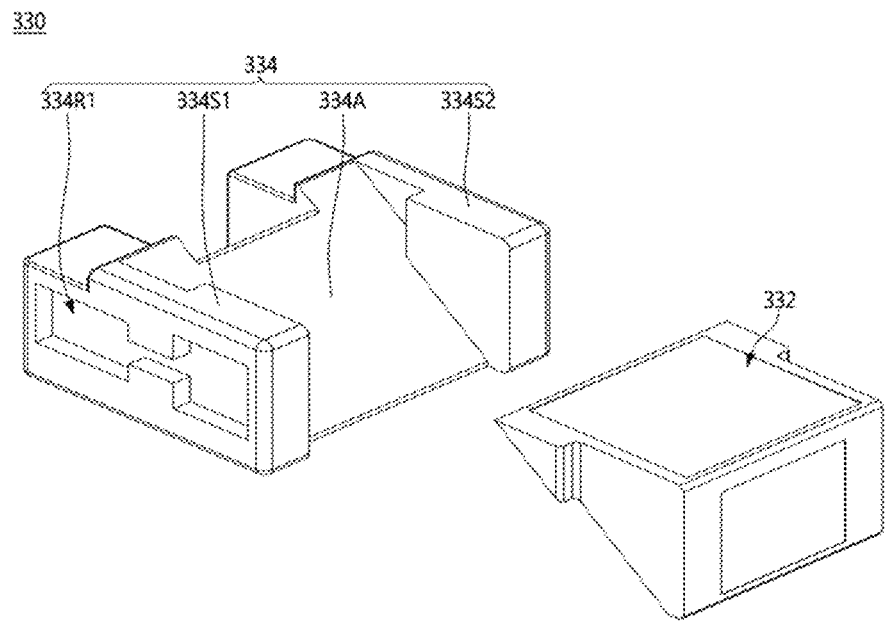
[FIG. 4c]
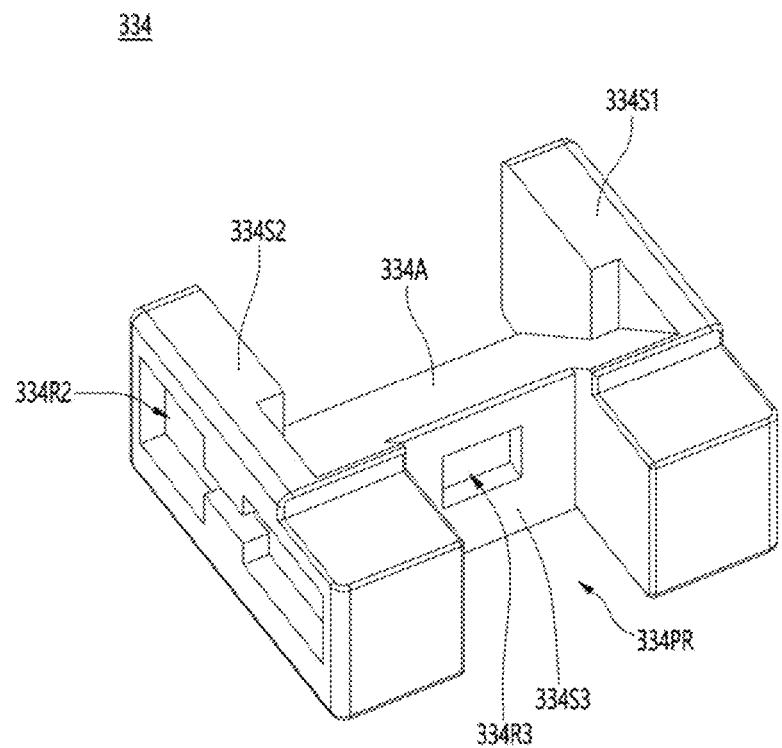

[FIG. 5a]
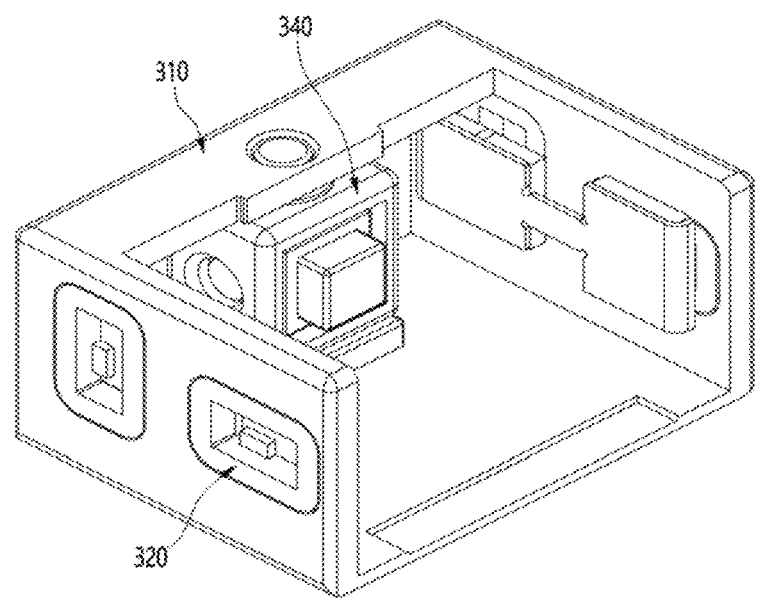
[FIG. 5b]
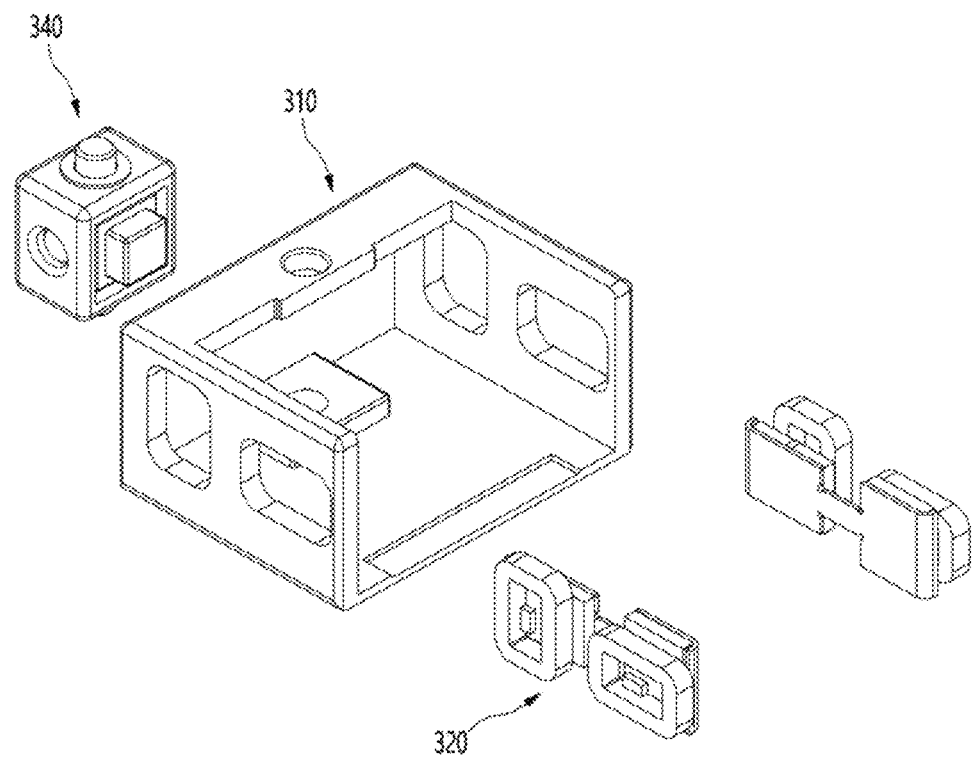

[FIG. 6a]
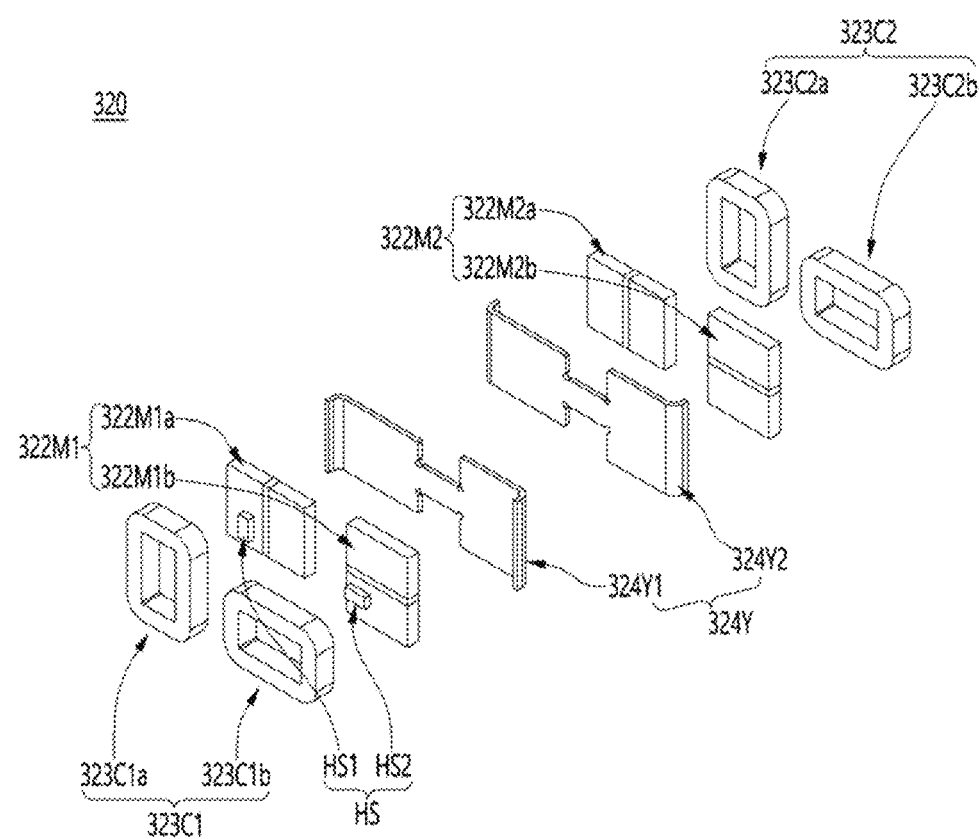

【FIG. 6b】
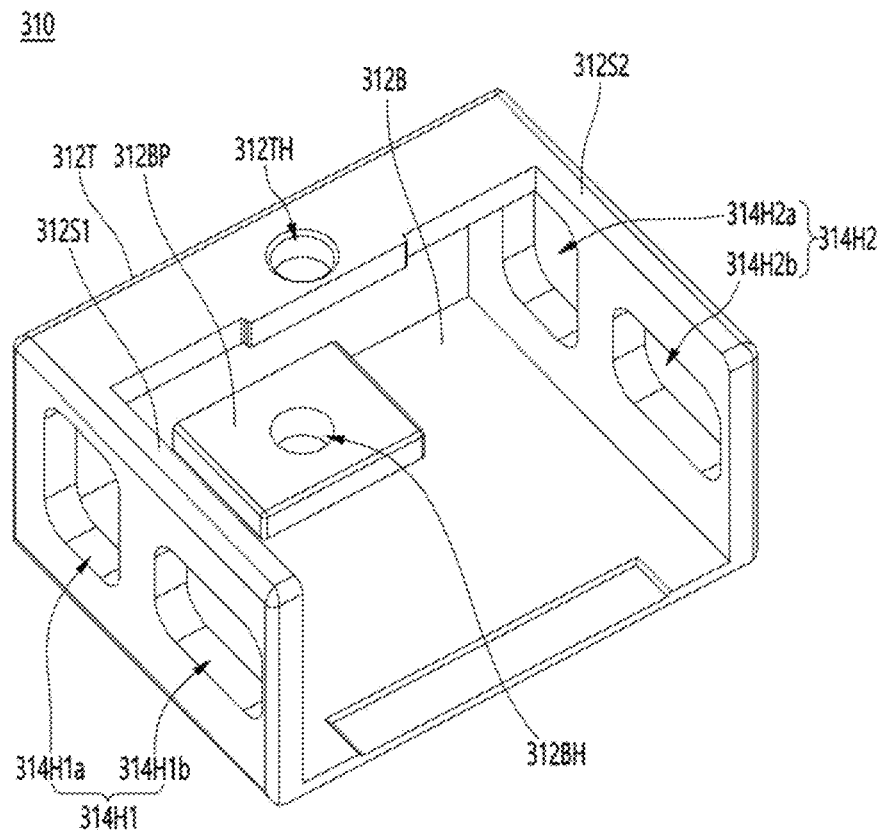
【FIG. 7a】
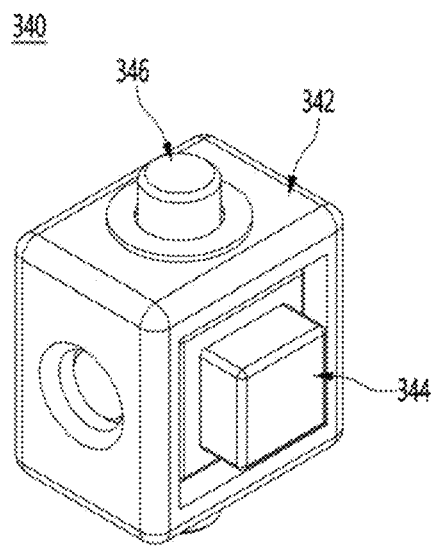

[FIG. 7b]
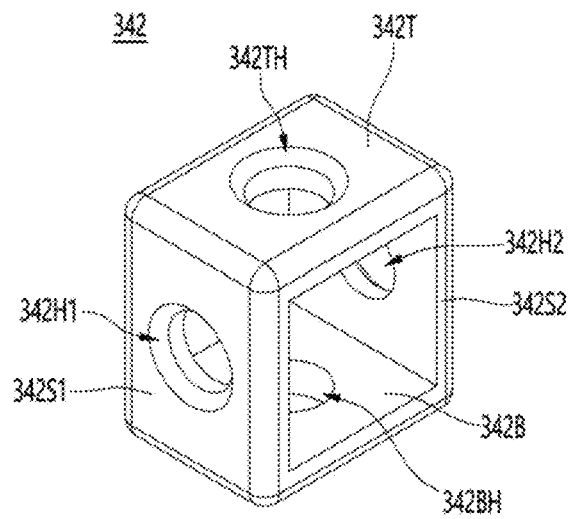
[FIG. 7c]
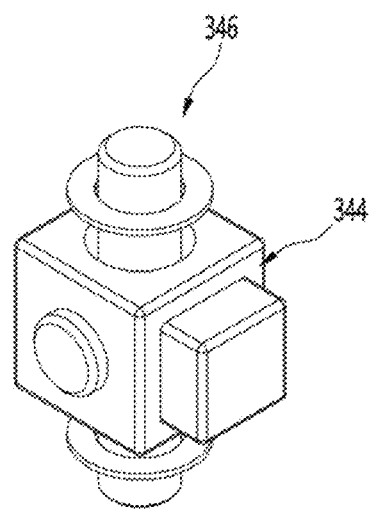

[FIG. 7d]
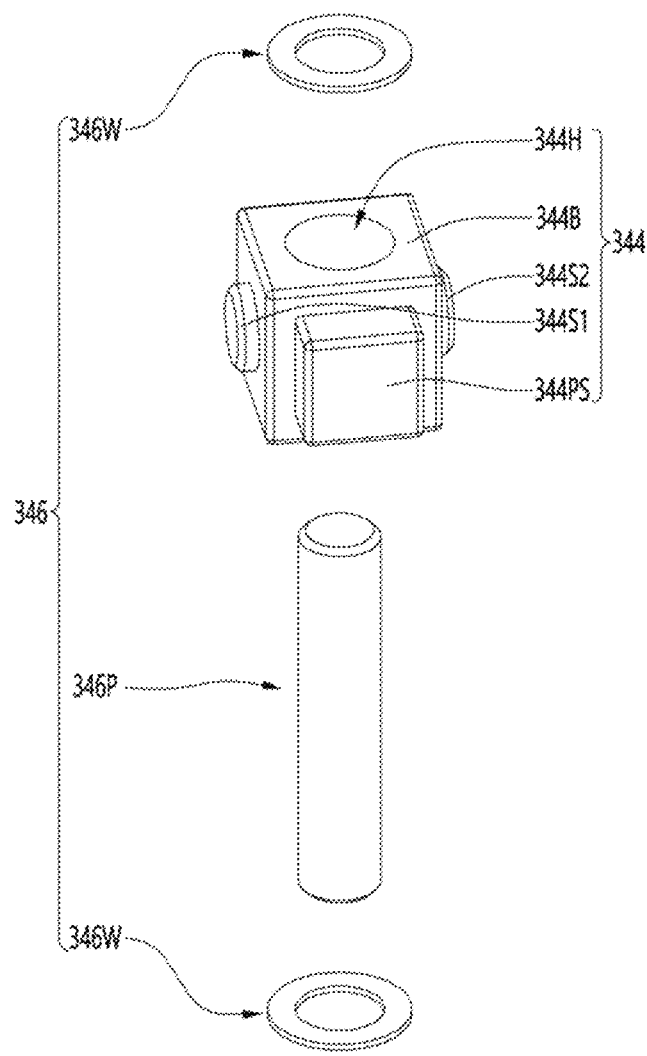

[FIG. 8a]
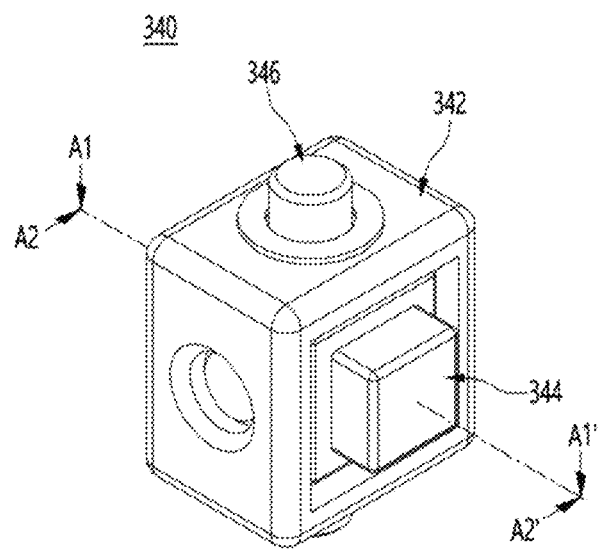
[FIG. 8b]
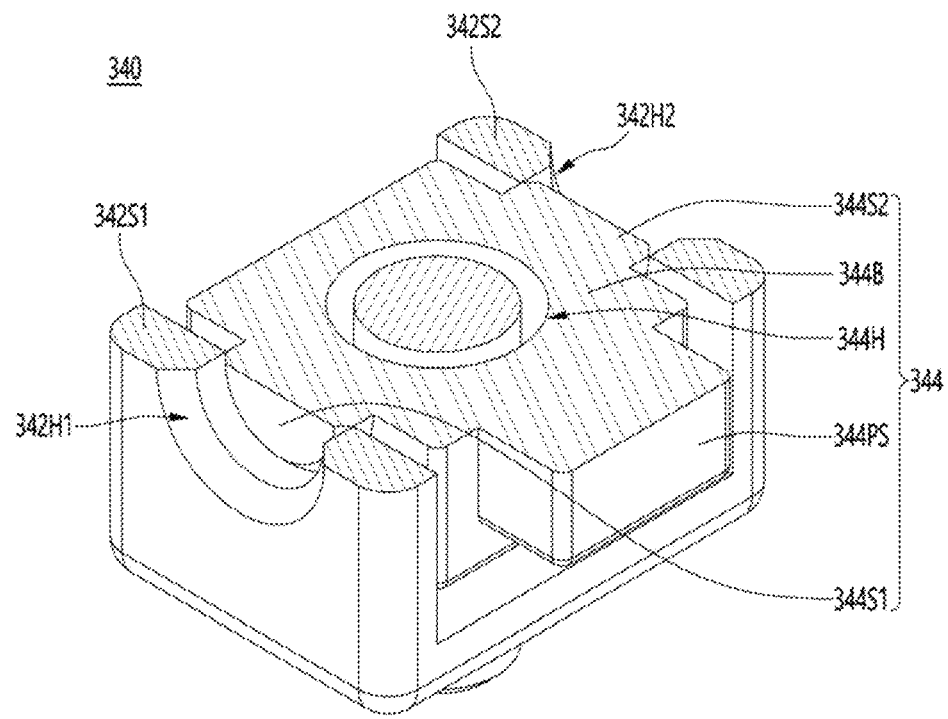

[FIG. 8c]
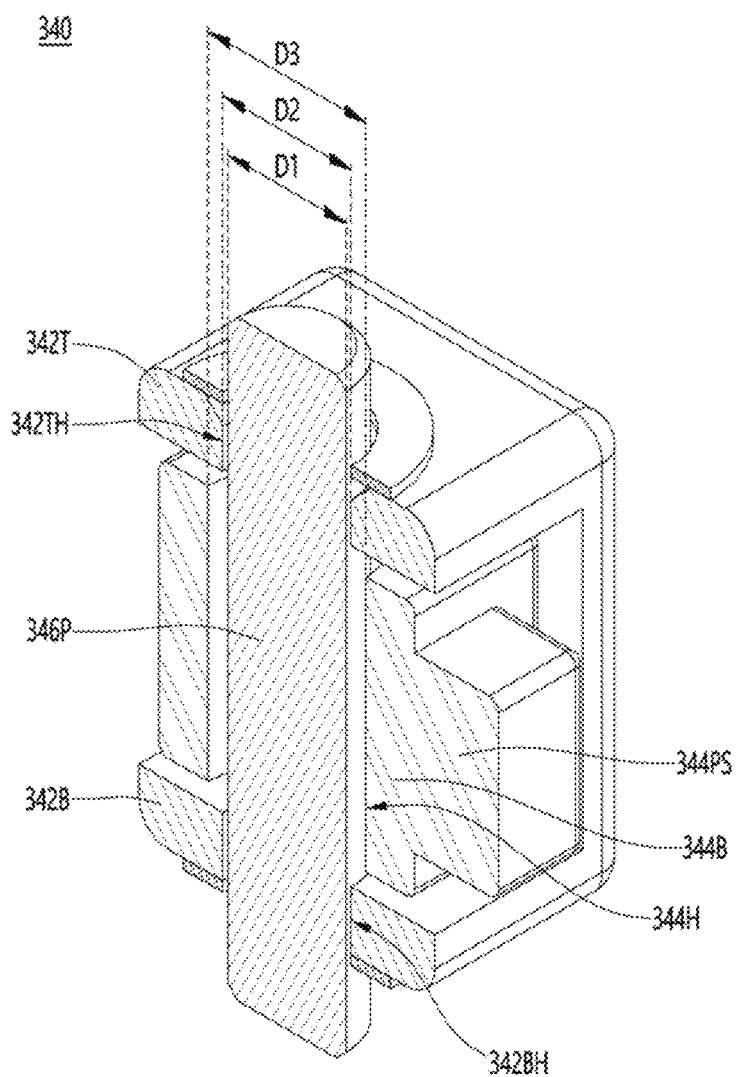

【FIG. 8d】
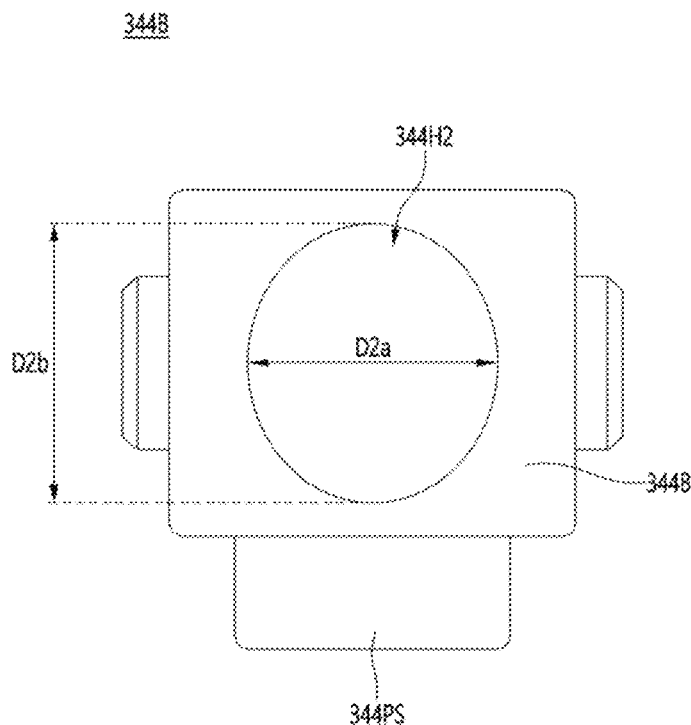
【FIG. 8e】
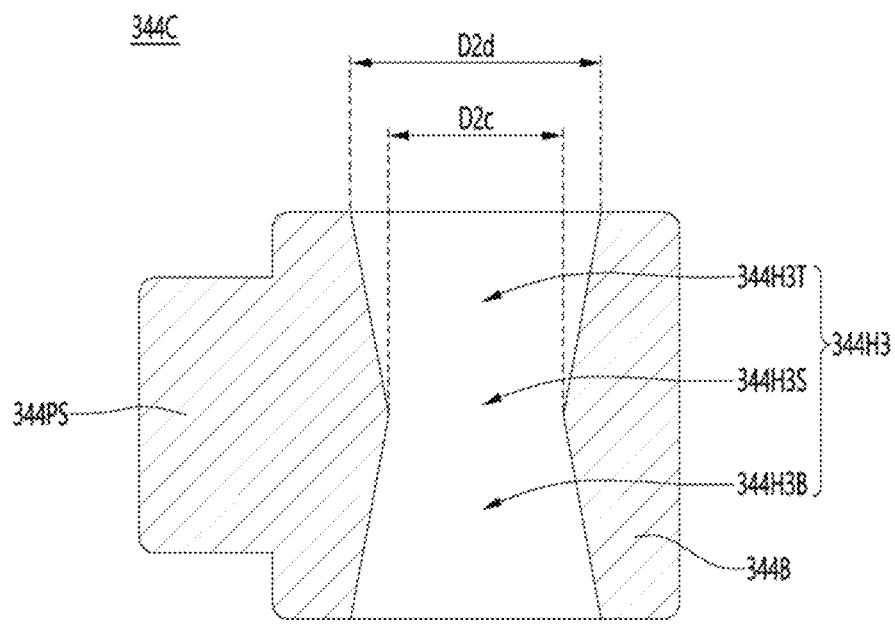

[FIG. 9a]
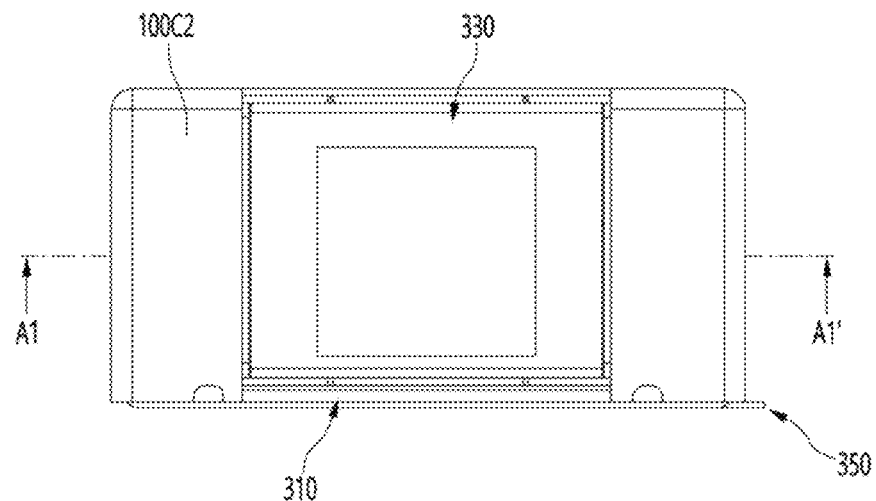
[FIG. 9b]
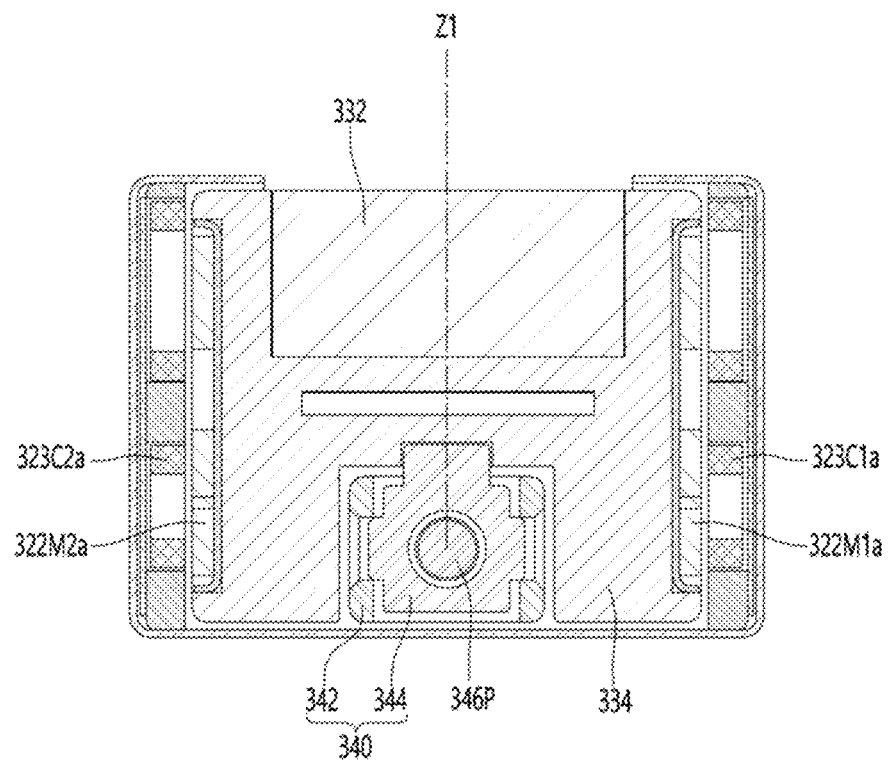

【FIG. 9c】
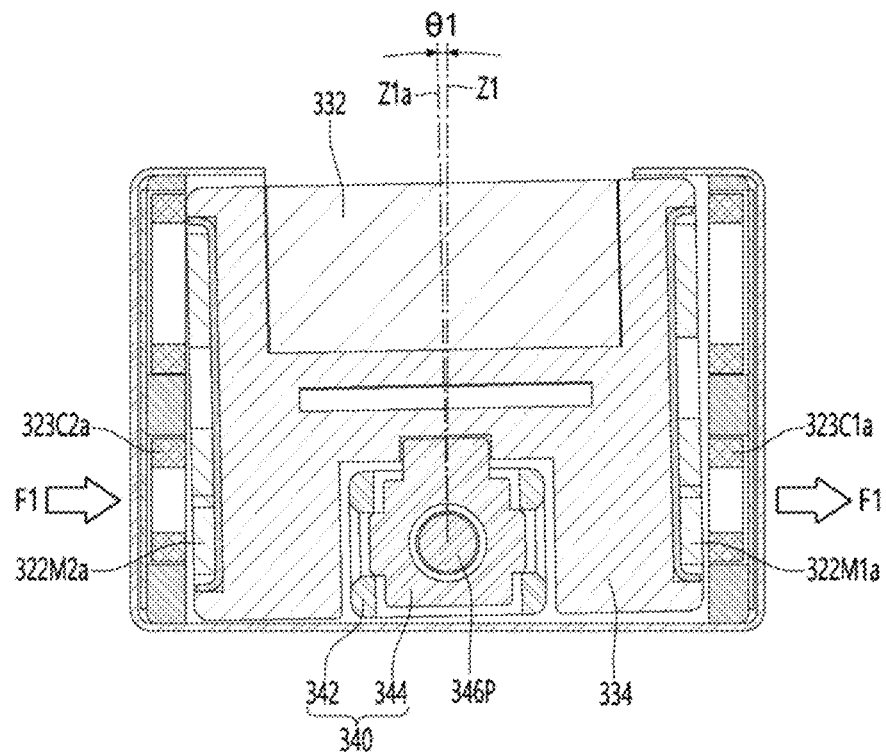
【FIG. 10a】
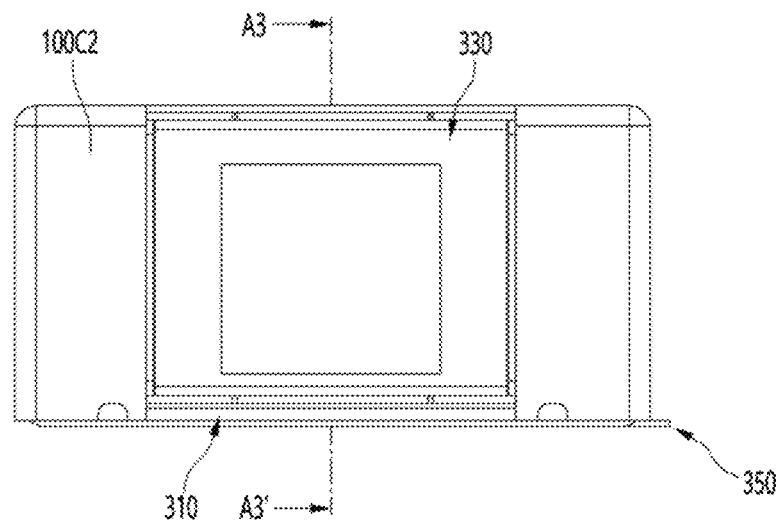

[FIG. 10b]
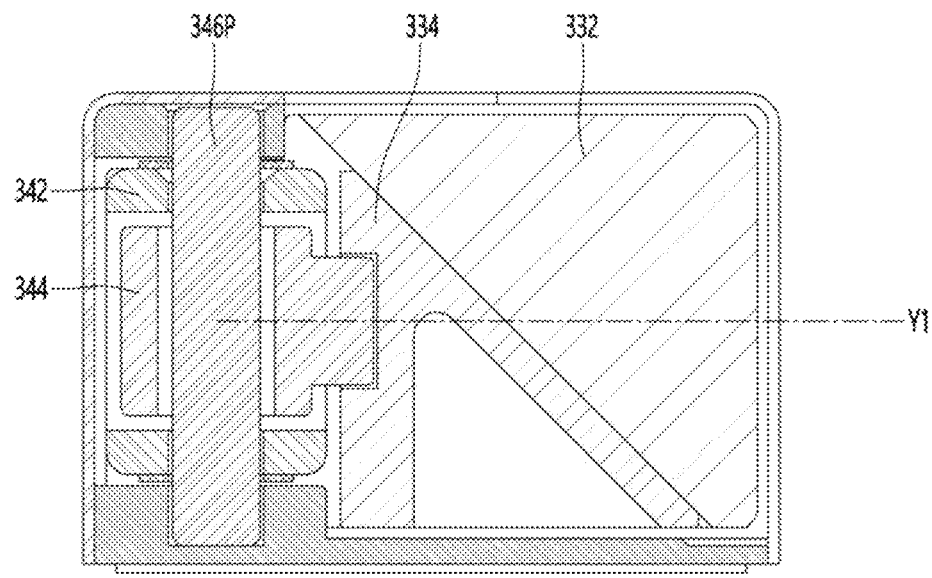
[FIG. 10c]
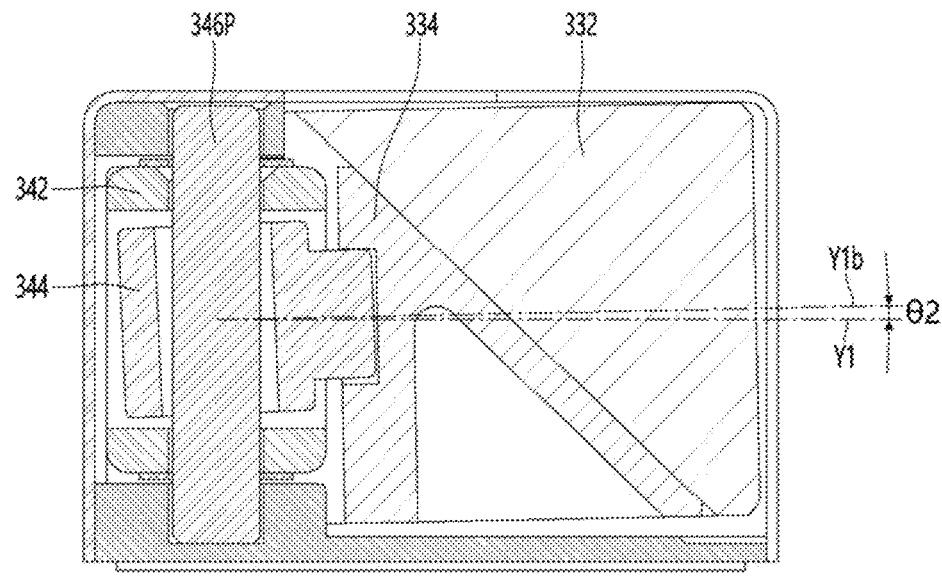

[FIG. 11]
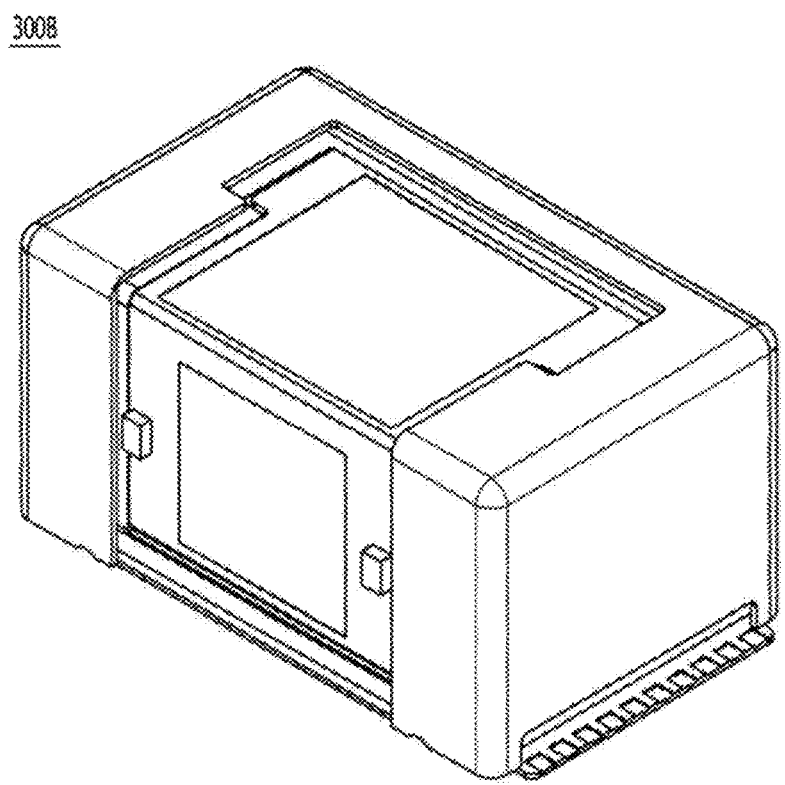

[FIG. 12]
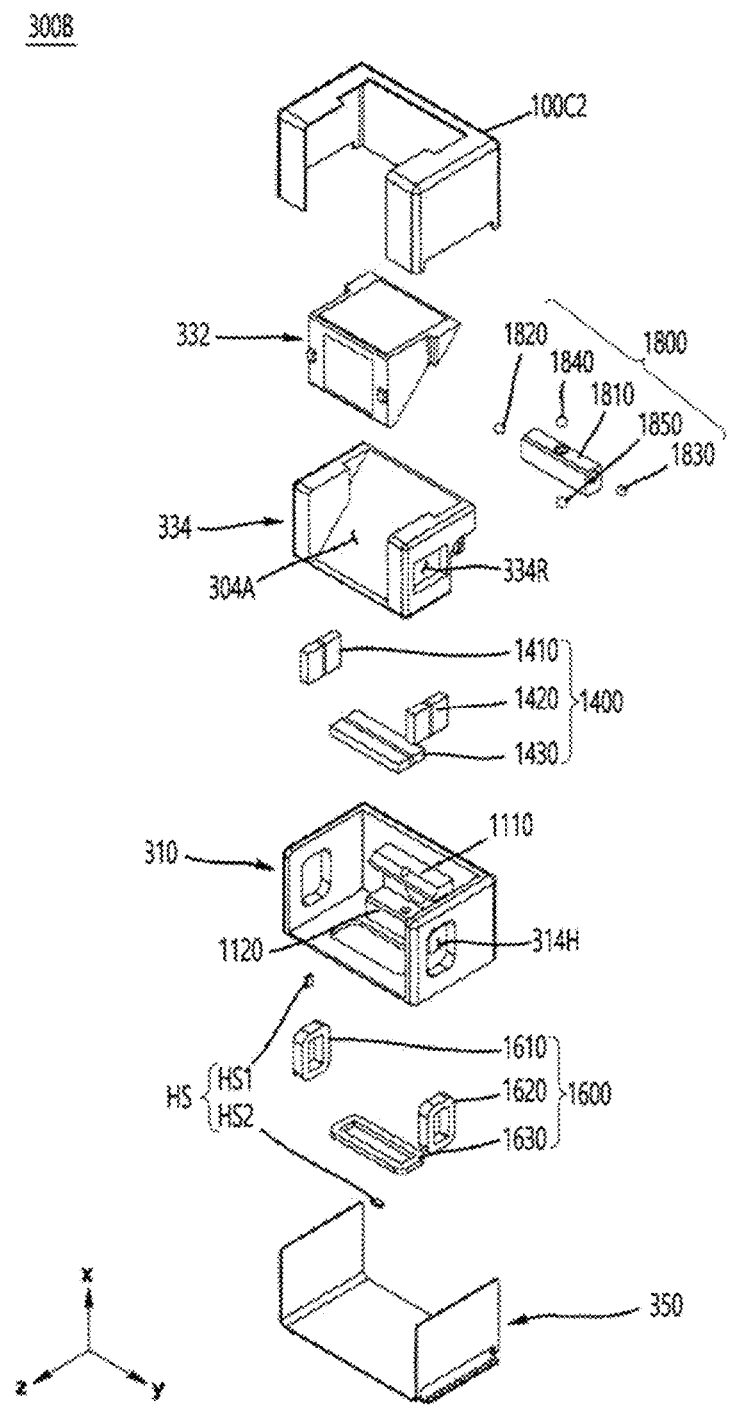

[FIG. 13]
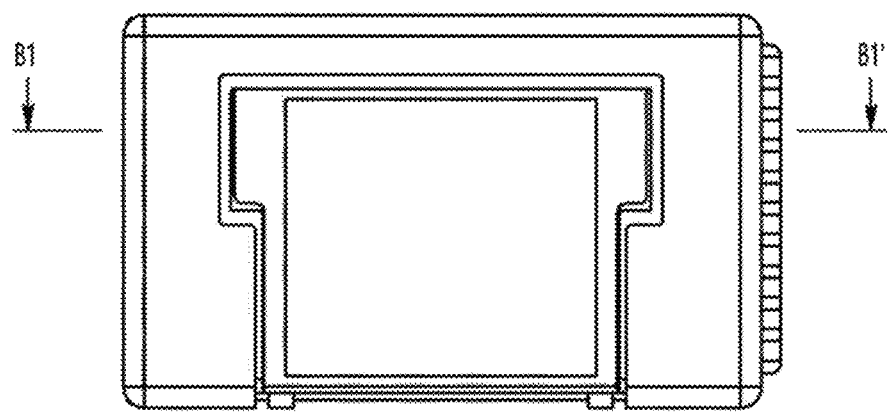
[FIG. 14]
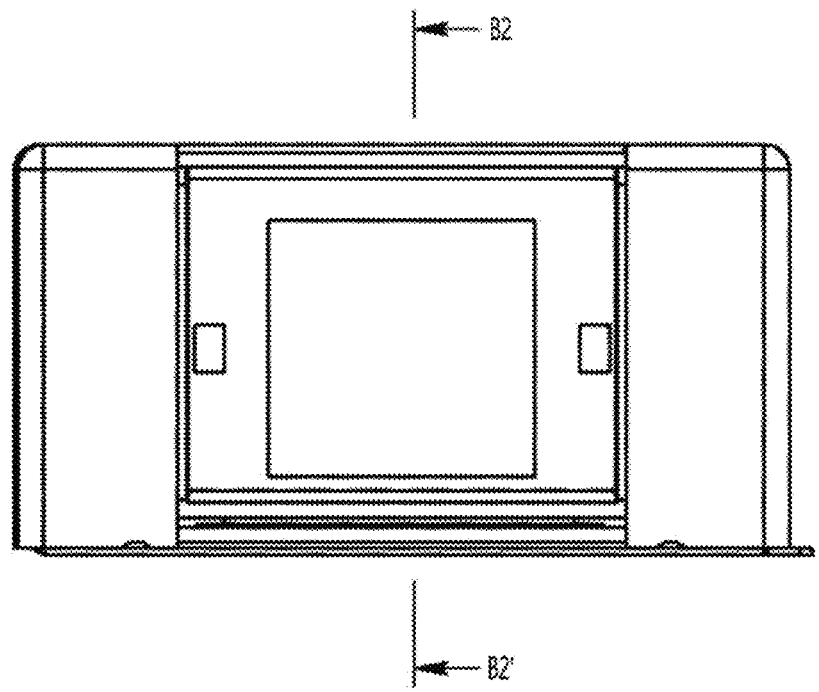

[FIG. 15]
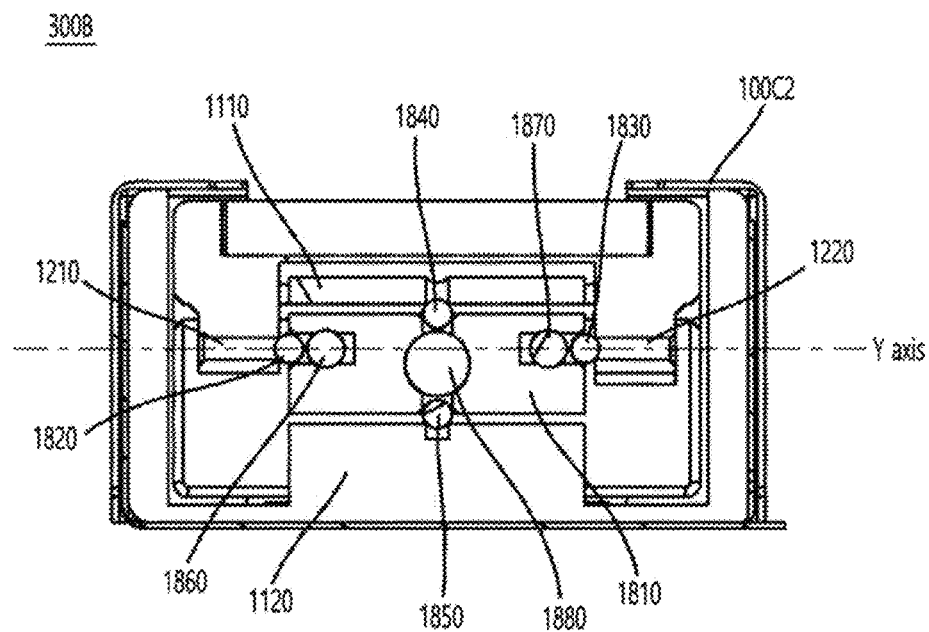
[FIG. 16]
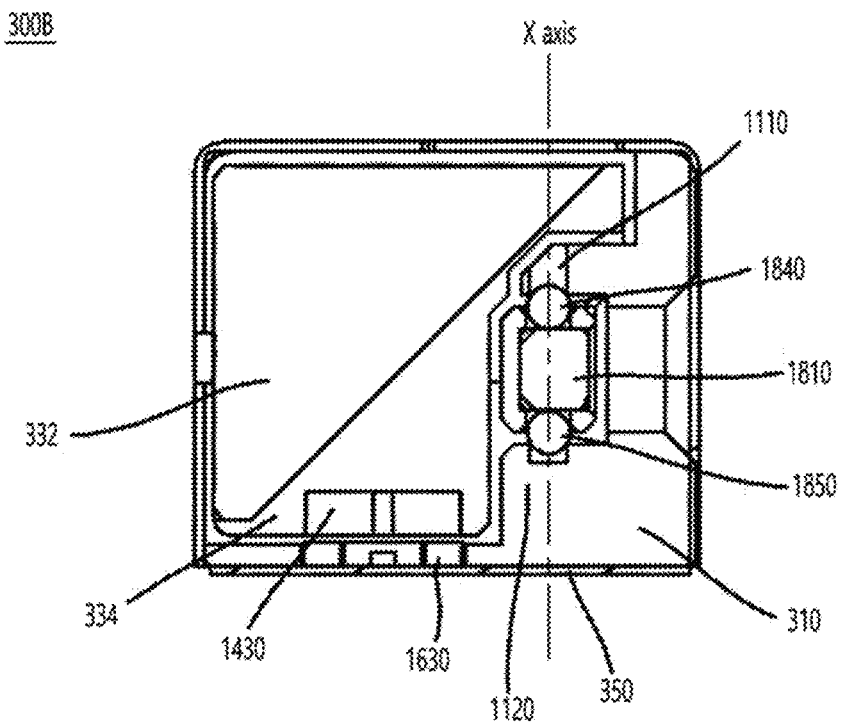

[FIG. 17]
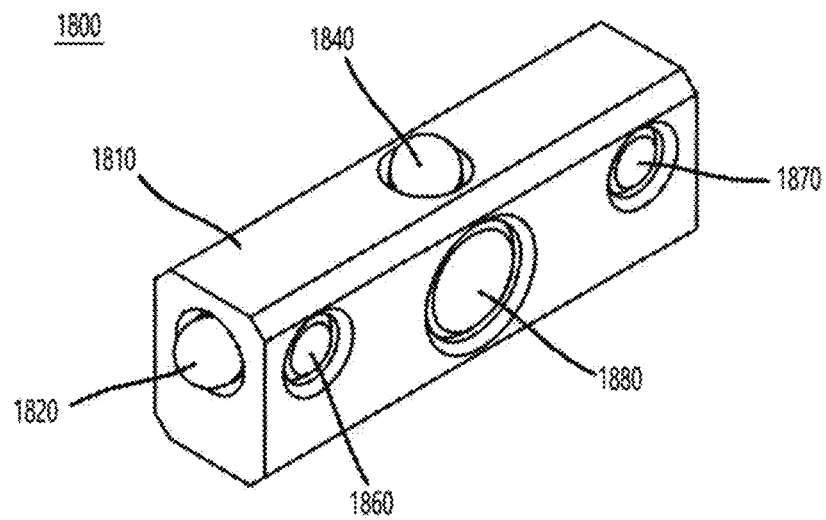
[FIG. 18]
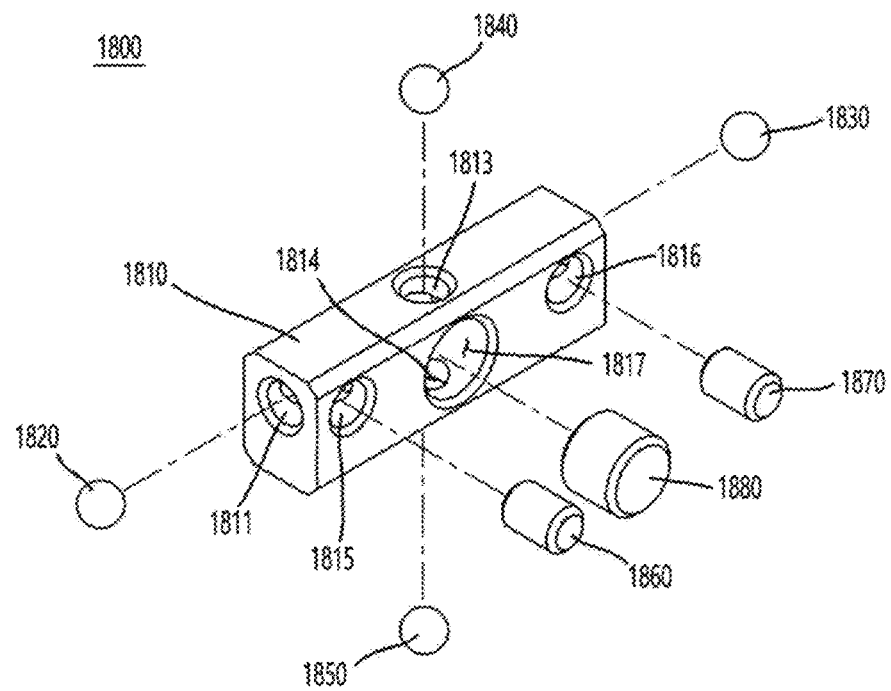

[FIG. 19]
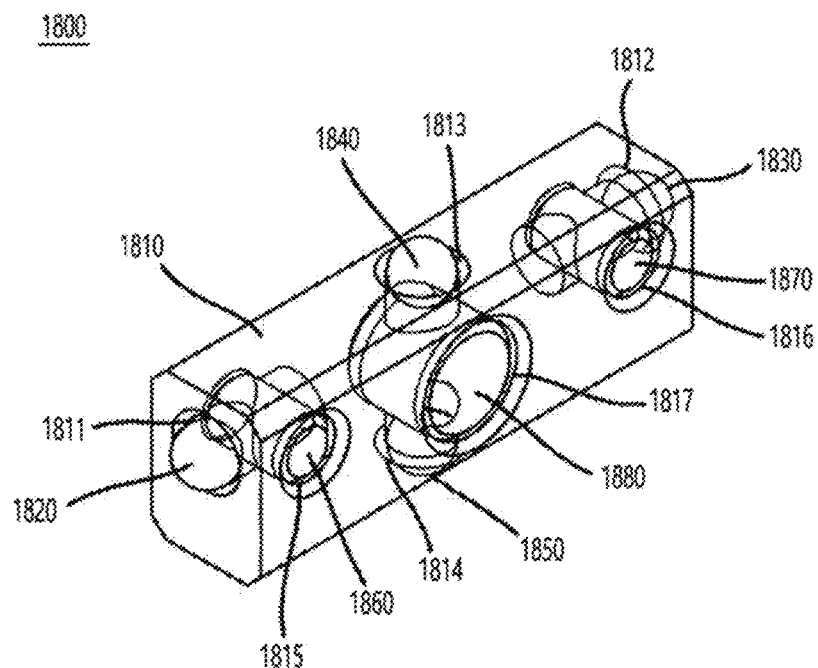
[FIG. 20]
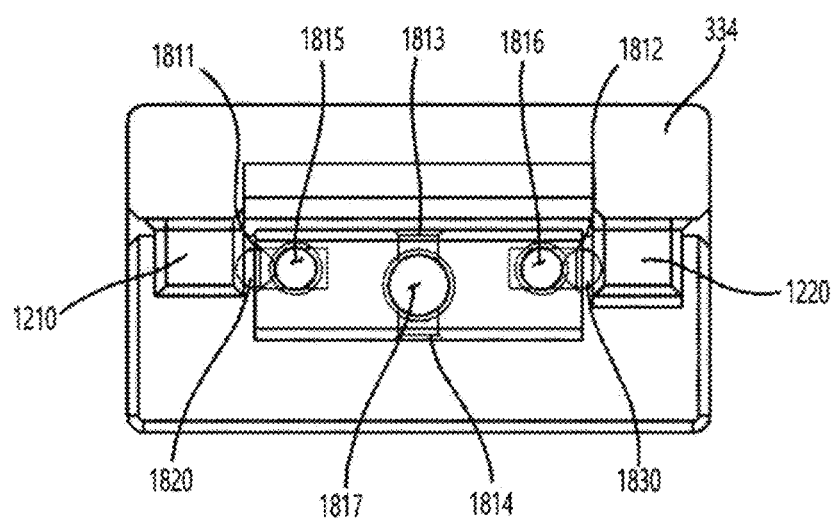

[FIG. 21]
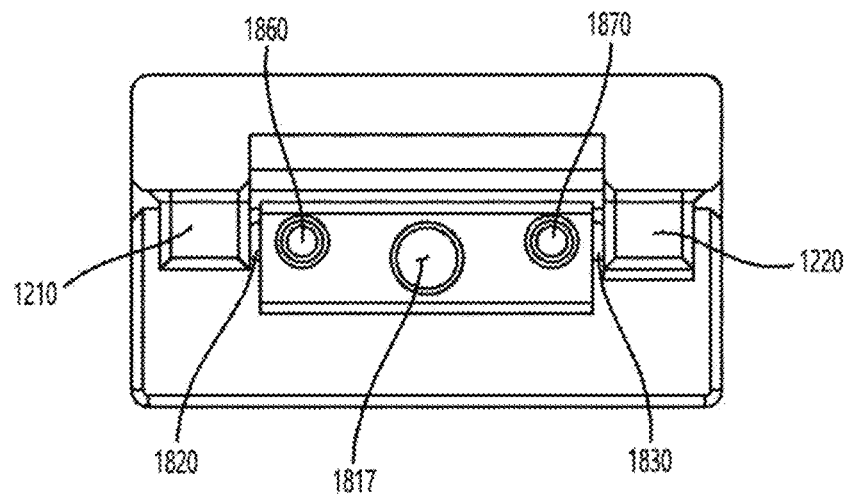
[FIG. 22]
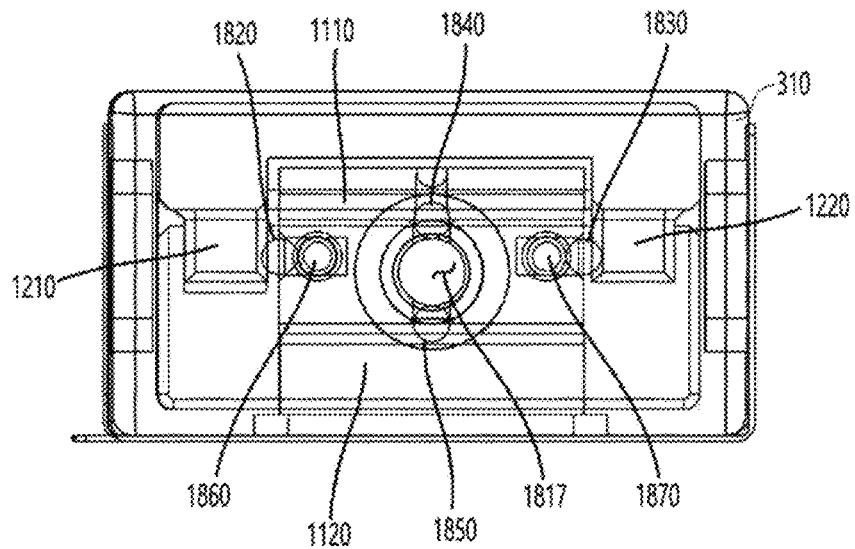

[FIG. 23]
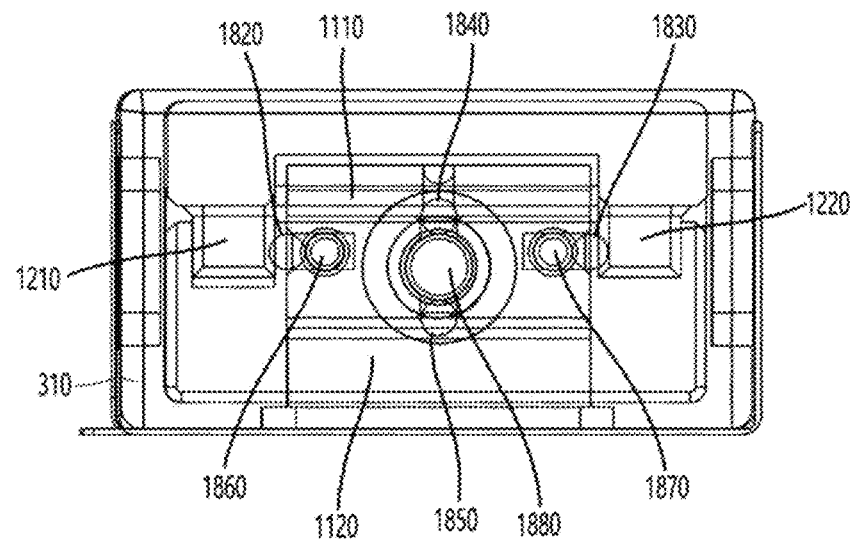
[FIG. 24]
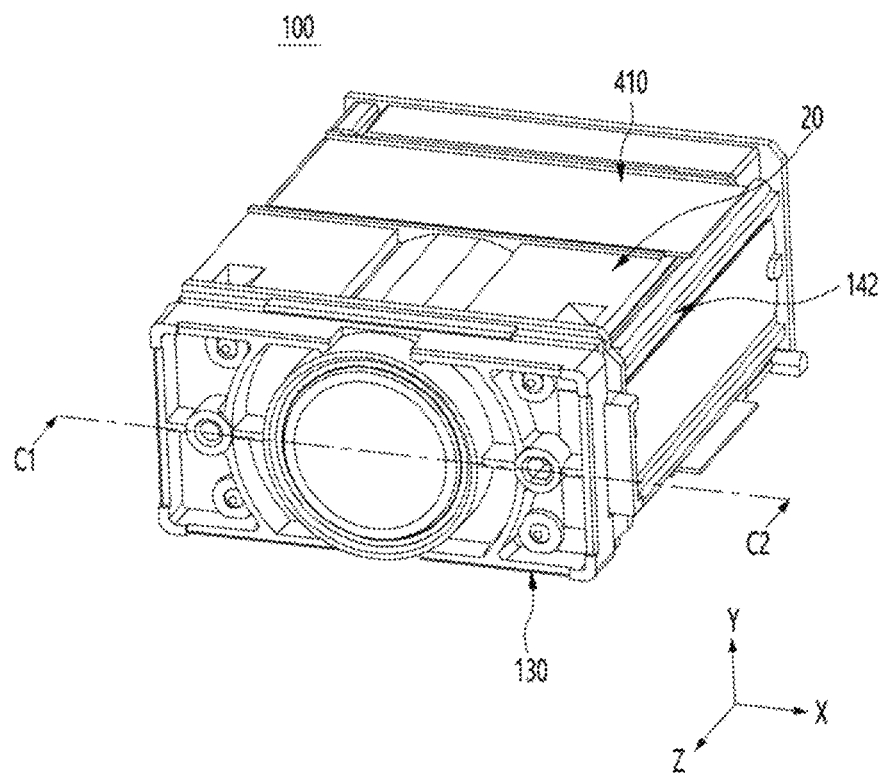

【FIG. 25】
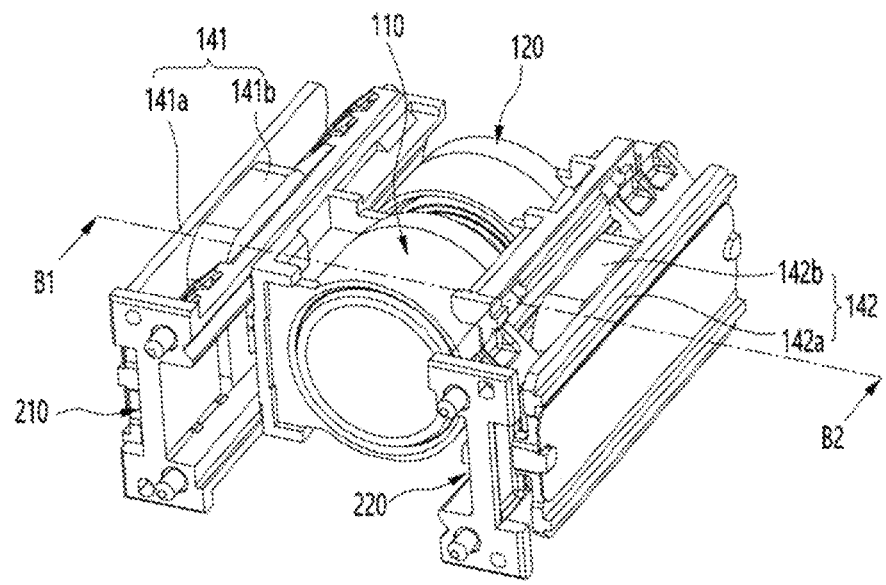
【FIG. 26】
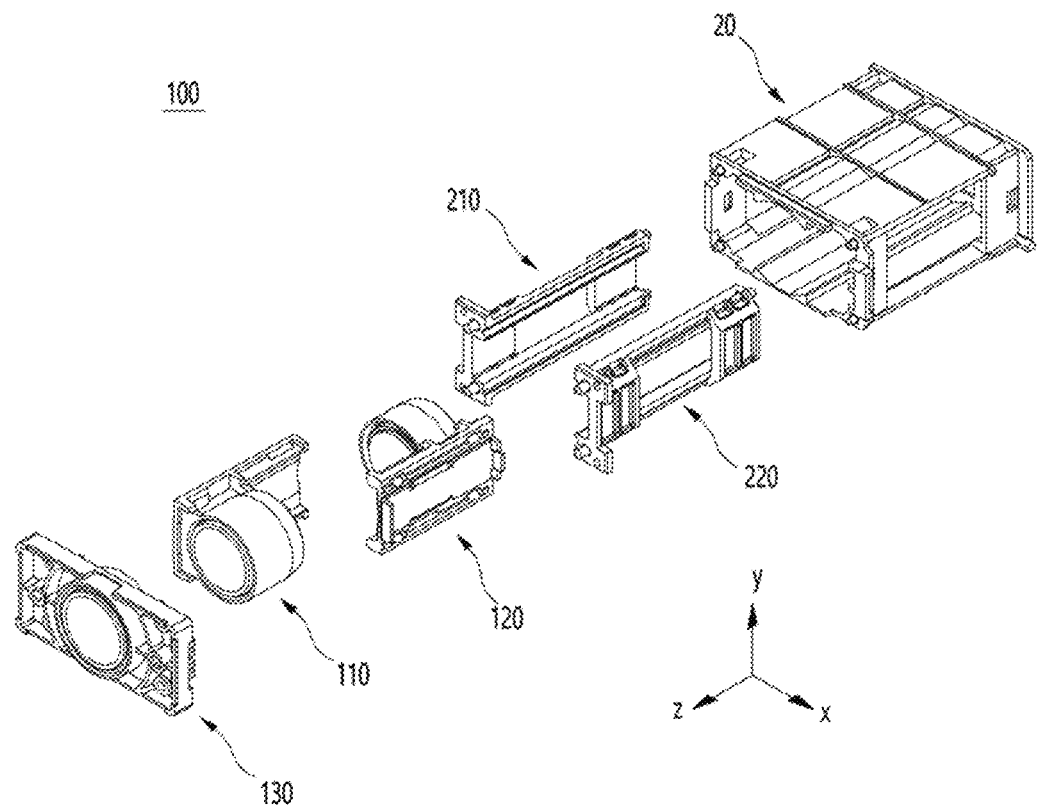

[FIG. 27]
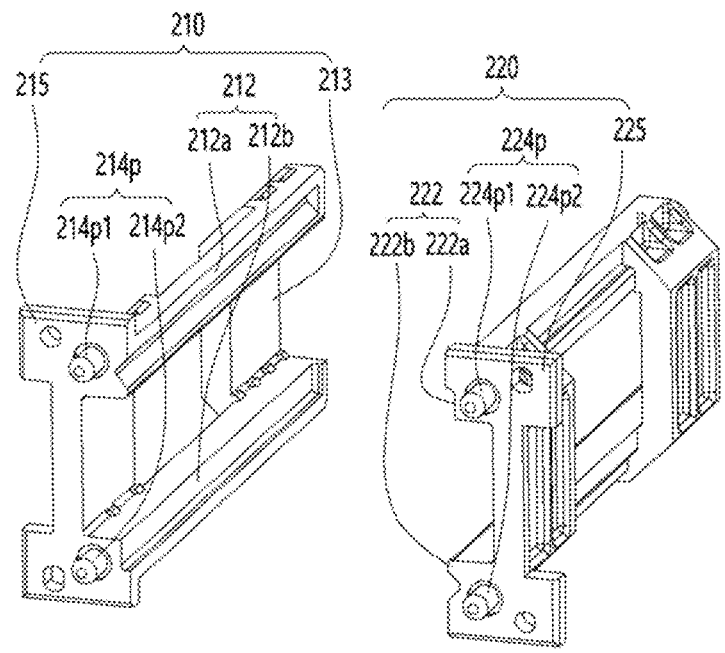
[FIG. 28a]
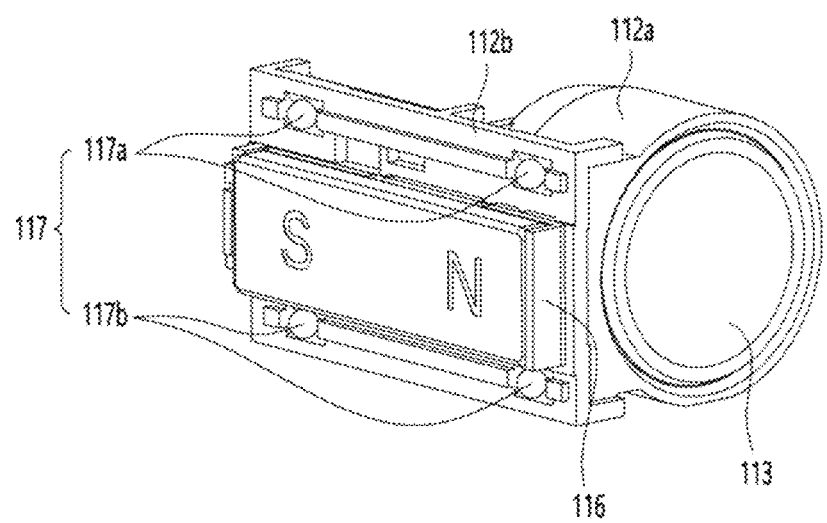

【FIG. 28b】
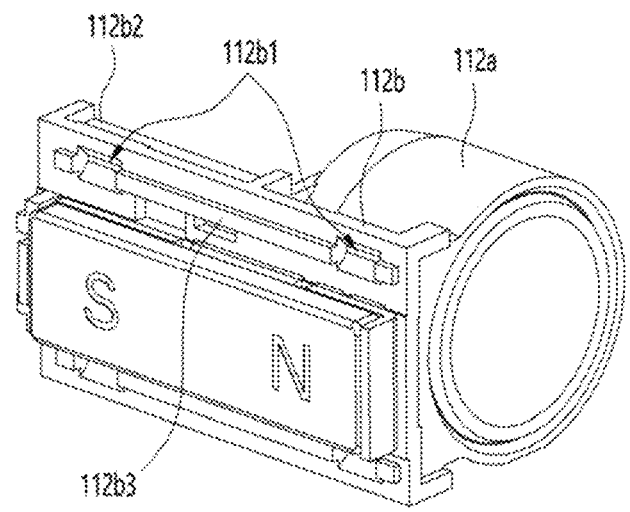
【FIG. 29】
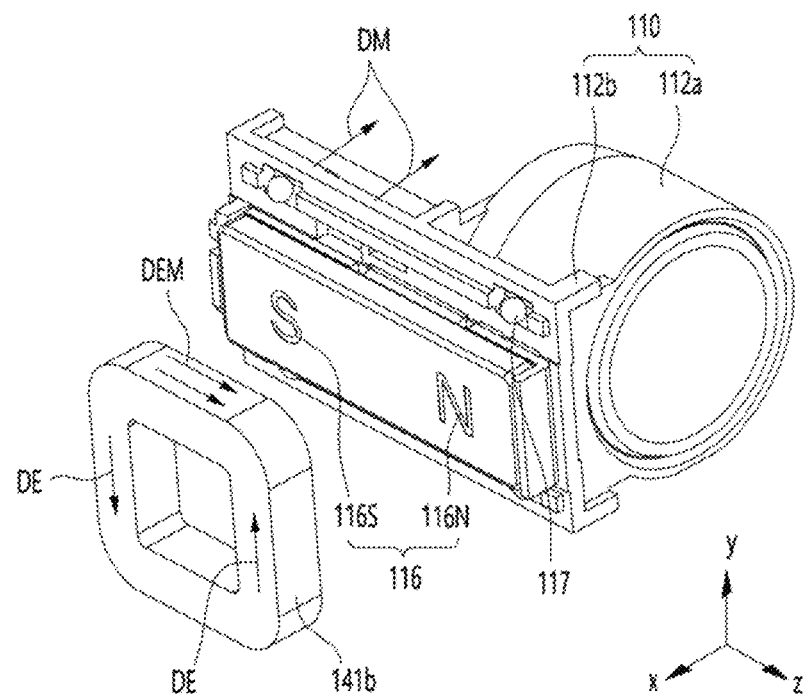

[FIG. 30]
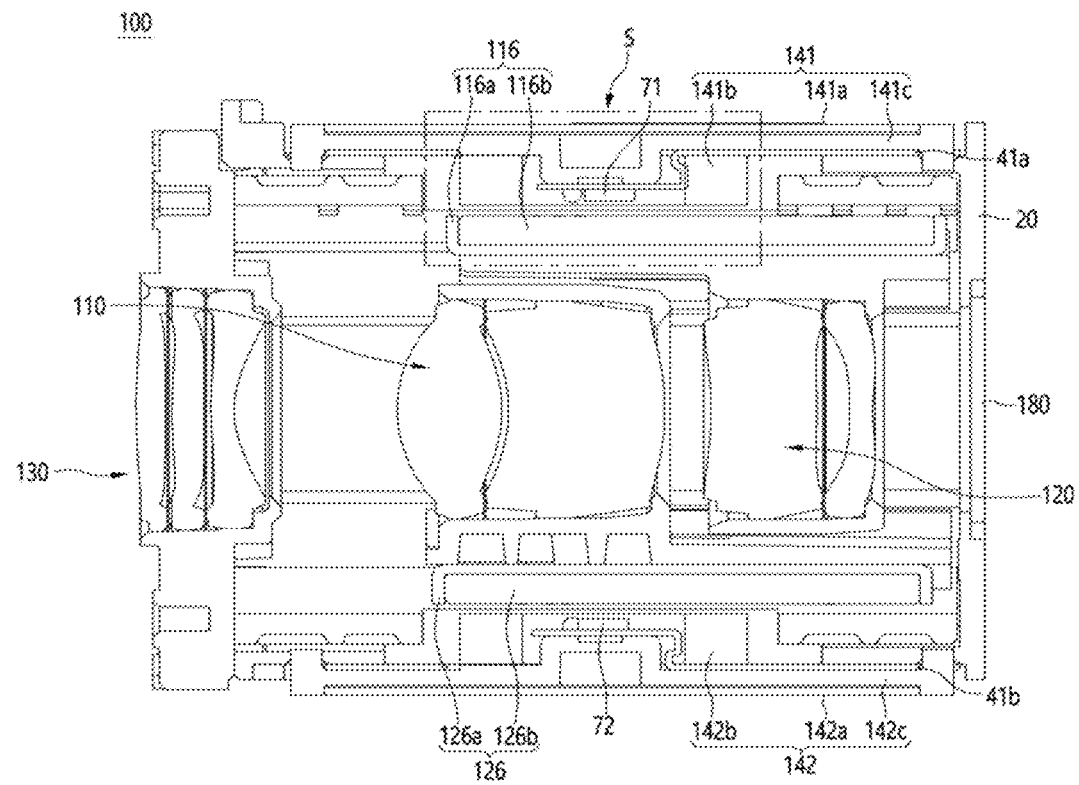
[FIG. 31a]
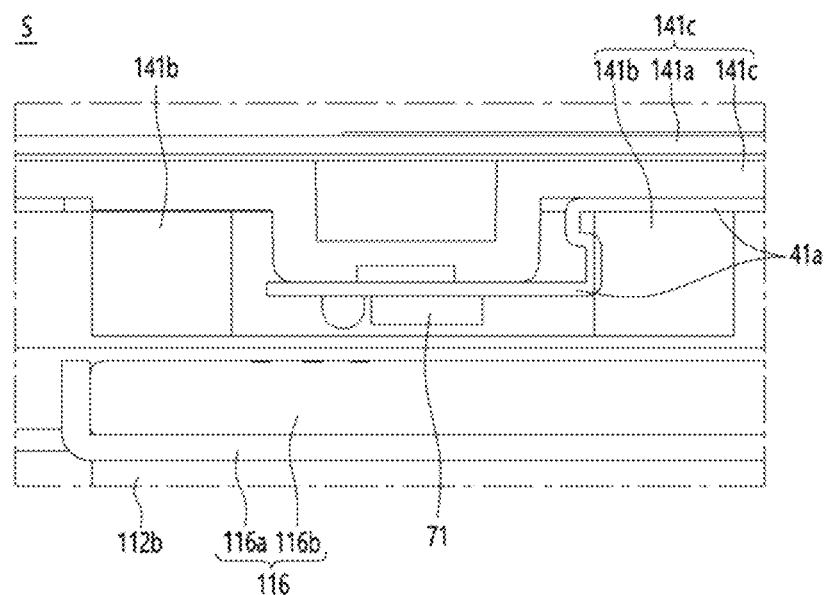

[FIG. 31b]
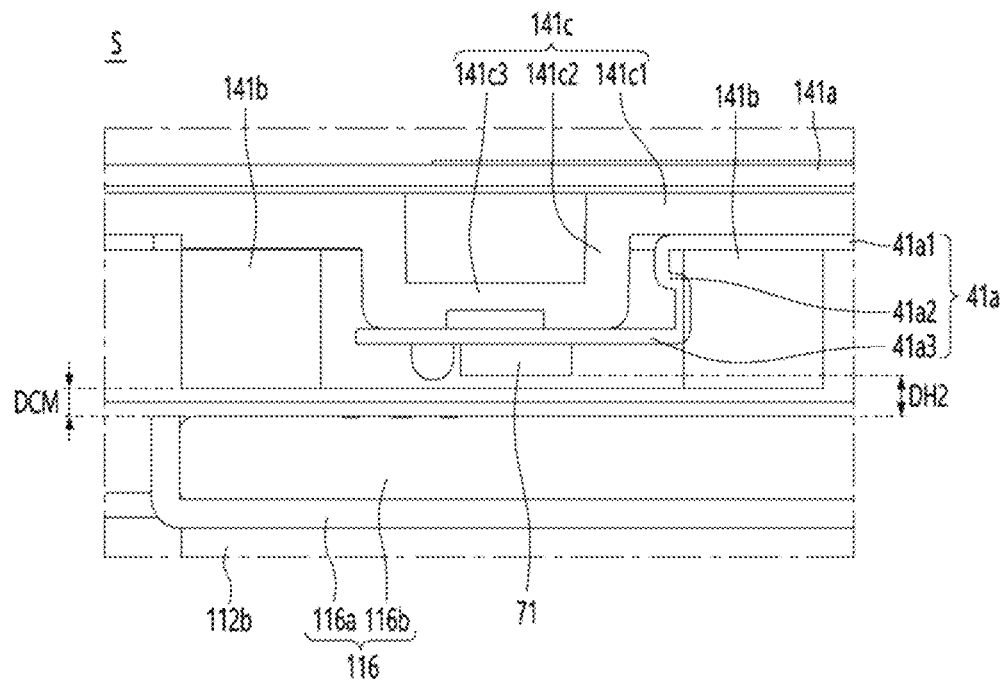
[FIG. 31c]
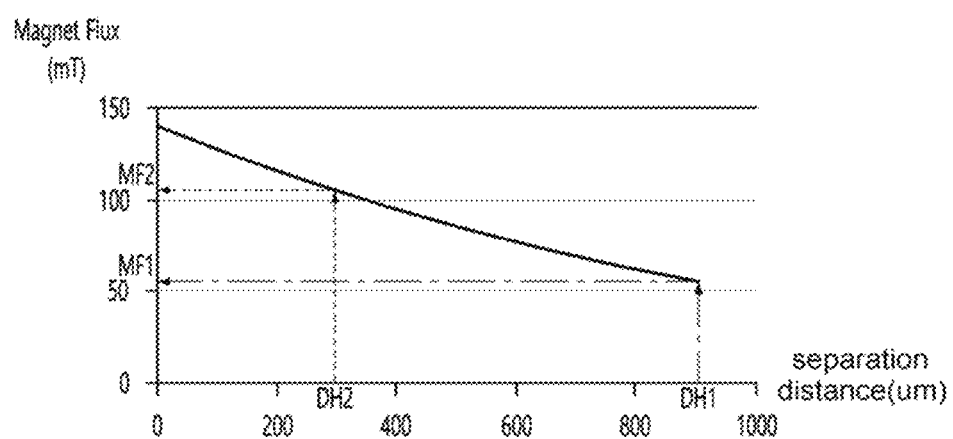

[FIG. 32a]
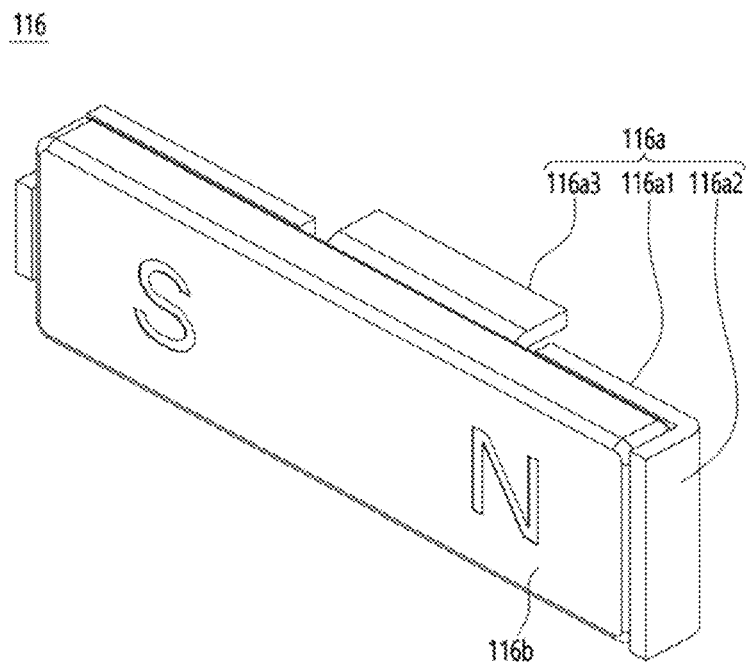
[FIG. 32b]
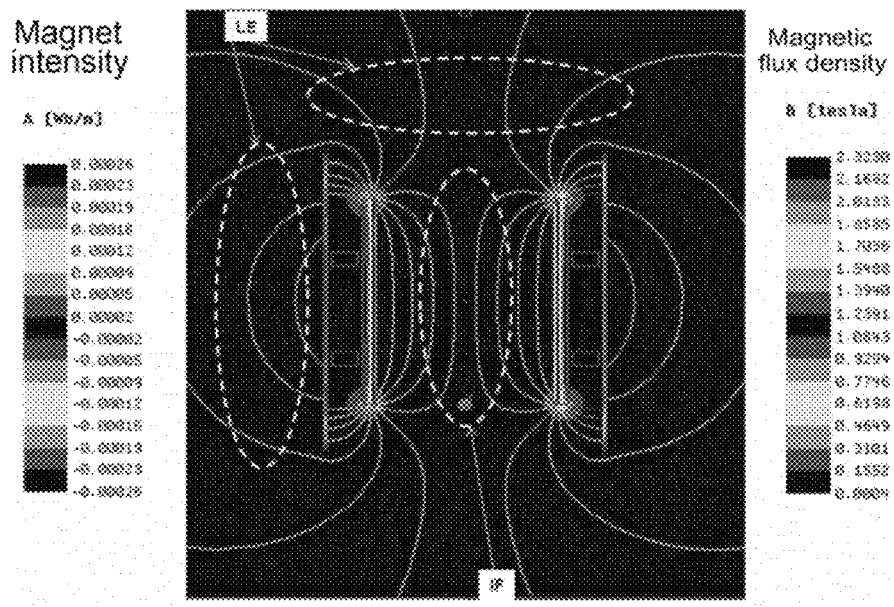

[FIG. 32c]
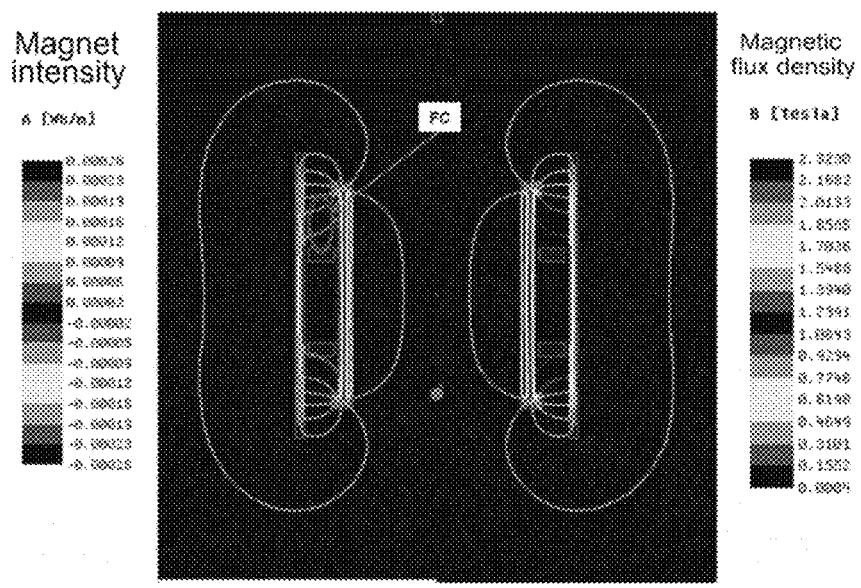
[FIG. 33]
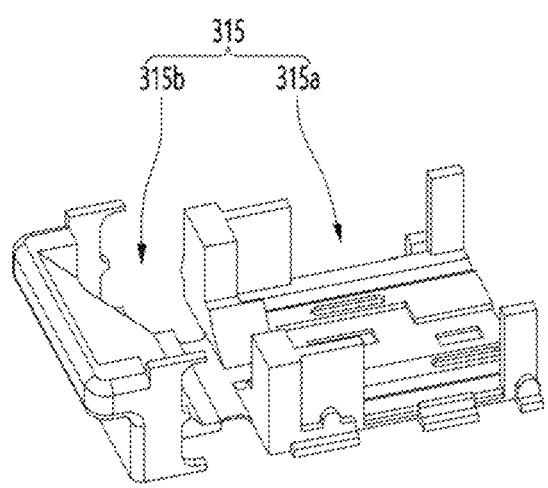

[FIG. 34]
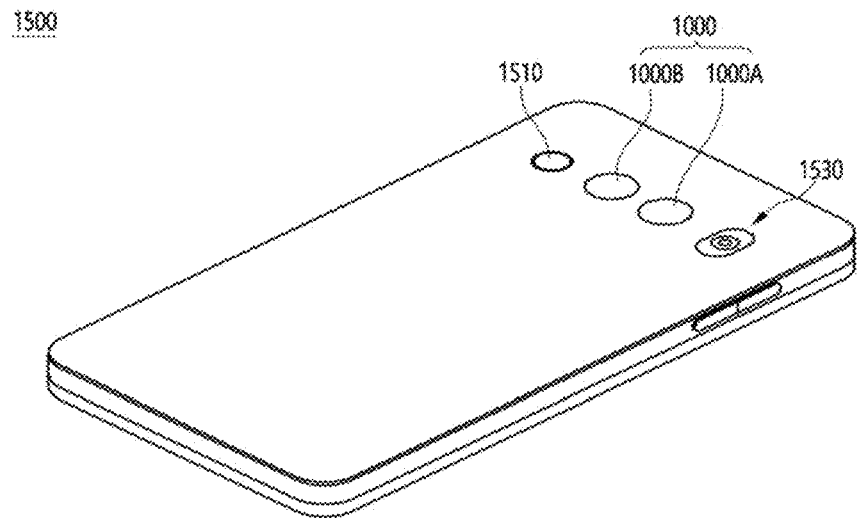
[FIG. 35]
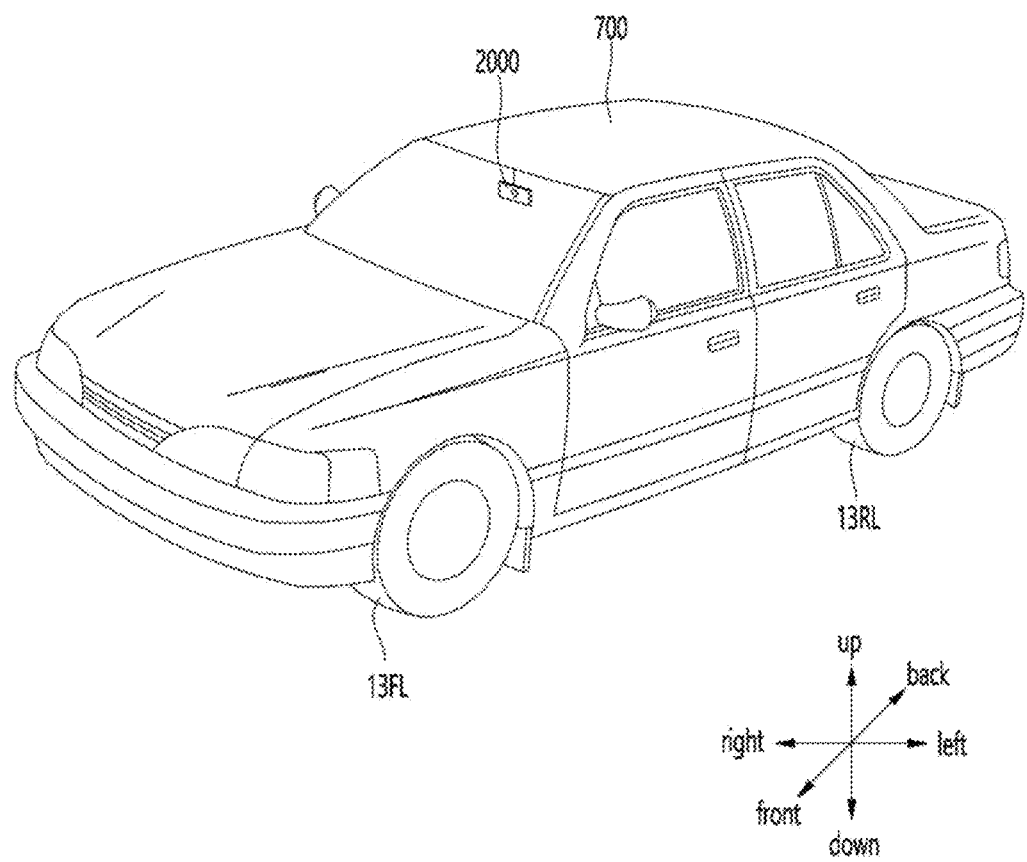

CAMERA ACTUATOR, AND CAMERA MODULE AND CAMERA DEVICE COMPRISING SAME

CROSS REFERENCE TO RELATED APPLICATIONS

This application is the National Phase of PCT International Application No. PCT/KR2020/009298, filed on Jul. 15, 2020, which claims priority under 35 U.S.C. 119(a) to Patent Application Nos. 10-2019-0089226, filed in the Republic of Korea on Jul. 23, 2019 and 10-2019-0096281, filed in the Republic of Korea on Aug. 7, 2019, all of which are hereby expressly incorporated by reference into the present application.

TECHNICAL FIELD

Embodiments relate to a camera actuator, and a camera module and camera device including the same.

BACKGROUND ART

A camera module performs a function of photographing a subject and storing it as an image or a moving image, and is mounted on a mobile terminal such as a mobile phone, a laptop a drone, a vehicle, and the like.

Meanwhile, an ultra-small camera module is built into a portable device such as a smartphone, a tablet PC, and a notebook, and such a camera module may perform an autofocus (AF function adjusting automatically a distance between an image sensor and a lens to adjust a focal length of the lens.

In addition, recently, a camera module may perform a zooming function of zooming up or zooming out photographing a subject by increasing or decreasing a magnification of a long-distance subject through a zoom lens.

Further, recently, a camera module adopts an image stabilization (IS technology to correct or prevent image shake caused by camera movement due to an unstable fixing device or user movement.

Such an image stabilization (IS technology includes an optical image stabilizer (OIS technology and an image stabilization technology using an image sensor.

The OIS technology is a technology that corrects movement by changing a light path, and the image stabilization technology using the image sensor is a technology that corrects movement by mechanical and electronic methods, but the OIS technology is often used.

In addition, a camera module for the vehicle is a product for transmitting a video around the vehicle or inside the vehicle to a display, and may be mainly used in a parking assistance and a driving assistance system.

Further, the camera module for the vehicle senses lanes and vehicles around the vehicle and collects and transmits related data, so that the camera module for the vehicle may warn from ECU or control the vehicle.

Meanwhile, in the camera module, a zoom actuator is used for a zooming function, friction torque is generated when a lens is moved by the mechanical movement of the actuator, and such friction torque causes technical problems such as a decrease in driving force, an increase in power consumption, or a decrease in control characteristics.

In particular, in order to achieve the best optical characteristics by using a plurality of zoom lens groups in a camera module, an alignment between a plurality of lens groups and alignment between the plurality of lens groups and an image sensor should be well matched, but when decenter in which a spherical center between the lens groups deviates from an optical axis, tilt that is a lens tilt phenomenon, and a phenomenon that a central axis of the lens group and the image sensor is not aligned occur, a change in an angle of view or occurrence of defocusing occurs, which adversely affects image quality and resolution.

Meanwhile, when increasing a separation distance in a region where friction occurs in order to reduce frictional torque resistance when the lens is moved for the zooming function in the camera module, there is a technical contradiction in which lens decenter or lens tilt is intensified when a zoom is moved or a zoom movement is reversed.

Meanwhile, in an image sensor, as a pixel is higher, a resolution increases and a size of the pixel becomes smaller, and when the size of the pixel becomes smaller, an amount of light received at the same time will be reduced. Therefore, in a darker environment, in a high-pixel camera, image shake due to camera shake that occurs while a shutter speed is slower occurs more seriously.

Accordingly, recently, an OIS function has been indispensable for photographing an image without deformation using a high-pixel camera in dark nights or moving images.

Meanwhile, OIS technology is a method to correct image quality by changing an optical path by moving a lens or an image sensor of a camera. In particular, in the OIS technology, movement of the camera is sensed through a gyro sensor, and a distance that the lens or the image sensor should move based on the movement is calculated.

For example, an OIS correction method includes a lens moving method and a module tilting method. In the lens moving method, only a lens in a camera module is moved in order to realign the center of an image sensor and an optical axis. On the other hand, the module tilting method is a method of moving the entire module including the lens and the image sensor.

Specifically, the module tilting method has an advantage that a correction range is wider than that of the lens moving method and a focal length between the lens and the image sensor is fixed, and thus image deformation may be minimized.

Meanwhile, in case of the lens moving method, a hall sensor is used to sense a position and movement of the lens. On the other hand, in the module tilting method, a photo reflector is used to sense movement of the module. However, both methods use a gyro sensor to sense movement of a user of the camera.

An OIS control unit uses data recognized by the gyro sensor to predict a position in which the lens or the module should move in order to compensate for movement of a user.

Recently, an ultra-slim and ultra-small camera module is required in accordance with technological trends, but since the ultra-small camera module has a space limitation for OIS drive, there is a problem that it is difficult to implement the OIS function applied to a general large camera, and there is a problem that the ultra-slim and ultra-small camera module cannot be implemented when the OIS drive is applied.

Meanwhile, according to a closed internal technology, an optical path is controlled using a predetermined variable lens for driving the OIS. However, in recent years, in the high-pixel camera in the camera module, a size of a variable lens for OIS drive should be large in order to increase an amount of light received for clear image quality, but when the size of the variable lens becomes large, there is a technical contradiction that encounters limitation of a thickness of a camera module and may not increase the size of the variable lens to a required level.

In addition, according to the closed internal technology, a dual prism OIS actuator technology has been developed in which two prisms each tilt in one axial direction in order to implement high magnification zoom performance. However, in order to implement such a double prism OIS, two independent actuators should be applied, and thus there is a problem that a size of the OIS actuator increases, and as the camera module assembly process becomes complicated, issues of accuracy and reliability have arisen.

In addition, in the conventional OIS technology, an OIS driver is disposed at a side surface of a solid-state lens assembly within a limited camera module size, and thus there is a problem that it is difficult to secure a sufficient amount of light because a size of a lens to be subjected to OIS is limited.

Specifically, in order to achieve the best optical characteristics in a camera module, an alignment between the lens groups at the time of OIS implementation should be well matched through movement of a lens or tilting of a module, but in the conventional OIS technology, when a decenter in which a spherical center between the lens groups deviates from an optical axis or a tilt which is a phenomenon of lens tilt occurs, there is a problem that adversely affects image quality or resolution.

In addition, the conventional OIS technology may implement AF or Zoom at the same time as OIS driving, but a magnet for OIS and a magnet for AF or Zoom are disposed close to each other due to space limitation of a camera module and a position of a driving part of the conventional OIS technology, and cause a magnetic field interference, and thus there is a problem that the OIS driving is not performed normally and a decent or a tilt phenomenon is induced.

Further, since the conventional OIS technology requires a mechanical driving device for lens movement or tilting of a module, there is a problem that a structure is complex and power consumption is increased.

Meanwhile, as described above, a camera module is applied to vehicles together with a radar, and may be used for an advanced driver assistance system (ADAS), which may greatly affect the safety and life of drivers and pedestrians as well as convenience for the driver.

For example, an advanced driver assistance system (ADAS) include an autonomous emergency braking system (AEB) that reduces speed or stops by itself even if a driver does not step on a brake in an event of a collision, a lane keep assist system (LKAS) that maintains a lane by controlling a traveling direction when leaving the lane, an advanced smart cruise control (ASCO) that maintains a distance from a vehicle ahead while running at a predetermined speed, an active blind spot detection system (ABSD) that senses the danger of blind spot collision and helps to change to a safe lane, and an around view monitor system (AVM) that visually displays a situation around a vehicle.

In such an advanced driver assistance system (ADAS), a camera module functions as a core component together with a radar and the like, and a portion in which the camera module is applied is gradually increasing.

For example, in case of an autonomous emergency braking system (AEB), a vehicle or a pedestrian in front of a vehicle is sensed by a camera sensor and a radar sensor in front of the vehicle, so that emergency braking may be automatically performed when a driver does not control the vehicle.

Alternatively, in case of a lane keep assist system (LKAS), it senses through a camera sensor whether a driver leaves a lane without operating a turn signal, and automatically steers a steering wheel, so that it may control to maintain the lane.

In addition, in case of an around view monitor system (AVM), it may display visually a situation around a vehicle through a camera sensor disposed on four sides of the vehicle.

When a camera module is applied to an advanced driver assistance system (ADAS) of a vehicle, OIS technology is more important due to vibration of the vehicle, and a precision of OIS data may be directly related to the safety or life of drivers and pedestrians. In addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

In addition, when each configuration of the camera module, for example, the magnet, etc. is detached in an environment with severe vibration such as a vehicle, it may cause major problems such as thrust, precision, and control as well as mechanical reliability.

Meanwhile, in order to detect a change in magnetic flux of a predetermined magnet mounted on a moving lens housing in the related art, the hall sensor is disposed inside the winding of the coil to detect the position of the lens housing.

However, when the hall sensor is positioned inside the coil, a distance between the hall sensor and the magnet is determined by a height of the coil.

However, in the related art, thrust is required for the movement of the moving lens housing, and in order to secure such thrust, the height of the coil is required to be higher than a predetermined height.

However, when the height of the coil is increased as described above, the magnetic flux of the magnet is blocked by the coil, and thus there is a technical contradiction that the sensitivity of the hall sensor disposed inside the coil is weakened.

According to the applicant's closed internal technology, in order to solve such problems, the optimum point of the sensitivity of the hall sensor and thrust is set by a coil having an appropriate height.

Meanwhile, the content described in the item merely provides background information regarding the present disclosure and does not constitute the related art.

Disclosure

Technical Problem

An object of an embodiment is directed to providing an ultra-small and ultra-slim camera actuator and a camera module including the same.

In addition, an object of the embodiment is directed to providing a camera actuator that may secure a sufficient amount of light by eliminating lens size limitation of an optical system lens assembly when OIS is implemented, and a camera module including the same.

In addition, an object of the embodiment is directed to providing a camera actuator and a camera module including the same that may solve a technical contradiction that a thickness of a camera module is limited when the size of the variable lens is increased although a size of a variable lens for OIS drive should be increased in order to increase an amount of light received for clear image quality.

In addition, an object of the embodiment is directed to providing a camera actuator capable of achieving the best optical characteristics and a camera module including the same by minimizing occurrence of a decenter or tilt phenomenon when the OIS is implemented.

In addition, an object of the embodiment is directed to providing a camera actuator capable of preventing a magnetic field interference with an AF or Zoom magnet when the OIS is implemented, and a camera module including the same.

In addition, an object of the embodiment is directed to providing a camera actuator capable of preventing a magnetic field interference between magnets mounted on each lens assembly when a plurality of lens assemblies are driven by an electromagnetic force between a magnet and a coil when implementing AF or Zoom, and a camera module including the same.

In addition, an object of the embodiment is directed to providing a camera actuator capable of preventing detachment of a magnet and a yoke, and a camera module including the same.

In addition, an object of the embodiment is directed to providing a camera actuator capable of implementing the OIS with low power consumption, and a camera module including the same.

In addition, an object of the embodiment is directed to providing a camera actuator capable of preventing generation of friction torque when moving a lens by zooming in a camera module, and a camera module including the same.

In addition, an object of the embodiment is directed to providing a camera actuator capable of preventing a lens decentering, a lens tilt, or occurrence of a phenomenon that a center axis of an image sensor does not coincide with a center of a lens during a lens shift through zooming in a camera module, and the camera module including the same.

In addition, an object of the embodiment is directed to providing a camera actuator capable of simultaneously increasing sensitivity of a hall sensor while increasing thrust, and a camera module including the same.

In addition, an object of the embodiment is directed to providing a camera actuator capable of reducing product size, and a camera module including the same.

The objects of the embodiments are not limited to those described in this item, but include those that may be understood from the description of the invention.

Technical Solution

A camera actuator according to an embodiment may include a housing 310, a driving part 320 disposed on the housing 310, a prism unit 330 disposed on one side of the driving part 320 and disposed on the housing 310, and a rotation unit 340 for tilting the prism unit 330 about a first axis or a second axis.

The driving part 320 may be disposed on both sides of the housing 310, and the rotation unit 340 may be disposed inside the housing 310 between the driving parts 320.

The rotation unit 340 may include a rotation housing 342, a rotation guide 344 disposed in the rotation housing 342, and a guide pin member 346 coupled to the rotation guide 344.

The rotation guide 344 may include a guide housing 344B and at least one guide shaft extending and protruding from the guide housing 344B.

The guide shaft of the rotation guide 344 may include a first guide shaft 344S1 and a second guide shaft 344S2 respectively protruding from the guide housing 344B to both sides.

The first guide shaft 344S1 and the second guide shaft 344S2 of the rotation guide 344 may be rotatably coupled to a first housing hole 342H1 and a second housing hole 342H2 of the rotation housing 342, respectively so as to tilt or rotate the prism unit 330.

The rotation guide 344 may include a guide coupling portion 334PR extending from and protruding from the guide housing 344B, and the guide coupling portion 334PR may be coupled to a third recess 334R3 of a third outer side 334S3 of a prism mover 334 of the prism unit 330.

The rotation guide 344 may include a guide through-hole 344H passing through the guide housing 344B, and a guide pin 346P of the guide pin member 346 may be inserted into the guide through-hole 344H.

A third diameter D3 of the guide through-hole 344H may be greater than a second diameter D2 of a lower hole 342BH and an upper hole 342 of the guide housing, and the second diameter D2 may be greater than a first diameter D1 of the guide pin 346P.

A guide through-hole 344H2 of the guide housing 344B may have an elongated hole having a long diameter at one side.

In the rotation guide 344B, a second-second diameter D2b of the guide through-hole 344H2 may be designed to be greater than a second-first diameter D2a.

In a guide through-hole 344H3 of the third guide housing 344C, a second-third diameter D2c of a middle region in a vertical cross section may be smaller than a second-fourth diameter D2d of an upper portion or a lower portion.

The guide through-hole 344H3 of the third guide housing 344C may include a guide intermediate through-hole 344H3S, a guide lower through-hole 344H3B, and a guide upper through-hole 344H3T.

The second-third diameter D2c of the guide intermediate through-hole 344H3S may be smaller than the second-fourth diameter D2d of the guide lower through-hole 344H3B and the guide upper through-hole 344H3T.

The prism unit 330 may include the prism mover 334 having a seating portion 334A and a prism 332 disposed on the seating portion 334A of the prism mover 334.

The prism mover 334 may include a first outer surface 334S1 and a second outer surface 334S2 extending upward from both corners of the seating portion 334A having an inclined surface.

The first outer surface 334S1 may include a first recess 334R1, and the second outer surface 334S2 may include a second recess 334R2.

The driving part 320 may include a first coil part 32301 disposed on a first side surface 312S1 of the housing, a first magnet 322M1 disposed at a position corresponding to the first coil part 32301, a second coil part 32302 disposed on a second side surface 312S2 of the housing, a second magnet 322M2 disposed at a position corresponding to the second coil part 323C2, and a position sensor HS disposed at the first coil part 32301.

The first magnet 322M1 and the second magnet 322M2 may be disposed on the prism mover 334 of the prism unit 330.

The first coil part 32301 may include a first-first coil part 32301a and a first-second coil part 32301b disposed on the first side surface 312S1 of the housing, and the first magnet 322M1 may include a first-first magnet 322M1a and a first-second magnet 322M1b at positions respectively corresponding to the first-first coil part 32301a and the first-second coil part 32301b.

In addition, the position sensor HS may include a first hall sensor HS1 and a second hall sensor HS2 respectively disposed in the first-first coil part 323C1a and the first-second coil part 323C1b.

The housing 310 may include a housing body 312B, a first housing side portion 312S1 and a second housing side portion 312S2 extending from both side surfaces of the housing body 312B, and a housing upper portion 312T connecting the first housing side portion 312S1 and the second housing side portion 312S2.

The housing upper portion 312T may include an upper hole 312, and the housing body 312B may include a body groove 312BH.

In addition, a camera actuator according to an embodiment may include a housing 310, a prism unit 330 disposed in the housing 310, a driving part 320 for tilting the prism unit 330, and a rotation unit 340 for tilting the prism unit 330 about a first axis or a second axis.

The rotation unit 340 may include a first rotation guide 342 for tilting the prism unit 330 about the first axis, a second rotation guide 344 for tilting the prism unit 330 about the second axis, and a pin 346 passing through the first rotation guide and the second rotation guide.

The first rotation guide 342 may include a first opening 342H1, a second opening 342H2 facing the first opening 342H1, a third opening 342H3, and a fourth opening 342H4 facing the third opening 342H3.

The second rotation guide 344 may include a first protrusion 344S1, a second protrusion 344S2 protruding in a direction opposite to the first protrusion, and a third protrusion 344PS disposed between the first protrusion and the second protrusion to be coupled to the prism unit.

The first protrusion 344S1 may rotate inside the first rotation guide 342 in correspondence with the first opening 344H1, and the second protrusion 344S2 may rotate inside the first rotation guide 342 in correspondence with the second opening 342H2.

In addition, when the second rotation guide 344 tilts the prism unit 330 to the second axis, the pin 346P may limit a maximum angle of tilting of the prism unit 330.

In addition, a camera actuator according to an embodiment may include a housing 310, a prism mover 334 disposed in the housing 310 so as to be tiltable, a prism 332 disposed in the prism mover, a first driving part 1400, a second driving part 1600 disposed in the housing 310 and facing the first driving part 1400, and a guide part 1800 for guiding the tilting of the prism mover, wherein the guide part 1800 may include a body 1810 and a guide member, the body 1810 may include a first side surface, a second side surface, an upper surface and a lower surface, and the guide member may include first to fourth guide members 1820, 1830, 1840, and 1850, wherein the first guide member 1820 may be disposed on the first side surface, the second guide member 1830 may be disposed on the second side surface, the third guide member 1840 may be disposed on the upper surface, and the fourth guide member 1850 may be disposed on the lower surface.

A virtual straight line connecting the first guide member 1820 and the second guide member 1830 may be perpendicular to a virtual straight line connecting the third guide member 1840 and the fourth guide member 1850.

The first guide member 1820 and the second guide member 1830 may be in contact with the prism mover 334, and the third guide member 1840 and the fourth guide member 1850 may be in contact with the housing 310.

The first guide member 1820 and the second guide member 1830 may be in contact with the housing 310, and the third guide member 1840 and the fourth guide member 1850 may be in contact with the prism mover 334.

The body 1810 of the guide part may include first and second openings 1811 and 1812 in which the first and second guide members 1810 and 1820 are disposed and third and fourth openings 1813 and 1814 in which the third and fourth guide members 1830 and 1840 are disposed.

The body 1810 of the guide part may include a fifth opening 1815 connected to the first opening 1811 in a vertical direction, a sixth opening 1816 connected to the second opening 1812 in the vertical direction, and a seventh opening 1817 connected to the third and fourth openings 1813 and 1814 in the vertical direction.

The guide part may include a first pin 1860 disposed in the fifth opening 1815, a second pin 1870 disposed in the sixth opening 1816, and a third pin 1880 disposed in the seventh opening 1817.

The first pin 1860 is seated in the fifth opening 1815 to press the first guide member 1820 outward, so that a part of the first guide member 1820 may be exposed to the outside of the first opening 1811, the second pin 1870 is seated in the sixth opening 1816 to press the second guide member 1830 outward, so that a part of the second guide member 1830 may be exposed to the outside of the second opening 1812.

The third pin 1880 is seated in the seventh opening 1817 to press the third and fourth guide members 1830 and 1840 outward, so that a part of the third guide member 1840 may be exposed to the outside of the third opening 1813 and a part of the fourth guide member 1850 may be exposed to the outside of the fourth opening 1814.

The prism mover 334 may include an eighth opening in which a part of the first guide member 1810 exposed to the outside of the first opening 1811 is seated and a ninth opening in which a part of the second guide member 1830 exposed to the outside of the second opening 1812 is seated.

The housing 310 may include a tenth opening in which a part of the third guide member 1840 exposed to the outside of the third opening 1813 is seated and an eleventh opening in which a part of the fourth guide member 1850 exposed to the outside of the fourth opening 1814 is seated.

Each of the first to third fins 1860, 1870, and 1880 may have an end width smaller than that of a central width.

The fifth opening 1815 has a radius greater than that of the first pin 1860, the sixth opening 1816 has a radius greater than that of the second pin 1870, the seventh opening 1817 has a radius greater than that of the third pin 1880, and an adhesive may be disposed in spaces between the fifth opening 1815 and the first pin 1860, between the sixth opening 1816 and the second pins 1870, and between the seventh opening 1817 and the third pin 1880.

The prism mover 334 may include a first support part 1210 and a second support part 1220 spaced apart from the first support part 1210 in a first direction, and the first guide member 1820 may be in contact with the first support part 1210 and the second guide member 1830 may be in contact with the second support part 1220.

The housing 310 may include a third support part 1110 and a fourth support part 1120 spaced apart from the third support part 1110 in a second direction perpendicular to the first direction, and the third guide member 1840 may be in contact with the third support part 1110 and the fourth guide member 1850 may be in contact with the fourth support part 1120.

The body 1810 may be disposed in a space between the first to fourth support parts 1210, 1220, 1110, and 1120.

A length in the first direction of the body 1810 may be longer than a length in the second direction thereof.

The housing 310 may include a first sidewall, a second sidewall facing the first sidewall, and a third sidewall connecting the first sidewall and the second sidewall, and the third support part 1110 and the fourth support part 1120 may be formed to protrude from an inner surface of the third sidewall, and the third support part 1110 and the fourth support part 1120 may be formed to extend in the first direction.

The first support part 1210 and the second support part 1220 may be formed to protrude from a surface facing the third sidewall of the housing 310 of the prism mover 334.

The second driving part 1600 may include a first coil 1610 disposed on the first sidewall of the housing 310, a second coil 1620 disposed on the second sidewall, and a third coil 1630 disposed on a lower surface of the housing 310.

The first driving part 1400 may include a first magnet 1410 disposed on a surface facing the first sidewall of the housing 310 of the prism mover 334, a second magnet 1420 disposed on a surface facing the second sidewall, and a third magnet 1430 disposed on a surface facing the lower surface.

The camera actuator may include a circuit board 350 disposed on the housing 310 and electrically connected to the second driving part 1400 and a position sensor HS disposed on the circuit board 350 and facing the first driving part 1400.

The second driving part 1600 may include a coil having a space formed therein, and the position sensor may be disposed in the space of the second driving part 1600.

In addition, a camera actuator according to an embodiment may include a housing 310, a prism mover 334 disposed in the housing 310 so as to be tiltable, a prism 332 disposed in the prism mover 334, a first driving part 1400 disposed in the prism mover 334, a second driving part 1600 disposed in the housing 310 and facing the first driving part 1400, and a guide part for tilting of the prism mover 334, wherein the guide part may include a body 1810 and a guide member, the prism mover 334 may include a first support part 1210 and a second support part 1220, the housing 310 may include a third support part 1110 and a fourth support part 1120, the guide member may include first to fourth guide members 1820, 1830, 1840, and 1850, wherein the first guide member 1820 may be supported by the first support part 1210, the second guide member 1830 may be supported by the second support part 1220, and the third guide member 1840 may be supported by the third support part 1110, the fourth guide member 1850 may be supported by the fourth support part 1120, and the body 1810 of the guide part may overlap the prism mover 334 connecting the first guide member 1820 and the second guide member 1830 in a virtual linear direction.

A camera module of an embodiment may include a lens assembly, an image sensor unit disposed on one side of the lens assembly, and any one camera actuator disposed on the other side of the lens assembly.

Advantageous Effects

According to an embodiment, there is a technical effect that it is possible to provide an ultra-slim and ultra-small camera actuator and a camera module including the same.

For example, according to the embodiment, there is a technical effect that it is possible to provide an ultra-slim and ultra-small camera actuator by eliminating lens size limitation of an optical system lens assembly by including a driving part 320 and a rotation unit 340 disposed in a housing 310 to implement OIS, and a camera module including the same.

In addition, according to the embodiment, there is a technical effect that it is possible to provide a camera actuator capable of securing a sufficient amount of light by eliminating the lens size limitation of the optical system lens assembly when the OIS is implemented, and a camera module including the same.

For example, according to the embodiment, there is a technical effect that it is possible to provide a camera actuator capable of securing a sufficient amount of light by eliminating the lens size limitation of the optical system lens assembly when the OIS is implemented by implementing the OIS through rotating in first axis and second axis directions of a prism unit 230 itself, and a camera module including the same.

In addition, according to the embodiment, there is a technical effect that it is possible to minimize an occurrence of a decent or tilt phenomenon to achieve the best optical characteristics when the OIS is implemented by rotatably controlling the prism unit 330 about the first axis or the second axis by electromagnetic force between a magnet disposed on a prism mover 334 and a coil part disposed on the housing.

In addition, according to the embodiment, there is a technical effect that it is possible to provide a camera actuator capable of achieving the best optical characteristics by minimizing the occurrence of the decent or tilt phenomenon when the OIS is implemented, and a camera module including the same.

For example, according to the embodiment, there is a technical effect that it is possible to minimize the occurrence of the decent or tilt phenomenon to achieve the best optical characteristics when the OIS is implemented by including the driving part 320 stably disposed on the housing 310 and rotatably controlling the prism unit 330 about the first axis or the second axis.

In addition, according to the embodiment, there is a technical effect that it is possible to provide a camera actuator capable of implementing OIS with low power consumption, and a camera module including the same.

For example, according to the embodiment, unlike the conventional method of moving a plurality of solid lenses, the OIS is implemented by including the driving part 320 and the rotation unit 340 and rotatably controlling the prism unit 330 about the first axis or the second axis, so that there is a technical effect that it is possible to provide a camera actuator capable of implementing the OIS with low power consumption, and a camera module including the same.

According to a camera actuator and a camera module including the same according to the embodiment, there is a technical effect that it is possible to solve a problem of generation of friction torque during zooming.

For example, according to the embodiment, a lens assembly is driven in a state in which a first guide part and a second guide part, which are precisely numerically controlled in a base, are coupled to each other, so that friction resistance is reduced by reducing friction torque, and thus there are technical effects such as improvement of driving force, reduction of power consumption, and improvement of control characteristics during zooming.

In the related art, when guide rails are disposed in the base itself, a gradient is generated along an injection direction, and thus there is difficulty in dimensional control, and there was a technical problem that friction torque increases and driving force decreases when injection is not performed normally.

On the other hand, according to the embodiment, the first guide part and the second guide part which are formed separately from the base are applied separately without disposing the guide rails on the base itself, and thus there is a special technical effect that generation of a gradient along the injection direction may be prevented.

In addition, in a camera actuator and a camera module including the same according to the embodiment, there is a technical effect that it is possible to simultaneously increase sensitivity of a hall sensor while increasing thrust.

In addition, according to the embodiment, there is a technical effect that it is possible to provide a camera actuator capable of preventing a magnetic field interference with an AF or Zoom magnet when the OIS is implemented, and a camera module including the same.

In addition, according to the embodiment, there is a technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

In addition, in the embodiment, there is a technical effect that it is possible to provide a camera actuator capable of preventing detachment of a magnet and a yoke, and a camera module including the same.

In addition, in the embodiment, there is a technical effect that it is possible to provide a camera actuator capable of reducing a size of a product, and a camera module including the same.

The technical effects of the embodiments are not limited to those described in this item, but include those that can be understood from the entire description of the invention.

DESCRIPTION OF DRAWINGS

FIG. 1 is a perspective view of a camera module according to an embodiment.

FIG. 2 is a perspective view of a second camera actuator in the camera module according to the embodiment shown in FIG. 1.

FIG. 3A is a perspective view in which a second case is omitted in the second camera actuator shown in FIG. 2.

FIG. 3B is an exploded perspective view of the second camera actuator shown in FIG. 3A.

FIG. 4A is a perspective view of a prism unit in the second camera actuator shown in FIG. 3B.

FIG. 4B is an exploded perspective view in a first direction of the prism unit shown in FIG. 4A.

FIG. 4C is a perspective view in a second direction of a prism mover in the prism unit shown in FIG. 4B.

FIG. 5A is a perspective view in which the prism unit and a second circuit board are omitted in the second camera actuator shown in FIG. 3B.

FIG. 5B is an exploded perspective view of the second camera actuator shown in FIG. 5A.

FIG. 6A is an exploded perspective view of a prism driving part in the second camera actuator shown in FIG. 5B.

FIG. 6B is a perspective view of a second base in the second camera actuator shown in FIG. 5B.

FIG. 7A is a perspective view of a prism rotation unit in the second camera actuator shown in FIG. 5B.

FIG. 7B is a perspective view of a rotation housing in the prism rotation unit shown in FIG. 7A.

FIG. 7C is a perspective view of a rotation guide and a guide pin member in the prism rotation unit shown in FIG. 7A.

FIG. 7D is an exploded perspective view of the rotation guide and the guide pin member shown in FIG. 7C.

FIG. 8A is a perspective view of the prism rotation unit shown in FIG. 7A.

FIG. 8B is a first cross-sectional view of the prism rotation unit shown in FIG. 8A.

FIG. 8C is a second cross-sectional view of the prism rotation unit shown in FIG. 8A.

FIG. 8D is a cross-sectional view of the rotation guide of the prism rotation unit shown in FIG. 8A according to a first additional embodiment.

FIG. 8E is a cross-sectional view of the rotation guide of the prism rotation unit shown in FIG. 8A according to a second additional embodiment.

FIG. 9A is a perspective view of the second camera actuator shown in FIG. 1B.

FIG. 9B is a first cross-sectional view of the second camera actuator shown in FIG. 9A.

FIG. 9C is an exemplary view of rotation of the second camera actuator shown in FIG. 9B.

FIG. 10A is a perspective view of the second camera actuator shown in FIG. 1B.

FIG. 10B is a second cross-sectional view of the second camera actuator shown in FIG. 10A.

FIG. 10O is an exemplary view of rotation of the second camera actuator shown in FIG. 10B.

FIG. 11 is another perspective view of the second camera actuator in the camera module according to the embodiment shown in FIG. 1.

FIG. 12 is an exploded perspective view of the second camera actuator of FIG. 11.

FIG. 13 is a plan view of the second camera actuator of FIG. 11.

FIG. 14 is a front view of the second camera actuator of FIG. 11.

FIG. 15 is a cross-sectional view taken along line B1-B1' of FIG. 13.

FIG. 16 is a cross-sectional view taken along line B2-B2' of FIG. 14.

FIG. 17 is a perspective view of a guide part of the second camera actuator of FIG. 11.

FIG. 18 is an exploded perspective view of the guide part of the second camera actuator of FIG. 11.

FIG. 19 is a schematic diagram of the guide part of the second camera actuator of FIG. 11.

FIGS. 20 to 23 are views showing a state in which a pin is inserted into a main body of the guide part of the second camera actuator of FIG. 11.

FIG. 24 is a perspective view of a first camera actuator according to an embodiment.

FIG. 25 is a perspective view in which some components are omitted in the first camera actuator according to the embodiment shown in FIG. 24.

FIG. 26 is an exploded perspective view in which some configurations are omitted in the first camera actuator according to the embodiment shown in FIG. 24.

FIG. 27 is a perspective view of a first guide part and a second guide part in the first camera actuator according to the embodiment shown in FIG. 26.

FIG. 28A is a perspective view of a first lens assembly in the first camera actuator according to the embodiment shown in FIG. 26.

FIG. 28B is a perspective view in which some configurations are removed in the first lens assembly shown in FIG. 28A.

FIG. 29 is a driving example view of the first camera actuator according to the embodiment.

FIG. 30 is a cross-sectional view taken along line C1-C2 in the first camera actuator according to the embodiment shown in FIG. 24.

FIG. 31A is an enlarged view of region S shown in FIG. 30.

FIG. 31B is a detailed view of the region S shown in FIG. 30.

FIG. 31C shows magnetic flux data according to a separation distance between a magnet and a position detection sensor in Example and Comparative Example.

FIG. 32A is a perspective view of a first driving part 116 in the first camera actuator according to the embodiment.

FIG. 32B shows data of a magnetic flux density distribution in Comparative Example.

FIG. 32C shows data of a magnetic flux density distribution in Example.

FIG. 33 is an illustrative view of an integrated body of a camera module according to another embodiment.

FIG. 34 is a perspective view of a mobile terminal to which a camera module according to an embodiment is applied.

FIG. 35 is a perspective view of a vehicle to which the camera module according to an embodiment is applied.

MODES OF THE INVENTION

Hereinafter, embodiments will be described in detail with reference to the accompanying drawings. While the invention may be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

Although the terms "first," "second," etc. May be used to describe various elements, these elements should not be limited by these terms. These terms are only used to distinguish one element from another. In addition, terms defined specially in consideration of a configuration and operation of the embodiment are only for describing the embodiment, and do not limit the scope of the embodiment.

In describing the embodiments, when elements are described with terms "above (up) or below (down)", "front (head) or back (rear)", the terms "above (up) or below (down)", "front (head) or back (rear)" may include both meanings that two elements are in direct contact with each other, or one or more other components are disposed between the two elements to form. Further, when expressed as "on (over)" or "under (below)", it may include not only the upper direction but also the lower direction based on one element.

In addition, relational terms such as "on/above" and "under/below" used below do not necessarily require or imply any physical or logical relationship or order between such entities or elements, and may be used to distinguish any entity or element from another entity or element.

EMBODIMENT

FIG. 1 is a perspective view of a camera module 1000A according to an embodiment.

Referring to FIG. 1, the camera module 1000A according to the embodiment may include a single or a plurality of camera modules. For example, the camera module 1000A of the embodiment may include a first camera actuator 100 and a second camera actuator 300.

The embodiment may include a case 100C for protecting the first camera actuator 100 and the second camera actuator 300. For example, the case 100C may include a first case 100C1 for protecting the first camera actuator 100 and a second case 100C2 for protecting the second camera actuator 300. The first case 100C1 and the second case 100C2 may be integrally formed or may be formed in separate form.

The first camera actuator 100 may be electrically connected to a first circuit board 410, and the second camera actuator 300 may be electrically connected to a second circuit board 350 (see FIG. 2) to be described later. The first circuit board 410 and the second circuit board may also be electrically connected to each other.

The first camera actuator 100 may support one or a plurality of lenses, and may perform an auto focusing function or a zoom function by moving the lenses up and down in response to a control signal from a predetermined control unit. In addition, the second camera actuator 300 may be an optical image stabilizer (OIS) actuator, but the embodiment is not limited thereto.

Hereinafter, the OIS actuator, which is the second camera actuator 300, will be mainly described, and thereafter, the first camera actuator 100 will be described.

<Second Camera Actuator 300>

FIG. 2 is a perspective view of the second camera actuator 300 in the camera module 1000A according to the embodiment shown in FIG. 1, FIG. 3A is a perspective view in which the second case 100C2 is omitted in the second camera actuator 300 shown in FIG. 2, and FIG. 3B is an exploded perspective view of the second camera actuator 300 shown in FIG. 3A.

Referring to FIG. 2, in the second camera actuator 300 of the embodiment, a housing 310, a prism unit 330, and a second circuit board 350 may be disposed in the second case 100C2.

Next, referring to FIGS. 3A and 3B, the second camera actuator 300 according to the embodiment may include a housing 310, a driving part 320 disposed in the housing 310, the prism unit 330, a rotation unit 340, and a second circuit board 350 electrically connected to the driving part 320. The second circuit board 350 may include a circuit board having a wiring pattern that may be electrically connected, such as a rigid printed circuit board (Rigid PCB), a flexible printed circuit board (Flexible PCB), and a rigid flexible printed circuit board (Rigid Flexible PCB).

According to the embodiment, there is a technical effect that it is possible to provide an ultra-slim and ultra-small camera actuator and a camera module including the same by eliminating lens size limitation of an optical system lens assembly by including a driving part 320 and a rotation unit 340 disposed in a housing 310 to implement OIS. The driving part 320 may be referred to as a prism driving part, but the embodiment is not limited thereto.

In addition, according to an embodiment, there is a technical effect that it is possible to minimize the occurrence of the decent or tilt phenomenon to achieve the best optical characteristics when the OIS is implemented by including the driving part 320 and the rotation unit 340 stably disposed on the housing 310 and rotatably controlling the prism unit 330 about the first axis or the second axis.

In addition, according to an embodiment, unlike the conventional method of moving a plurality of solid lenses, the OIS is implemented by including the driving part 320 and the rotation unit 340 and rotatably controlling the prism unit 330 about the first axis or the second axis, so that there is a technical effect that it is possible to implement the OIS with low power consumption.

The second camera actuator 300 of the embodiment will be described in detail with reference to the following drawings.

FIG. 4A is a perspective view of the prism unit 330 in the second camera actuator 300 shown in FIG. 3B, FIG. 4B is an exploded perspective view in a first direction, for example, a front direction of the prism unit 330 shown in FIG. 4A, and FIG. 4C is a perspective view in a second direction, for example, in a rear direction of a prism mover 334 shown in FIG. 4B.

Referring to FIG. 4B, in the second camera actuator of the embodiment, the prism unit 330 may include a prism mover 334 having a seating portion 334A and a prism 332 disposed on the seating portion 334A of the prism mover 334. The prism 332 may be a right-angled prism as a reflector, but the embodiment is not limited thereto.

The prism mover 334 may include a plurality of outer surfaces. For example, the prism mover 334 may include a first outer surface 334S1 and a second outer surface 334S2 extending upward from both corners of the seating portion 334A having an inclined surface.

Referring to FIGS. 4B and 4C, a first recess 334R1 may be provided in the first outer surface 334S1 of the prism mover 334, and a second recess 334R2 may be provided on the second outer surface 334S2.

The prism mover 334 may include a third outer surface 334S3 between the first outer surface 334S1 and the second outer surface 334S2, and a third recess 334R3 may be provided on the third outer surface 334S3.

A first magnet 322M1 and a second magnet 322M2 (see FIG. 6A) may be disposed in the first recess 334R1 and the second recess 334R2, respectively.

A rotation guide coupling part 334PS (see FIG. 7D) may be coupled to the third recess 334R3.

According to the embodiment, there is a technical effect that it is possible to minimize an occurrence of a decent or tilt phenomenon to achieve the best optical characteristics when the OIS is implemented by rotatably controlling the prism unit 330 about the first axis or the second axis by electromagnetic force between the first magnet 322M1 and the second magnet 322M2 disposed on the prism mover 334 and a first coil part 323C1 and a second coil part 323C2 (see FIG. 6A) disposed on the housing 310.

Next, FIG. 5A is a perspective view in which the prism unit 330 and the second circuit board 350 are omitted in the second camera actuator shown in FIG. 3B, and FIG. 5B is an exploded perspective view of the second camera actuator shown in FIG. 5A.

Referring to 5A and 5B, the second camera actuator 300 may include a housing 310, a driving part 320 disposed in the housing 310, and a rotation unit 340.

The driving part 320 may be disposed on both sides of the housing 310, and the rotation unit 340 may be disposed inside the housing 310 between the driving parts 320.

According to the embodiment, there is a technical effect that it is possible to provide an ultra-slim and ultra-small camera actuator and a camera module including the same by eliminating lens size limitation of an optical system lens assembly by including the driving part 320 and the rotation unit 340 disposed in a housing 310 and by implementing the OIS through rotating the prism unit 230 in first axis and second axis directions.

Next, FIG. 6A is an exploded perspective view of the driving part 320 in the second camera actuator shown in FIG. 5B.

Referring to FIG. 6A, the driving part 320 may function as an OIS driving part, and may include a first coil part 323C1, a second coil part 323C2, a first magnet 322M1, a second magnet 322M2, and a position sensor (HS). The position sensor HS may include a first hall sensor HS1 and a second hall sensor HS2.

For example, the driving part 320 may include the first coil part 32301 disposed on a first side surface 312S1 (see FIG. 6B) of the housing, the first magnet 322M1 disposed at a position corresponding to the first coil part 32301, the second coil part 32302 disposed on a second side surface 312S2 (see FIG. 6B) of the housing, the second magnet 322M2 disposed at a position corresponding to the second coil part 323C2, and the position sensor HS disposed on the first coil part 32301.

For example, the first coil part 32301 may include a first-first coil part 323C1a and a first-second coil part 323C1b disposed on the first side surface 312S1 of the housing, and the first magnet 322M1 may include a first-first magnet 322M1a and first-second magnet 322M1b at positions respectively corresponding to the first-first coil part 32301a and the first-second coil part 32301b.

In addition, the second coil part 32302 may include a second-first coil part 323C2a and a second-second coil part 323C2b disposed on the second side surface 312S2 of the housing, and the second magnet 322M2 may include a second-first magnet 322M2a and a second-second magnet 322M2b at positions respectively corresponding to the second-first coil part 323C2a and the second-second coil part 323C2b.

The first hall sensor HS1 and the second hall sensor HS2 may be disposed in the first-first coil part 32301a and the first-second coil part 323C1b, respectively.

The driving part 320 may include a back yoke 324Y. For example, the driving part 320 may include a first back yoke 324Y1 disposed at a rear surface of the first magnet 322M1 and a second back yoke 324Y2 disposed at a rear surface of the second magnet 322M2.

The first magnet 322M1 and the second magnet 322M2 may be disposed in the prism mover 334 of the prism unit 330. For example, the first magnet 322M1 and the second magnet 322M2 may be disposed in the first recess 334R1 and the second recess 334R2 respectively positioned on the first outer surface 334S1 and the second outer surface 334S2 of the prism mover 334.

According to the embodiment, there is a technical effect that it is possible to minimize an occurrence of a decent or tilt phenomenon to achieve the best optical characteristics when the OIS is implemented by rotatably controlling the prism unit 330 about the first axis or the second axis by electromagnetic force between the first magnet 322M1 and the second magnet 322M2 and the first coil part 323C1 and the second coil part 323C2.

In addition, according to the embodiment, there is a technical effect that it is possible to provide an ultra-slim and ultra-small camera actuator and a camera module including the same by eliminating lens size limitation of an optical system lens assembly by including the driving part 320 and the rotation unit 340 disposed in the housing 310 to implement the OIS.

Next, referring to FIG. 6B, the housing 310 may include a housing body 312B, a single or a plurality of housing side portions 312S1 and 312S2, and a housing upper portion 312T.

For example, the housing 310 may include a first housing side portion 312S1 and a second housing side portion 312S2.

The first housing side portion 312S1 may include a first side hole 314H1 to be dispose the first coil part 323O1, and the second housing side portion 312S2 may include a second side hole 314H2 to be dispose the second coil part 323O2.

For example, the first side hole 314H1 of the first housing side portion 312S1 may include a first-first side hole 314H1a and a first-second side hole 314H1b, and the first-first coil part 323O1a and the first-second coil part 323O1b may be disposed in the first-first side hole 314H1a and the first-second side hole 314H1b, respectively.

In addition, the second side hole 314H2 of the second housing side portion 312S2 may include a second-first side hole 314H2a and a second-second side hole 314H2b, and the second-first coil part 323C2a and the second-second coil part 323C2b may be disposed in the second-first side hole 314H2a and the second-second side hole 314H2b.

The housing 310 may include the housing upper portion 312T connecting the first housing side portion 312S1 and the second housing side portion 312S2. An upper hole 312TH may be provided in the housing upper portion 312T, and a body groove 312BH may be provided in the housing body 312B. The body groove 312BH may be formed in a body protrusion 312BP disposed on the housing body 312B.

A guide pin 346P (see FIG. 7D) of the rotation unit 340 to be described later may be coupled to the upper hole 312TH and the body groove 312BH.

According to the embodiment, there is a technical effect that it is possible to provide an ultra-slim and ultra-small camera actuator and a camera module including the same by eliminating lens size limitation of an optical system lens assembly by including the driving part 320 and the rotation unit 340 disposed in a housing 310 and by implementing the OIS through rotating the prism unit 230 in first axis and second axis directions.

Next, FIG. 7A is a perspective view of the rotation unit 340 in the second camera actuator shown in FIG. 5B, FIG. 7B is a perspective view of a rotation housing 342 in the rotation unit 340 shown in FIG. 7A, and FIG. 7C is a perspective view of a rotation guide 344 and a guide pin member 346 in the rotation unit 340 shown in FIG. 7A, and FIG. 7D is an exploded perspective view of the rotation guide 344 and the guide pin member 346 shown in FIG. 7C. The rotation unit 340 may be referred to as a prism rotation unit, but the embodiment is not limited thereto.

Referring to FIG. 7A, in the second camera actuator, the rotation unit 340 may include the rotation housing 342, the rotation guide 344, and the guide pin member 346.

According to the embodiment, there is a technical effect that it is possible to provide an ultra-slim and ultra-small camera actuator and a camera module including the same by eliminating lens size limitation of an optical system lens assembly by including the rotation unit 340 including the rotation housing 342, the rotation guide 344, and the guide pin member 346 and by implementing the OIS through rotating the prism unit 230 in first axis and second axis directions.

Referring to FIG. 7B, the rotation housing 342 of the rotation unit 340 may include a single or a plurality of through-holes, and may include a single or a plurality of housing side portions.

For example, the rotation housing 342 may include a first housing side portion 342S1 and a second housing side portion 342S2.

In addition, the rotation housing 342 may include a housing lower portion 342B disposed at a lower side of the first housing side portion 342S1 and the second housing side portion 342S2 and a housing upper portion 312T disposed at an upper side, and the rotation guide 344 to be described later may be disposed by including an accommodation space in an inner side.

The rotation housing 342 may include a first housing hole 342H1, a second housing hole 342H2, a lower hole 342BH, and an upper hole 342TH respectively disposed at the first housing side portion 342S1, the second housing side portion 342S2, the housing lower portion 342B, and the housing upper portion 342T.

Next, referring to FIGS. 7C and 7D, the guide pin member 346 may include the guide pin 346P and a guide washer 346W. The guide washer 346W may be formed of a metal material, a plastic material, or the like, and may improve mechanical reliability by allowing a rotation to be smooth while reducing frictional force.

Next, the rotation guide 344 may include a guide housing 344B and at least one guide shaft extending and protruding from the guide housing 344B. For example, the rotation guide 344 may include a first guide shaft 344S1 and a second guide shaft 344S2 respectively protruding from the guide housing 344B to both sides. The first guide shaft 344S1 and the second guide shaft 344S2 may be formed of the same material as the guide housing 344B, but the embodiment is not limited thereto.

The rotation guide 344 may be rotatably coupled to the rotation housing 342 through the first guide shaft 344S1 and the second guide shaft 344S2 so as to rotate the prism unit 330.

For example, the first guide shaft 344S1 and the second guide shaft 344S2 of the rotation guide 344 may be rotatably coupled to the first housing hole 342H1 and the second housing hole 342H2 of the rotation housing 342, respectively so as to rotate the prism units 330.

In addition, the rotation guide 344 may include the guide coupling portion 334PS extending and protruding from the guide housing 344B.

The guide coupling portion 334PS may be coupled to the third recess 334R3 of the third outer surface 334S3 of the prism mover 334 shown in FIG. 4C by an adhesive or the like.

Through this, according to the embodiment, the rotation guide 344 is firmly coupled to the prism mover 334, and the prism unit 330 is rotatably controlled about the first axis or the second axis by electromagnetic force between a magnet disposed on the prism mover 334 and a coil part disposed on the housing, so that there is a technical effect that it is possible to minimize an occurrence of a decent or tilt phenomenon to achieve the best optical characteristics when the OIS is implemented.

The rotation guide 344 may include a guide through-hole 344H passing through the guide housing 344B. The guide pin 346P may be inserted into the guide through-hole 344H.

According to the embodiment, the OIS may be implemented by rotating the prism unit 330 as the rotation guide 344 rotates with respect to the guide pin 346P as one axis, and thus there is a technical effect that it is possible to minimize an occurrence of a decent or tilt phenomenon to achieve the best optical characteristics.

Meanwhile, features of the embodiment will be described as follows from another viewpoint based on FIGS. 7A to 7D.

The camera actuator according to the embodiment may include the housing 310, the prism unit 330 disposed in the housing 310, the driving part 320 for tilting the prism unit 330, and a rotation unit 340 for tilting the prism unit 330 about the first axis or the second axis.

The rotation unit 340 may include a first rotation guide 342 for tilting the prism unit 330 about the first axis, a second rotation guide 344 for tilting the prism unit 330 about the second axis, and a pin 346 passing through the first rotation guide and the second rotation guide.

The first rotation guide 342 may include a first opening 342H1, a second opening 342H2 facing the first opening 342H1, a third opening 342H3, and a fourth opening 342H4 facing the third opening 342H3.

The second rotation guide 344 may include a first protrusion 344S1, a second protrusion 344S2 protruding in a direction opposite to the first protrusion, and a third protrusion 344PS disposed between the first protrusion and the second protrusion to be coupled to the prism unit.

The first protrusion 344S1 may rotate inside the first rotation guide 342 in correspondence with the first opening 344H1, and the second protrusion 344S2 may rotate inside the first rotation guide 342 in correspondence with the second opening 342H2.

In addition, when the second rotation guide 344 tilts the prism unit 330 to the second axis, the pin 346P may limit a maximum angle of tilting of the prism unit 330.

Next, FIG. 8A is a perspective view of the rotation unit 340 shown in FIG. 7A, FIG. 8B is a first cross-sectional view taken along line A1-A1' of the rotation unit 340 shown in FIG. 8A, and FIG. 8C is a second cross-sectional view taken along line A2-A2' of the rotation unit 340 shown in FIG. 8A.

For example, FIG. 8B is a first cross-sectional view taken along line A1-A1 of the rotation unit 340 shown in FIG. 8A in a direction perpendicular to a length direction of the guide pin 346P, and FIG. 8C is a second cross-sectional view taken along line A2-A2' of the rotation unit 340 shown in FIG. 8A in a direction horizontal to the length direction of the guide pin 346P.

Referring to FIG. 8B, in the rotation unit 340, the rotation housing 342 may include the first housing side portion 342S1 and the second housing side portion 342S2, and the rotation guide 344 may be disposed by including an accommodation space in an inner side the rotation housing 342.

The first guide shaft 344S1 and the second guide shaft 344S2 of the rotation guide 344 may be rotatably coupled to the first housing hole 342H1 and the second housing hole 342H2 of the rotation housing 342, respectively so as to rotate the prism units 330.

In addition, the guide coupling portion 334PS of the rotation guide 344 may be coupled to the third recess 334R3 of the third outer surface 334S3 of the prism mover 334 by an adhesive or the like.

Through this, according to the embodiment, the rotation guide 344 is firmly coupled to the prism mover 334, and the prism unit 330 is rotatably controlled about the first axis or the second axis by electromagnetic force between a magnet disposed on the prism mover 334 and a coil part disposed on the housing, so that there is a technical effect that it is possible to minimize an occurrence of a decent or tilt phenomenon to achieve the best optical characteristics when the OIS is implemented.

For example, referring to FIG. 8B, when the length direction of the guide pin 346P is referred to as a first axis, for example, a Y-axis, the OIS may be implemented while the rotation guide 344 rotates in a Z-axis direction which is an optical axis in an X-Z plane of which a normal line is the Y-axis.

Next, FIG. 8C is a second cross-sectional view taken along line A2-A2' of the rotation unit 340 shown in FIG. 8A in the second axis direction. For example, FIG. 8C is a second cross-sectional view taken along line A2-A2' of the rotation unit 340 shown in FIG. 8A in a direction horizontal to the length direction of the guide pin 346P.

For example, FIG. 8C is a cross-sectional view in a direction horizontal to the Y-axis when the length direction of the guide pin 346P is the first axis, for example, the Y-axis.

Referring to FIG. 8C, the OIS may be implemented while the rotation guide 344, in particular a guide coupling portion 334PR rotates along the first guide shaft 344S1 and the second guide shaft 344S2 in a Y-axis direction in the second axis perpendicular to the Y-axis, for example, the X-Y plane of which the normal line is the Z-axis.

In this case, referring to FIG. 8C, the guide pin 346P may have a first diameter D1.

The lower hole 342BH and the upper hole 342TH of the guide housing lower portion 342B and the guide housing upper portion 342T may have a second diameter D2. In addition, the guide through-hole 344H of a base 344B of the guide housing may have a third diameter D3. In this case, the third diameter D3 of the guide through-hole 344H may be greater than the second diameter D2 of the lower hole 342BH and the upper hole 342TH of the guide housing upper portion 342T. The second diameter D2 of the lower hole 342BH and the upper hole 342TH of the guide housing may be greater than the first diameter D1 of the guide pin 346P.

The lower hole 342BH and the upper hole 342TH of the guide housing upper portion 342T may function as a center of rotation of the guide pin 346P, and the guide through-hole 344H may provide a clearance with the guide pin 346P so as to allow the rotation guide 344 to rotate.

For example, as the third diameter D3 of the guide through-hole 344H is designed not only to be greater than the second diameter D2 of the lower hole 342BH and the upper hole 342TH of the guide housing upper portion 342T but also greater than the first diameter D1 of the guide pin 346P, it is possible to provide a clearance for the rotation guide 344, in particular the guide coupling portion 334PR to be rotated along the first guide shaft 344S1 and the second guide shaft 344S2 in the Y-axis direction, and the guide pin 346P may function as a stopper when rotating in the Y-axis direction.

Next, FIG. 8D is a cross-sectional view of the rotation guide 344B of the rotation unit 340 shown in FIG. 8A according to a first additional embodiment.

Referring to FIG. 8D, the second guide through-hole 344H2 of the guide housing 344B according to the first additional embodiment may have an elongated hole having a long diameter on one side.

For example, a second-second diameter D2b of the second guide through-hole 344H2 of the guide housing 344B may be longer than a second-first diameter D2a.

In the rotation guide 344B of the first additional embodiment, the second-second diameter D2b of the second guide through-hole 344H2 is designed to be greater than the second-first diameter D2a, so that the clearance with the guide pin 346P may be further secured, and accordingly, a rotation angle may be remarkably greatly controlled as the rotation guide 344 further secures a range in which the rotation guide 344 may rotate in the second axis direction.

For example, in the rotation guide 344B of the first additional embodiment, the second-second diameter D2b of the second guide through-hole 344H2 is designed to be greater than the second-first diameter D2a, so that the clearance with the guide pin 346P may be further secured, and accordingly, there is a remarkable technical effect of overcoming the conventional limit of the rotation angle in the Y-axis direction by providing the clearance in which the guide coupling portion 334PR may be rotated along the first guide shaft 344S1 and the second guide shaft 344S2 in the Y-axis direction so as to exceed the limit of the conventional level.

Next, FIG. 8E is a cross-sectional view of the rotation guide 344C of the rotation unit 340 shown in FIG. 8A according to a second additional embodiment.

Referring to FIG. 8E, in a vertical cross section of the third guide through-hole 344H3 of the third guide housing 344C, a second-third diameter D2c of a middle region may be smaller than a second-fourth diameter D2d of an upper or lower portion.

For example, the third guide through-hole 344H3 of the third guide housing 344C may include a guide intermediate through-hole 344H3S, a guide lower through-hole 344H3B, and a guide upper through-hole 344H3T. In this case, in the vertical section of the third guide through-hole 344H3 of the third guide housing 344C, the second-third diameter D2c of the guide intermediate through-hole 344H3S may be smaller than the second-fourth diameter D2d of the guide lower through-hole 344H3B and the guide upper through-hole 344H3T.

In the third rotation guide 344C of the second additional embodiment, the second-second diameter D2d of the second guide through-hole 344H3 is designed to be greater than the second-first diameter D2c, so that it is possible to remarkable prevent the possibility in which the inside of the guide housing 344B is in contact with the guide pin 346P, and accordingly, there is a special technical effect that may ensure so as to remarkably exceed the limit in the related art by providing the rotation angle in which the guide coupling portion 334PR may be rotated along the first guide shaft 344S1 and the second guide shaft 344S2 in the Y-axis direction.

FIG. 9A is a perspective view of the second camera actuator 300 shown in FIG. 1B, FIG. 9B is a first cross-sectional view of the second camera actuator 300 shown in FIG. 9A, and FIG. 9C is an exemplary view of rotation of the second camera actuator 300 shown in FIG. 9B.

For example, FIG. 9B is a first cross-sectional view taken along line A1-A1 of the rotation unit 340 shown in FIG. 9A in a direction perpendicular to the length direction of the guide pin 346P.

Referring to FIG. 9B, the rotation unit 340 may include the rotation housing 342 and the rotation guide 344 disposed inside the rotation housing 342.

According to the embodiment, the rotation guide 344 is coupled to the prism mover 334, and the prism unit 330 is rotatably controlled about the first axis or the second axis by electromagnetic force between a magnet disposed on the prism mover 334 and a coil part disposed on the housing, so that there is a technical effect that it is possible to minimize an occurrence of a decent or tilt phenomenon to achieve the best optical characteristics when the OIS is implemented.

For example, referring to FIG. 9B, when the length direction of the guide pin 346P is referred to as the Y-axis, the OIS may be implemented while the rotation guide 344 rotates in the Z-axis direction which is the optical axis in the X-Z plane of which the normal line is the Y-axis.

Specifically, referring to FIG. 9C, when the OIS may be implemented while the prism unit 330 is rotated (Z1→Z1a) at first angle Θ1 in the Z-axis direction by electromagnetic force between the first-first magnet 322M1a and the second-first magnet 322M2a disposed on the prism mover 334 coupled to the rotation guide 344 and the first-first coil part 323O1a and the second-first coil part 323C2a disposed on the housing. The first angle Θ1 may be ±1° to 1.5°, that is, 2° to 3°.

Next, FIG. 10A is a perspective view of the second camera actuator 300 shown in FIG. 1B, FIG. 10B is a second cross-sectional view of the second camera actuator 300 shown in FIG. 10A, and FIG. 10O is an exemplary view of rotation of the second camera actuator 300 shown in FIG. 10B.

For example, FIG. 10B is the second cross-sectional view taken along line A3-A3' shown in FIG. 10A in a direction horizontal to the length direction of the guide pin 346P. For example, FIG. 10B is a cross-sectional view in a direction horizontal to the Y-axis when the length direction of the guide pin 346P is referred to as the first axis, for example, the Y-axis.

Referring to FIG. 10B, the OIS may be implemented while the rotation guide 344, in particular the guide coupling portion 334PR is rotated along the first guide shaft 344S1 and the second guide shaft 344S2 in the Y-axis direction in the second axis perpendicular to the Y-axis, for example, the X-Y plane of which the Z-axis is the normal line. The guide through-hole 344H of the rotation guide 344 may provide the clearance with the guide pin 346P so as to allow the rotation guide 344 to rotate.

Specifically, referring to FIG. 10O, when the OIS may be implemented while the prism unit 330 is rotated (Y1→Y1b) at a second angle Θ2 in the Y-axis direction by electromagnetic force F2 between the first-second magnet 322M1b and the second-second magnet 322M2b disposed on the prism mover 334 coupled to the rotation guide 344 (refer to FIGS. 6A and 3B together) and the first-second coil part 323O1b and the second-second coil part 323C2b disposed on in the housing. The second angle Θ2 may be ±1° to 1.5°, that is, 2° to 3°.

For example, as the third diameter D3 of the guide through-hole 344H is designed to be greater than the first diameter D1 of the guide pin 346P, it is possible to provide a clearance for the rotation guide 344 to be rotated in the Y-axis direction, and the guide pin 346P may function as a stopper when rotating in the Y-axis direction.

Referring again to FIG. 8D, the second guide through-hole 344H2 of the guide housing 344B according to the first additional embodiment may have an elongated hole having a long diameter on one side.

In the rotation guide 344B of the first additional embodiment, the second-second diameter D2b of the second guide through-hole 344H2 is designed to be greater than the second-first diameter D2a, so that the clearance with the guide pin 346P may be further secured, and accordingly, a rotation angle may be remarkably greatly controlled as the rotation guide 344 further secures a range in which the rotation guide 344 may rotate in the second axis direction.

For example, in the rotation guide 344B of the first additional embodiment, the second-second diameter D2b of the second guide through-hole 344H2 is designed to be greater than the second-first diameter D2a, so that the clearance with the guide pin 346P may be further secured, and accordingly, there is a remarkable technical effect of overcoming the conventional limit of the rotation angle in the Y-axis direction by providing the clearance in which the guide coupling portion 334PR may be rotated along the first guide shaft 344S1 and the second guide shaft 344S2 in the Y-axis direction so as to exceed the limit of the conventional level.

In addition, referring to FIG. 8E, the third guide through-hole 344H3 of the third guide housing 344C may include the guide intermediate through-hole 344H3S, the guide lower through-hole 344H3B, and the guide upper through-hole 344H3T.

In the third rotation guide 344C of the second additional embodiment, the second-second diameter D2d of the second guide through-hole 344H3 is designed to be greater than the second-first diameter D2c, so that it is possible to remarkable prevent the possibility in which the inside of the guide housing 344B is in contact with the guide pin 346P, and accordingly, there is a special technical effect that may ensure so as to remarkably exceed the limit in the related art by providing the rotation angle in which the guide coupling portion 334PR may be rotated along the first guide shaft 344S1 and the second guide shaft 344S2 in the Y-axis direction.

According to the embodiment, there is a technical effect that it is possible to provide an ultra-slim and ultra-small camera actuator and a camera module including the same.

For example, according to the embodiment, there is a technical effect that it is possible to provide an ultra-slim and ultra-small camera actuator and a camera module including the same by eliminating lens size limitation of an optical system lens assembly by including the driving part 320 and the rotation unit 340 disposed in the housing 310 to implement the OIS.

In addition, according to the embodiment, there is a technical effect that it is possible to provide a camera actuator capable of securing a sufficient amount of light by eliminating the lens size limitation of the optical system lens assembly when the OIS is implemented, and a camera module including the same.

For example, according to the embodiment, there is a technical effect that it is possible to provide a camera actuator capable of securing a sufficient amount of light by eliminating the lens size limitation of the optical system lens assembly when the OIS is implemented by implementing the OIS through rotating in first axis and second axis directions of the prism unit 230 itself, and a camera module including the same.

In addition, according to the embodiment, there is a technical effect that it is possible to minimize an occurrence of a decent or tilt phenomenon to achieve the best optical characteristics when the OIS is implemented by rotatably controlling the prism unit 330 about the first axis or the second axis by electromagnetic force between a magnet disposed on a prism mover 334 and a coil part disposed on the housing.

In addition, according to the embodiment, there is a technical effect that it is possible to provide a camera actuator capable of achieving the best optical characteristics by minimizing the occurrence of the decent or tilt phenomenon when the OIS is implemented, and a camera module including the same.

For example, according to the embodiment, there is a technical effect that it is possible to minimize the occurrence of the decent or tilt phenomenon to achieve the best optical characteristics when the OIS is implemented by including the driving part 320 stably disposed on the housing 310 and rotatably controlling the prism unit 330 about the first axis or the second axis.

In addition, according to the embodiment, there is a technical effect that it is possible to provide a camera actuator capable of implementing OIS with low power consumption, and a camera module including the same.

For example, according to the embodiment, unlike the conventional method of moving a plurality of solid lenses, the OIS is implemented by including the driving part 320 and the rotation unit 340 and rotatably controlling the prism unit 330 about the first axis or the second axis, so that there is a technical effect that it is possible to provide a camera actuator capable of implementing the OIS with low power consumption, and a camera module including the same.

FIG. 11 is another perspective view of the second camera actuator in the camera module according to the embodiment shown in FIG. 1. FIG. 12 is an exploded perspective view of the second camera actuator of FIG. 11. FIG. 13 is a plan view of the second camera actuator of FIG. 11. FIG. 14 is a front view of the second camera actuator of FIG. 11. FIG. 15 is a cross-sectional view taken along line B1-B1' of FIG. 13. FIG. 16 is a cross-sectional view taken along line B2-B2' of FIG. 14. FIG. 17 is a perspective view of a guide part of the second camera actuator of FIG. 11. FIG. 18 is an exploded perspective view of the guide part of the second camera actuator of FIG. 11. FIG. 19 is a schematic diagram of the guide part of the second camera actuator of FIG. 11. FIGS. 20 to 23 are views showing a state in which a pin is inserted into a main body of the guide part of the second camera actuator of FIG. 11.

Referring to FIGS. 11 to 23, a second camera actuator 300B according to an embodiment of the present invention may include a housing 310, a prism mover 334, a prism 332, and a first driving part 1400, a circuit board 350, a second driving part 1600, a position sensor HS, a guide part 1800, and a second case 100C2, but it is possible to implement except for some of the configurations, and additional configurations are not excluded.

The second camera actuator 300B may include the housing 310. The housing 310 may form an exterior of the second camera actuator 300B. The housing 310 may be formed in a hexahedral shape with an upper surface and side surfaces open. The prism mover 334, the prism 332, the first driving part 1400, the circuit board 350, the second driving part 1600, the position sensor HS, and the guide part 1800 may be disposed in the housing 310.

The housing 310 may include a lower surface, a first sidewall, a second sidewall facing the first sidewall, and a third sidewall facing the first sidewall and the second sidewall. The circuit board 350 may be disposed on the lower surface of the housing 310. second-first to second-third driving parts 1610, 1620, and 1630 may be disposed on the lower surface of the housing 310, the first sidewall, and the second sidewall, respectively. In this case, each of the lower surface of the housing 310, the first sidewall, and the second sidewall may include side holes 1104 in which the second-first to second-third driving parts 1610, 1620, and 1630 are disposed.

The guide part 1800 may be disposed on the third sidewall of the housing 310. A third support part 1110 and a fourth support part 1120 may be formed on the third sidewall of the housing 310. The third support 1110 and the fourth support 1120 may be formed to extend in the first direction, respectively. In an embodiment of the present invention, the first direction may refer to the y-axis direction. The third support 1110 and the fourth support 1120 may be spaced apart from each other in the second direction perpendicular to the first direction. The guide part 1800 may be disposed between the third support part 1110 and the fourth support part 1120. In an embodiment of the present invention, the second direction may refer to an x-axis direction. A lower surface of the third support part 1110 may be in contact with a third guide member 1840, and an upper surface of the fourth support part 1120 may be in contact with a fourth guide member 1850. The third support part 1110 may support the third guide member 1840. The fourth support part 1120 may support the fourth guide member 1850.

The third support part 1110 of the housing 310 may include a tenth opening on/with which a part of the third guide member 1840 exposed to the outside of the third opening 1813 is seated or a part of the third guide member 1840 is in contact. The fourth support part 1120 of the housing 310 may include an eleventh opening on/with which a part of the fourth guide member 1850 exposed to the outside of the fourth opening 1814 is seated or a part of the fourth guide member 1850 is in contact. In this case, a radius of the tenth opening may be formed smaller than that of the third guide member 1840, and a radius of the eleventh opening may be formed smaller than that of the fourth guide member 1850. The tenth and eleventh openings may include holes, grooves and/or recesses.

The second camera actuator 300B may include the prism mover 334. The prism mover 334 may be disposed in the housing 310. The prism mover 334 may be disposed inside the housing 310. The prism mover 334 may be in contact with the guide part 1800 to be disposed to be tiltable in the housing 310. Specifically, the prism mover 334 may be in contact with the first guide member 1820 and the second guide member 1830 to be disposed to be tiltable in the housing 310. The prism mover 334 may include the seating portion 334A on which the prism 332 is disposed. The first driving part 1400 may be disposed on the prism mover 334. The prism mover 334 may include a recess 334R in which the first driving part 1400 is disposed.

The prism mover 334 may include a first support part 1210 and a second support part 1220. The first support part 1210 and the second support part 1220 may be formed to protrude toward the third side wall of the housing 310 from a surface of the prism mover 334 facing the third side wall of the housing 310. The first support 1210 and the second support 1220 may be spaced apart from each other in the first direction. The guide part 1800 may be disposed between the first support part 1210 and the second support part 1220. Specifically, the guide part 1800 may be disposed in a space formed between the first to fourth support parts 1210, 1220, 1110, and 1120. One side or an inner surface of the first support part 1210 may be in contact with the first guide member 1820, and one side or an inner surface of the second support part 1220 may be in contact with the second guide member 1830. The first support part 1210 may support the first guide member 1820. The second support part 1220 may support the second guide member 1830.

The first support part 1210 of the prism mover 334 may include an eighth opening on/with which a part of the first guide member 1820 exposed to the outside of the first opening 1811 is seated or a part of the first guide member 1820 is in contact. The second support part 1220 of the prism mover 334 may include a ninth opening on/with which a part of the second guide member 1830 exposed to the outside of the second opening 1812 is seated or a part the second guide member 1830 is in contact. In this case, a radius of the eighth opening may be formed smaller than that of the first guide member 1820, and a radius of the ninth opening may be formed smaller than that of the second guide member 1830. The eighth and ninth openings may include holes, grooves and/or recesses.

The second camera actuator 300B may include a prism 332. The prism 332 may be disposed inside the housing 310. The prism 332 may be disposed on the prism mover 334. The prism 332 may be fixed to the seating portion 334A of the prism mover 334. The prism 332 may have an upper surface and a side surface exposed to the outside. The prism 332 may reflect light propagating from the upper portion to vertically change a moving path of the light. The prism 332 is coupled to the prism mover 334 and may be tilted based on the x-axis and the y-axis according to the movement of the prism mover 334.

The second camera actuator 300B may include the first driving part 1400. The first driving part 1400 may be disposed on the prism mover 334. The first driving part 1400 may be disposed in the recess 334R of the prism mover 334. The first driving part 1400 may include a magnet. The first driving part 1400 may face the second driving part 1600. The first driving part 1400 may tilt the prism mover 334 through electromagnetic interaction with the second driving part 1600.

The first driving part 1400 of the second camera actuator 300B may include a first-first driving part 1410 disposed on a surface of the outer surface of the prism mover 334 facing the first sidewall of the housing 310 and a first-second driving part 1420 disposed on a surface of the outer surface of the prism mover 334 facing the second sidewall of the housing 310, and a first-third driving part 1430 disposed on a surface of the outer surface of the prism mover 334 facing the lower surface of the housing 310. The first-first to first-third driving parts 1410, 1420, and 1430 may face the second-first to second-third driving parts 1610, 1620, and 1630, respectively. The prism 332 and the prism mover 334 may be tilted based on the x-axis through electromagnetic interaction between the first-first and first-second driving parts 1410 and 1420 and the second-first and second-second driving parts 1610 and 1620. The prism 332 and the prism mover 334 may be tilted based on the y-axis through electromagnetic interaction between the first-third driving part 1430 and the second-third driving part 1630.

In an embodiment of the present invention, the first-first driving part 1410 may be a first magnet 1410, the first-second driving part 1420 may be a second magnet 1420, and the first-third driving part 1430 may be a third magnet 1430.

The second camera actuator 300B may include the circuit board 350. The circuit board 350 may be disposed on the housing 310. A lower surface of the circuit board 350 may be disposed on the lower surface of the housing 310. The circuit board 350 may be electrically connected to the second driving part 1600. The circuit board 350 may be electrically connected to the position sensor HS. The circuit board 350 may receive power from the outside and may supply current to the second driving part 1600 and/or the position sensor HS.

At least part of the circuit board 350 may be bent. The circuit board 350 may include the lower surface, a first surface, and a second surface facing the first surface. The first and second surfaces of the circuit board 350 may face or be in contact with the first and second sidewalls of the housing 310, respectively.

The circuit board 350 may include a printed circuit board (PCB). The circuit board 350 may include a flexible printed circuit board (FPCB).

The second camera actuator 300B may include the second driving part 1600. The second driving part 1600 may be disposed in the housing 310. The second driving part 1600 may be disposed inside the housing 310. The second driving part 1600 may be disposed in the side hole 1104 of the housing 310. The second driving part 1600 may be disposed on the circuit board 350. The second driving part 1600 may be electrically connected to the circuit board 350 to receive current from the circuit board 350. The second driving part 1600 may include a coil. The second driving part 1600 may be formed in a "☐" shape. The second driving part 1600 may form a space therein. The position sensor HS may be disposed in the space of the second driving part 1600. The second driving part 1600 may face the first driving part 1400. The second driving part 1600 may tilt the prism 332 and the prism mover 334 through electromagnetic interaction with the first driving part 1400.

The second driving part 1600 may include the second-first driving part 1610 disposed on the first sidewall of the housing 310 and/or the first surface of the circuit board 350, the second-second driving part 1620 disposed on the second sidewall of the housing 310 and/or the second surface of the circuit board 350, and the second-third driving part 1630 disposed on the lower surface of the housing 310 and/or the lower surface of the circuit board 350. The second-first to second-third driving parts 1610, 1620, and 1630 may face the first-first to first-third driving parts 1410, 1420, and 1430, respectively. The prism 332 and the prism mover 334 may be tilted based on the x-axis through electromagnetic interaction between the second-first and second-second driving parts 1610 and 1620 and the first-first and first-second driving parts 1410 and 1420. The prism 332 and the prism mover 334 may be tilted based on the y-axis through electromagnetic interaction between the second-third driving part 1630 and the first-third driving part 1430.

In an embodiment of the present invention, the second-first driving part 1610 may be a first coil 1610, the second-second driving part 1620 may be a second coil 1620, and the second-third driving part 1630 may be a third coil 1630.

In one embodiment of the present invention, it has been described as an example that the first driving part 1400 is a magnet and the second driving part 1600 is a coil, but the first driving part 1400 may be a coil, and the second driving part 1600 may be a magnet.

The second camera actuator 300B may include the position sensor HS. The position sensor HS may face the first driving part 1400. The position sensor HS may be disposed in the space formed inside the second driving part 1600. The position sensor HS may include a hall sensor. The position sensor HS may sense the movement of the first driving part 400. The position sensor HS may be disposed on the circuit board 350. The position sensor HS may be electrically connected to the circuit board 350 to receive current from the circuit board 350. Through this, feedback control is possible.

The position sensor HS may include the first hall sensor HS1 disposed in an inner space of the second-first driving part 1610 and/or the second driving part 1620 and the second hall sensor HS2 disposed in an inner space of the second-third driving part 1630. Through this, it is possible to sense the tilting of the prism mover 334 and the prism 332 in a biaxial direction.

The second camera actuator 300B may include the guide part 1800. The guide part 1800 may guide the tilting of the prism 332 and the prism mover 334 in the biaxial direction. The guide part 1800 may be in contact with the prism mover 334 and the housing 310. The guide part 1800 may be disposed between the first to fourth support parts 1210, 1220, 1110, and 1120. The guide part 1800 may include a body 1810, the first to fourth guide members 1820, 1830, 1840, and 1850, and first to third pins 1860, 1870, and 1880.

The guide part 1800 may include the body 1810. The body 1810 of the guide part 1800 may be formed in a hexahedral shape. The body 1810 may include a first side surface, a second side surface, an upper surface, a lower surface, and a front surface.

The first side surface of the body 1810 may face the first sidewall of the housing 310. The first side surface of the body 1810 may face the first support part 1210 of the prism mover 334. The first guide member 1820 may be disposed on the first side surface of the body 1810. The first side surface of the body 1810 may include the first opening 1811 in which the first guide member 1820 is disposed.

The second side surface of the body 1810 may face the second sidewall of the housing 310. The second side surface of the body 1810 may face the second support 1220 of the prism mover 334. The second guide member 1820 may be disposed on the second side surface of the body 1810. The second side surface of the body 1810 may include the second opening 1812 in which the second guide member 1830 is disposed.

The upper surface of the body 1810 may face the third support 1110 of the housing 310. The third guide member 1830 may be disposed on the upper surface of the body 1810. The upper surface of the body 1810 may include the third opening 1813 in which the third guide member 1840 is disposed.

The lower surface of the body 1810 may face the fourth support 1120 of the housing 310. The fourth guide member 1840 may be disposed on the lower surface of the body 1810. The lower surface of the body 1810 may include the fourth opening 1814 in which the fourth guide member 1850 is disposed.

The front surface of the body 1810 may connect the first side surface, the second side surface, the upper surface, and the lower surface of the body 1810. The front surface of the body 1810 may include a fifth opening 1815 connected to the first opening 1811 in a vertical direction, a sixth opening 1816 connected to the second opening 1812 in the vertical direction, and a seventh opening 1817 connected to the third and fourth openings 1813 and 1815 in the vertical direction.

In an embodiment of the present invention, the first to seventh openings 1811, 1812, 1813, 1814, 1815, 1816, and 1817 may each include a hole, a groove, and/or a recess.

The guide part 1800 may include the guide members 1820, 1830, 1840, and 1850. The guide members 1820, 1830, 1840, and 1850 may include a first guide member 1820, a second guide member 1830, a third guide member 1840, and a fourth guide member 1850. In an embodiment of the present invention, it has been described as an example that the first to fourth guide members 1820, 1830, 1840, and 1850 include first to fourth guide balls, respectively, but the embodiment is not limited thereto, and shapes of the guide members 1820, 1830, 1840, and 1850 may be variously changed.

The first guide member 1820 may be disposed on the first side surface of the body 1810. The second guide member 1830 may be disposed on the second side surface of the body 1810. The first guide member 1820 and the second guide member 1830 may be in contact with the prism mover 334. Specifically, the first guide member 1820 may be in contact with or supported by the first support part 1210 of the prism mover 334, and the second guide member 1830 may be in contact with or supported by the second support part 1220 of the prism mover 334.

The third guide member 1840 may be disposed on the upper surface of the body 1810. The fourth guide member 1850 may be disposed on the lower surface of the body 1810. The third guide member 1840 and the fourth guide member 1850 may be in contact with the housing 310. Specifically, the third guide member 1840 may be in contact with or supported by the third support 1110 of the housing 310, and the fourth guide member 1850 may be in contact with or supported by the fourth support 1120 of the housing 310.

A virtual straight line connecting the first guide member 1820 and the second guide member 1830 may be orthogonal to a virtual straight line connecting the third guide member 1840 and the fourth guide member 1850.

The guide part 1800 may include first to third pins 1860, 1870, and 1880. The first pin 1860 may be disposed in the fifth opening 1815. A width of an end of the first pin 1860 inserted into the fifth opening 1815 may be smaller than a width of a central portion thereof. For example, the end of the first pin 1860 may have a cut shape such as a curved shape, a triangular pyramid, a square pyramid, and a triangular pyramid. The first pin 1860 is seated in the fifth opening 1815 and presses the first guide member 1820 outward, so that a part of the first guide member 1820 may be exposed to the outside of the first opening 1811. In this case, a part of the first guide member 1820 exposed to the outside of the first opening 1811 may be in contact with the first support part 1210 of the prism mover 334 and/or the eighth opening.

The second pin 1870 may be disposed in the sixth opening 1816. A width of an end of the second pin 1870 inserted into the sixth opening 1816 may be smaller than a width of a central portion thereof. For example, the end of the second pin 1870 may have a cut shape such as a curved shape, a triangular pyramid, a square pyramid, and a triangular pyramid. The second pin 1870 is seated in the sixth opening 1816 and presses the second guide member 1830 outward, so that a part of the second guide member 1830 may be exposed to the outside of the second opening 1812. In this case, a part of the second guide member 1830 exposed to the outside of the second opening 1812 may be in contact with the second support part 1220 of the prism mover 334 and/or the ninth opening.

The third pin 1880 may be disposed in the seventh opening 1817. A radius of the third pin 1880 may be formed greater than that of the first and second fins 1860 and 1870. A width of an end of the third pin 1880 inserted into the seventh opening 1817 may be smaller than a width of a central portion thereof. For example, the end of the third pin 1880 may include a cut shape such as a curved shape, a triangular pyramid, a square pyramid, and a triangular pyramid. The third pin 1880 is seated in the seventh opening 1817 and presses the third and fourth guide members 1840 and 1850 outward, so that a part of the third guide member 1840 may be exposed to the outside of the third opening 1813, and a part of the fourth guide member 1850 may be exposed to the outside of the fourth opening 1814. In this case, a part of the third guide member 1840 exposed to the outside of the third opening 1813 may be in contact with the third support 1110 and/or the tenth opening of the housing 310, and a part of the fourth guide member 1850 exposed to the outside of the fourth opening 1814 may be in contact with the fourth support part 1120 of the housing 310 and/or the eleventh opening.

A radius of the fifth opening 1815 may be formed greater than that of the first pin 1860. A radius of the sixth opening 1816 may be formed greater than that of the second pin 1870. A radius of the seventh opening 1817 may be formed greater than that of the third pin 1880. An adhesive may be provided in a space between the fifth opening 1815 and the first pin 1860, a space between the sixth opening 1816 and the second pin 1870, and a space between the seventh opening 1817 and the third pin 1880, so that the first to third pins 1860, 1870, and 1880 may be fixed to the fifth to seventh openings 1815, 1816, and 1817, respectively.

The second camera actuator 300B may include the second case 100C2. The second case 100C2 may surround the housing 310. The second case 100C2 may be formed of a metal material. The second case 100C2 may prevent an electromagnetic field generated inside the second camera actuator 300B from being emitted to the outside. The second case 100C2 may prevent electromagnetic interference within the second camera actuator 300B that may be generated from the outside.

According to an embodiment of the present invention, the prism 332 may be tilted based on the x-axis and the prism 332 may be tilted based on the y-axis through a simple structure of the guide part 1800, thereby reducing a size of a product. Here, a tilting angle of the prism 332 based on the x-axis may be within 1.5 degrees, and a tilting angle of the prism 332 based on the y-axis may be within 1.5 degrees.

In one embodiment of the present invention, it has been described as an example that the first and second support parts 1210 and 1220 of the prism mover 334 are spaced apart from the first driving part 1400 and are in contact with the first and second guide members 1820 and 1830, respectively, but unlike this, the first and second support parts 1210 and 1220 of the prism mover 334 are spaced apart in the second direction and are in contact with the third and fourth guide members 1840 and 1850, respectively, and the third and the fourth support parts 1110 and 1120 of the housing 310 may be spaced apart in the first direction and may be in contact with the first and second guide members 1820 and 1830, respectively.

<First Camera Actuator 100>

Hereinafter, a first camera actuator 100 will be described.

FIG. 24 is a perspective view of a first camera actuator 100 according to an embodiment, FIG. 25 is a perspective view in which a part of configurations of the first camera actuator according to the embodiment shown in FIG. 24 is omitted, and FIG. 26 is an exploded perspective view in which a part of the configurations of the camera actuator according to the embodiment shown in FIG. 24 is omitted.

Referring to FIG. 24, the first camera actuator 100 according to the embodiment may include a base 20, a circuit board 410 disposed outside the base 20, a fourth driving part 142, and a third lens assembly 130.

FIG. 25 is a perspective view in which the base 20 and the circuit board 410 are omitted in FIG. 24, and referring to FIG. 25, the first camera actuator 100 according to the embodiment may include a first guide part 210, a second guide part 220, a first lens assembly 110, a second lens assembly 120, a third driving part 141, and a fourth driving part 142.

The third driving part 141 and the fourth driving part 142 may include a coil or a magnet. For example, when the third driving part 141 and the fourth driving part 142 include the coil, the third driving part 141 may include a first coil part 141*b* and a first yoke 141*a*, and the fourth driving part 142 may include a second coil part 142*b* and a second yoke 142*a*. Or, conversely, the third driving part 141 and the fourth driving part 142 may include the magnet.

In an x-y-z-axis direction shown in FIG. 26, a z-axis may refer to an optic axis direction or a direction parallel thereto, an xz plane represents the ground, and an x-axis may refer to a direction perpendicular to the z-axis on the ground (xz plane), and a y-axis may refer to a direction perpendicular to the ground.

Referring to FIG. 26, the first camera actuator 100 according to the embodiment may include a base 20, a first guide part 210, a second guide part 220, a first lens assembly 110, a second lens assembly 120, and a third lens assembly 130.

For example, the first camera actuator 100 according to the embodiment may include the base 20, the first guide part 210 disposed on one side of the base 20, the second guide part 220 disposed on the other side of the base 20, the first lens assembly 110 corresponding to the first guide part 210, the second lens assembly 120 corresponding to the second guide part 220, a first moving part 117 (see FIG. 28A) disposed between the first lens assembly 110 and the first guide part 210, and a second ball bearing (not shown) disposed between the second guide part 220 and the second lens assembly 120. In addition, the embodiment may include the third lens assembly 130 disposed in front of the first lens assembly 110 in the optic axis direction.

Hereinafter, specific features of a camera device according to an embodiment will be described with reference to the drawings.

<Guide Part>

Referring to FIG. 25 and FIG. 26, the embodiment may include a first guide part 210 disposed adjacent to the first side wall 21*a* of the base 20, and a second guide part 220 disposed adjacent to the second side wall 21*b* of the base 20.

The first guide part 210 may be disposed between the first lens assembly 110 and the first side wall 21*a* of the base 20. The second guide part 220 may be disposed between the second lens assembly 120 and the second side wall 21*b* of the base 20. The first side wall 21*a* and the second side wall 21*b* of the base may be disposed to face each other.

According to the embodiment, a lens assembly is driven in a state in which the first guide part 210 and the second guide part 220, which are precisely numerically controlled in the base, are coupled to each other, so that friction resistance is reduced by reducing friction torque, and thus there are technical effects such as improvement of driving force, reduction of power consumption, and improvement of control characteristics during zooming.

Accordingly, according to the embodiment, there is a complex technical effect that image quality or resolution may be improved remarkably by preventing occurrence of a phenomenon that a decenter of a lens, tilt of the lens, and a central axis of a lens group and an image sensor are not aligned while minimizing the friction torque during zooming, In the related art, when guide rails are disposed in the base itself, a gradient is generated along an injection direction, and thus there is difficulty in dimensional control, and there was a technical problem that friction torque increases and driving force decreases when injection is not performed normally.

On the other hand, according to the embodiment, the first guide part 210 and the second guide part 220 which are formed separately from the base 20 are applied separately without disposing the guide rails on the base itself, and thus there is a special technical effect that generation of a gradient along the injection direction may be prevented.

The base 20 may be injected in a Z-axis direction. In the related art, when a rail is integrally formed with the base, there is a problem that a straight line of the rail is distorted due to a gradient generated while the rail is injected in the Z-axis direction.

According to the embodiment, since the first guide part 210 and the second guide part 220 are injected separately from the base 20, it is possible to prevent generation of a gradient remarkably as compared with the related art, and thus there is a special technical effect that precise injection may be performed and generation of a gradient due to injection may be prevented.

In the embodiment, the first guide part 210 and the second guide part 220 may be injected on an X-axis, and a length injected may be shorter than the base 20. In this case, when rails 212 and 222 are disposed on the first guide part 210 and the second guide part 220, generation of a gradient during injection may be minimized, and there is a technical effect that possibility that the straight line of the rail is distorted is low.

FIG. 27 is an enlarged perspective view of a first guide part 210 and a second guide part 220 of a camera actuator according to an embodiment.

Referring to FIG. 27, in the embodiment, the first guide part 210 may include a single or a plurality of first rails 212. In addition, the second guide part 220 may include a single or a plurality of second rails 222. For example, the first rail 212 of the first guide part 210 may include a first-first rail 212*a* and a first-second rail 212*b*. The first guide part 210 may include a first support portion 213 between the first-first rail 212*a* and the first-second rail 212*b*.

According to the embodiment, two rails for each lens assembly are provided, and thus there is a technical effect that even though any one of the rails is distorted, the accuracy may be secured by the other one.

In addition, according to the embodiment, the two rails for each lens assembly are provided, and thus there is a technical effect that despite an issue of the frictional force of the ball described later at any one of the rails, the driving force may be secured as the cloud driving proceeds smoothly in the other one.

The first rail 212 may be connected from one surface of the first guide part 210 to the other surface thereof.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part 210 includes the first-first rail 212*a* and the first-second rail 212*a*, and the first-first rail 212*a* and the first-second rail 212*a* guide the first lens assembly 110, and thus there is a technical effect that accuracy of alignment may be improved.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

In addition, the first guide part 210 may include a first guide protruding portion 215 that extends in a side surface direction perpendicular to a direction in which the first rail 212 extends.

A first protrusion 214p may be included on the first guide protruding portion 215. For example, the first protrusion 214p may include a first-first protrusion 214p1 and a first-second protrusion 214p2.

In addition, referring to FIG. 27, in the embodiment, the second guide part 220 may include a single or a plurality of second rails 222. For example, the second rail 222 of the second guide part 220 may include a second-first rail 222a and a second-second rail 222b. The second guide part 220 may include a second support portion 223 between the second-first rail 222a and the second-second rail 222b. The second rail 222 may be connected from one surface of the second guide part 210 to the other surface thereof. In addition, the second guide part 220 may include a second guide protruding portion 225 that extends in a side surface direction perpendicular to a direction in which the second rail 222 extends. A second protrusion 224p including a second-first protrusion 224p1 and a second-second protrusion 224p2 may be included on the second guide protruding portion 225.

The first-first protrusion 214p1 and first-second protrusion 214p2 of the first guide part 210 and the second-first protrusion 224p1 and second-second protrusion 224p2 of the second guide part 220 may be coupled to a third housing 21 of a third lens assembly 130 described later.

According to the embodiment, the first guide part 210 includes the first-first rail 212a and the first-second rail 212b, and the first-first rail 212a and the first-second rail 212b guide the first lens assembly 110, and thus there is a technical effect that accuracy of alignment may be improved.

In addition, according to the embodiment, the second guide part 220 includes the second-first rail 222a and the second-second rail 222b, and the second-first rail 222a and the second-second rail 222b guide the second lens assembly 120, and thus there is a technical effect that alignment accuracy may be increased.

Further, two rails for each lens assembly are provided, and thus there is a technical effect that even though any one of the rails is distorted, the accuracy may be secured by the other one.

In addition, according to the embodiment, since the two rails for each lens assembly are provided, it is possible to secure widely a distance between balls described later, and accordingly, there is a technical effect that a driving force may be improved, interference of a magnetic field may be prevented, and tilt may be prevented when the lens assembly is stopped or moved.

Further, according to the embodiment, the two rails for each lens assembly are provided, and thus there is a technical effect that despite an issue of the frictional force of the ball described later at any one of the rails, the driving force may be secured as the cloud driving proceeds smoothly in the other one.

Furthermore, according to the embodiment, the first guide part 210 and the second guide part 220 which are formed separately from the base 20 are applied separately without disposing the guide rails on the base itself, and thus there is a special technical effect that generation of a gradient along the injection direction may be prevented.

In the related art, when guide rails are disposed in the base itself, a gradient is generated along an injection direction, and thus there is difficulty in dimensional control, and there was a technical problem that friction torque increases and driving force decreases when injection is not performed normally.

Next, FIG. 28A is a perspective view of a first lens assembly 110 of the camera actuator according to the embodiment shown in FIG. 26, and FIG. 28B is a perspective view in which a part of configurations of the first lens assembly 110 shown in FIG. 28A is removed.

Referring briefly to FIG. 26, the embodiment may include a first lens assembly 110 moving along the first guide part 210 and a second lens assembly 120 moving along the second guide part 220.

Referring again to FIG. 28A, the first lens assembly 110 may include a first lens barrel 112a on which a first lens 113 is disposed and a first driving part housing 112b on which a first driving part 116 is disposed. The first lens barrel 112a and the first driving part housing 112b may be a first housing, and the first housing may be in a barrel shape or a lens-barrel shape. The first driving part 116 may be a magnet driving part, but the embodiment is not limited thereto, and in some cases, a coil may be disposed therein.

In addition, the second lens assembly 120 may include a second lens barrel (not shown) on which a second lens (not shown) is disposed and a second driving part housing (not shown) on which a second driving part (not shown) is disposed. The second lens barrel (not shown) and the second driving part housing (not shown) may be a second housing, and the second housing may be in a barrel shape or a lens-barrel shape. The second driving part may be a magnet driving part, but the embodiment is not limited thereto, and in some cases, a coil may be disposed therein.

The first driving part 116 may correspond to the two first rails 212, and the second driving part may correspond to the two second rails 222.

In the embodiment, it is possible to drive using a single or a plurality of ball bearings. For example, the embodiment may include a first moving part 117 disposed between the first guide part 210 and the first lens assembly 110 and a second ball bearing (not shown) disposed between the second guide part 220 and the second lens assembly 120.

For example, in the embodiment, the first moving part 117 may include a single or a plurality of first-first ball bearings 117a disposed above the first driving part housing 112b and a single or a plurality of first-second ball bearings 117b below the first driving part housing 112b.

In the embodiment, the first-first moving part 117a of the first moving part 117 may move along a first-first rail 212a which is one of the first rails 212, and the first-second ball bearing 117b of the first ball bearings 117 may move along a first-second rail 212b which is another one of the first rails 212.

A camera actuator according to the embodiment and a camera module including the same solve a problem of lens decenter or tilt generation during zooming, and align a plurality of lens groups well to prevent a change in an angle of view or occurrence of defocusing, and thus there is a technical effect that image quality or resolution is significantly improved.

For example, according to the embodiment, the first guide part includes the first-first rail and the first-second rail, and the first-first rail and the first-second rail guide the first lens assembly 110, and thus there is a technical effect that accuracy of alignment between the second lens assembly 110 and an optic axis may be improved when the first lens assembly 110 moves.

Referring also to FIG. 28B, in an embodiment, the first lens assembly 110 may include a first assembly groove 112*b*1 on which the first moving part 117 is disposed. The second lens assembly 120 may include a second assembly groove (not shown) on which the second ball bearing is disposed.

The first assembly groove 112*b*1 of the first lens assembly 110 may be in plural. In this case, a distance between two first assembly grooves 112*b*1 of the plurality of first assembly grooves 112*b*1 with respect to an optic axis direction may be longer than a thickness of the first lens barrel 112*a*.

In the embodiment, the first assembly groove 112*b*1 of the first lens assembly 110 may be in a V-shape. Further, the second assembly groove (not shown) of the second lens assembly 120 may be in a V-shape. The first assembly groove 112*b*1 of the first lens assembly 110 may be in a U-shape in addition to the V-shape, or a shape that contacts the first moving part 117 at two or three points. In addition, the second assembly groove (not shown) of the second lens assembly 120 may be in a U-shape in addition to the V-shape, or a shape that contacts the first moving part 117 at two or three points.

Next, FIG. 29 is a driving example view of the camera actuator according to the embodiment.

An interaction in which an electromagnetic force DEM is generated between a first magnet 116 and a first coil part 141*b* in the camera module according to the embodiment will be described with reference to FIG. 29.

As shown in FIG. 29, a magnetization method of the first magnet 116 of the camera module according to the embodiment may be a vertical magnetization method. For example, in the embodiment, all of an N-pole 116N and an S-pole 116S of the first magnet 116 may be magnetized so as to face the first coil part 141*b*. Accordingly, the N-pole 116N and the S-pole 116S of the first magnet 116 may be respectively disposed so as to correspond to a region in which current flows in the y-axis direction perpendicular to the ground at the first coil part 141*b*.

Referring to FIG. 29, in the embodiment, a magnetic force DM is applied in a direction opposite to an x-axis at the N-pole 116N of the first magnet 116, and when a current DE flows in the y-axis direction in a region of the first coil part 141*b* corresponding to the N-pole 116N, the electromagnetic force DEM acts in a z-axis direction with respect to the Fleming's left-hand rule.

In addition, in the embodiment, the magnetic force DM is applied in the x-axis direction at the S-pole 116S of the first magnet 116, and when the current DE flows in a direction opposite to the y-axis perpendicular to the ground at the first coil part 141*b* corresponding to the S pole 116S, the electromagnetic force DEM acts in a z-axis direction with respect to the Fleming's left-hand rule.

At this time, since a third driving part 141 including the first coil part 141*b* is in a fixed state, the first lens assembly 110, which is a mover on which the first magnet 116 is disposed, may be moved back and forth along a rail of the first guide part 210 in a direction parallel to the z-axis direction by the electromagnetic force DEM according to a current direction. The electromagnetic force DEM may be controlled in proportion to the current DE applied to the first coil part 141*b*.

Likewise, an electromagnetic force DEM is generated between a second magnet (not shown) and the second coil part 142*b* of the camera module according to the embodiment, and thus the second lens assembly 120 may be moved along a rail of the second guide part 220 horizontally with respect to the optic axis.

As described above, when implementing AF or Zoom in the related art, a plurality of lens assemblies are driven by the electromagnetic force between a magnet and a coil, and in order to obtain the position information of the lens assembly, a hall sensor is disposed inside the winding of the coil. The inside of the winding of the coil in which the hall sensor is disposed may be hollow. The hall sensor may obtain the position information of the lens assembly by sensing a change in magnetic flux of the magnet disposed in the lens assembly. However, when the hall sensor is positioned inside the coil, a distance between the hall sensor and the magnet is determined by a height of the coil.

However, in the related art, thrust is required for the movement of the lens assembly, and in order to secure such thrust, the height of the coil is required to be higher than a predetermined height.

However, when the height of the coil is increased as described above, the distance between the hall sensor and the magnet is increased by the heightened coil. Accordingly, since the magnetic flux of the magnet is blocked, there is a technical contradiction in which the sensitivity of the magnetic flux sensed by the hall sensor disposed inside the coil is lowered. On the contrary, when the height of the coil is reduced, the electromagnetic force between the magnet and the coil is weakened, and the thrust for AF or Zoom driving is deteriorated.

According to the applicant's private internal technology, in order to solve such problems, the optimum point of the sensitivity of the hall sensor and thrust is set by a coil having an appropriate height. In addition, the deteriorated thrust or weakened sensitivity of the hall sensor causes problems in the precision of all camera controls, and a decent or tilt phenomena of the camera module is induced, and thus it may be directly related to the safety or life of a driver who is a user or pedestrian.

One of technical problems of the embodiment is to provide a camera actuator capable of improving simultaneously the sensitivity of the hall sensor while increasing the thrust, and a camera module including the same.

FIG. 30 is a cross-sectional view taken along line C1-C2 in the camera actuator according to the embodiment shown in FIG. 24.

Referring to FIG. 30, the first camera actuator 100 according to the embodiment may include a base 20 and a lens assembly disposed in the base 20. For example, a third lens assembly 130, a first lens assembly 110, and a second lens assembly 120 may be sequentially disposed in the base 20 based on a light incident direction, and an image sensor 180 may be disposed on a rear side of the second lens assembly 120.

As described above, the first camera actuator 100 according to the embodiment may be driven by an electromagnetic force of a predetermined magnet and coil part.

For example, referring to FIG. 30, in the camera actuator according to the embodiment, the first lens assembly 110 may include a first driving part 116 and a third driving part 141, and the second lens assembly 120 may include a second driving part 126 and a fourth driving part 142. The first driving part 116 and the second driving part 126 may be magnet driving parts, and the third driving part 141 and the fourth driving part 142 may be coil driving parts, but the embodiment is not limited thereto.

Hereinafter, it will be described as a case in which the first driving part 116 and the second driving part 126 are magnet driving parts, respectively, and the third driving part 141 and the fourth driving part 142 are coil driving parts, respectively.

In the camera module according to the embodiment, in the first lens assembly 110, the first driving part 116 may include a first magnet 116b and a first yoke 116a, and the third driving part 141 may include a first coil part 141b and a third yoke 141a. The third driving part 141 may include a first circuit board 41 between the first coil part 141b and the third yoke 141a.

In addition, the embodiment may include a first spacer 141c disposed in the base 20 and a first position detection sensor 71 disposed on the first spacer 141c. The first spacer 141c may be formed of any one or more of polycarbonate (PC), polyethylene terephthalate glycol (PETG), polyethylene (PE) and polypropylene (PP), but the embodiment is not limited thereto.

The first position detection sensor 71 may be a magnetic sensor. For example, the first position detection sensor 71 may be any one of a solid magnetic sensor such as a hall sensor, a coiled magnetic sensor, a resonance magnetic sensor, and the like, but the embodiment is not limited thereto.

In addition, in the camera module according to the embodiment, in the second lens assembly 120, the second driving part 126 may include a second magnet 126b and a second yoke 132A, and the fourth driving part 142 may include a second coil part 142b and a fourth yoke 142a. The fourth driving part 142 may include a second circuit board 42 between the second coil part 142b and the fourth yoke 142a.

In addition, the embodiment may include a second spacer 142c disposed in the base 20 and a second position detection sensor 72 disposed on the second spacer 142c. The second spacer 142c may be formed of any one or more of polycarbonate (PC), polyethylene terephthalate glycol (PETG), polyethylene (PE) and polypropylene (PP), but the embodiment is not limited thereto.

The second position detection sensor 72 may be any one magnetic sensor of a coiled magnetic sensor, a solid magnetic sensor such as a hall sensor, a resonance magnetic sensor, and the like, but the embodiment is not limited thereto.

Hereinafter, technical features of a disposition structure of a position sensor in the embodiment will be described with reference to FIGS. 30 and 31A to 31C.

FIG. 31A is an enlarged view of region S shown in FIG. 30, and FIG. 31B is a detailed view of region S shown in FIG. 31A.

First, referring to FIGS. 30 and 31A, the embodiment may include a base 20, a first lens assembly 110 disposed in the base 20, the third driving part 141 which is a coil driving part disposed in the base 20, a first spacer 141c disposed in the base 20, and a first position detection sensor 71 disposed on the first spacer 141c.

The third driving part 141 may include a first circuit board 41a disposed between the first coil part 141b and the third yoke 141a.

The first coil part 141b and the first position detection sensor 71 may be electrically connected to the first circuit board 41a.

Next, referring to FIG. 31B, the first spacer 141c may include a first support portion 141c1 and a first stopper 141c3 protruding from the first support portion 141c1, the first position detection sensor 71 may be disposed on the first stopper 141c3, and the first stopper 141c3 may be disposed in the hollow of the first coil part 141b which is the coil driving part.

In this case, the embodiment may include a first connecting portion 141c2 connecting the first stopper 141c3 and the first support portion 141c1.

Referring to FIG. 31B, the first circuit board 41a may include a first substrate region 41a1 disposed on the first spacer 141c and a second substrate region 41a3 disposed to be spaced apart from the first substrate region 41a1. The first circuit board 41a may include a second-second substrate region 41a2 connecting the first substrate region 41a1 and the second substrate region 41a3. The first position detection sensor 71 may be disposed on the second substrate region 41a3, and the second substrate region 41a3 may be disposed in the hollow of the first coil part 141b which is the coil driving part.

In addition, referring to FIG. 30, the embodiment may include the base 20, a second lens assembly 120 disposed in the base 20, the fourth driving part 142 which is a coil driving part disposed in the base 20, the second spacer 142c disposed in the base 20, and the second position detection sensor 72 disposed on the second spacer 142c.

In addition, the second spacer 142c may also adopt technical features of the first spacer 141c. For example, referring to FIG. 30, the second spacer 142c may include a second protruding portion (not shown) protruding from a second support portion (not shown), the second position detection sensor 72 may be disposed on the second protruding portion, and the second protruding portion may be disposed in the hollow of the fourth driving part 142 which is the coil driving part.

The second protruding portion may include a second seating portion (not shown), and the second position detection sensor 72 may be disposed on the second seating portion.

In addition, referring to FIG. 30, the second circuit board 41b may include a third substrate region (not shown) disposed on the second spacer 142c and a fourth substrate region disposed to be spaced apart from the third substrate region. The second circuit board 41b may include a fourth-second substrate region connecting the third substrate region and the fourth substrate region.

The second position detection sensor 72 may be disposed on the fourth-second substrate region, and the fourth-second substrate region may be disposed in the hollow of the fourth driving part 142 which is the coil driving part.

Again, Referring to FIG. 31B, the first lens assembly 110 may be driven in the optical axis direction by the electromagnetic force (DEM) between the first magnet 116b of the first driving part 116 and the first coil part 141b of the third driving part 141.

At this time, the electromagnetic force (DEM) is affected by a distance (DCM) between the first magnet 116b and the first coil part 141b.

The magnetic flux of the magnet sensed by the hall sensor is changed according to a separation distance between the hall sensor and the magnet, and thus the performance of position detection of the hall sensor is affected.

For example, FIG. 31C is magnetic flux data according to the separation distance between the magnet and the first position detection sensor 71 in Example and Comparative Example.

In the conventional internal technology, the height of the coil part should be ensured to secure thrust. In the related art, as the height of the coil part increases according to disposing the hall sensor on the PCB under the coil part, the separation distance between the magnet and the hall sensor increases, and thus there was a technical limitation that a first distance DH1 spaced apart between the magnet and the hall sensor should be secured at least 800 μm or more.

Accordingly, in the conventional internal technology (Comparative Example), the magnetic flux detected by the hall sensor was a level of securing about 50 mT.

In addition, in the conventional internal technology, when the height of the coil increases, the magnetic flux of the magnet, which may be introduced into the hall sensor disposed in the hollow portion of the coil, is partially blocked, so that the sensitivity of the hall sensor is lowered.

On the other hand, according to the embodiment, the first spacer 141c includes the first stopper 141c3 protruding from the first support portion 141c1, and the first position detection sensor 71 is disposed on the first stopper 141c3, and accordingly, a second distance DH2 between the first magnet 116b and the first position detection sensor 71 is significantly reduced, and thus there is a technical effect that the magnetic flux of the first magnet 116b sensed by the first position detection sensor 71 is significantly improved.

For example, according to the embodiment, as the first position detection sensor 71 is disposed on the first stopper 141c3, it is possible to secure the second distance DH2 between the first magnet 116b and the first position detection sensor 71 to 400 um or less, which is more than two times shorter than that of Comparative Example, and accordingly, there is a unique technical effect that the magnetic flux between the first magnet 116b and the first position detection sensor 71 may be secured up to about 150 mT, which is about three times higher than that of Comparative Example.

In addition, according to the embodiment, as the first position detection sensor 71 is disposed on the first stopper 141c3, the first position detection sensor 71 is almost exposed to the first magnet 116b even though it is disposed in the hollow of the first coil part 141b, and thus there is a special technical effect that blocking of magnetic flux by the first coil part 141b is significantly reduced.

Accordingly, the camera actuator according to the embodiment and the camera module including the same have a unique technical effect of simultaneously increasing the thrust and the sensitivity of the hall sensor.

Next, one of technical problems of the embodiments is, when implementing AF or Zoom, to provide a camera actuator capable of preventing a magnetic field interference between magnets mounted on each lens assembly when a plurality of lens assemblies are driven by an electromagnetic force between a magnet and a coil, and a camera module including the same.

In addition, one of the technical problems of the embodiments is to provide a camera actuator capable of preventing detachment of a magnet and a yoke, and a camera module including the same.

Hereinafter, a prevention structure of magnetic field interference of an embodiment will be described with reference to FIGS. 32A to 32C.

Next, FIG. 32A is a perspective view of a first driving part 116 of a camera module according to an embodiment.

Referring to FIG. 32A, in the embodiment, the first driving part 116 may include a first magnet 116b and a first yoke 116a, and the first yoke 116a may include a first support portion 116a1 and a first side protruding portion 116a2 extending from the first support portion 116a1 toward a side surface of the first magnet 116b.

The first side protruding portion 116a2 may be disposed on both side surfaces of the first magnet 116b.

In addition, the first yoke 116a may include a first fixed protruding portion 116a3 extending in a different direction, for example, in a direction opposite to the first side protruding portion 116a2.

The first fixed protruding portion 116a3 may be disposed at a position about a middle of the first support portion 116a1, but the embodiment is not limited thereto.

Similarly, in the embodiment, the second driving part 126 may include a second magnet 126b and a second yoke 126a, and the second yoke 126a may include a second support portion (not shown) and a second side protruding portion extending from the second support portion toward a side surface of the second magnet 126b (hereinbefore, see a structure of the second yoke 126a in FIG. 30).

The second side protruding portion may be disposed on both side surfaces of the second magnet 126b. In addition, the second yoke 126a may include a second fixed protruding portion (not shown) extending in a different direction, for example, in a direction opposite to the second side protruding portion. The second fixed protruding portion may be disposed at a position about a middle of the second support portion, but the embodiment is not limited thereto.

In the related art, in addition, when implementing AF or Zoom, a plurality of lens assemblies are driven by an electromagnetic force between a magnet and a coil, and there is a problem that a magnetic field interference occurs between magnets mounted in each lens assembly. There is a problem that AF or Zoom driving is not performed normally, and thrust is deteriorated due to such a magnetic field interference between magnets.

In addition, there is a problem that a decent or tilt phenomenon due to a magnetic field interference between magnets is induced.

When an issue in a precision in camera control occurs or thrust is deteriorated due to such a magnetic field interference, or a decent or tilt phenomenon is induced, it may be directly related to the safety or life of a driver who is a user or pedestrian.

For example, FIG. 32B shows data of a magnetic flux density distribution in Comparative Example.

Comparative Example of FIG. 32B is a non-disclosed internal technology of an applicant, and has a structure applied so as to perform a shielding function of magnetic flux by disposing a back yoke for a magnet. A shielding performance of the magnetic flux is improved by applying back yoke technology for the magnet, but there are technical problems as follows.

For example, referring to FIG. 32B, it is magnetic flux density data between respective magnets mounted in the first lens assembly and the second lens assembly, and thus there is a problem that magnetic field interference (IF) occurs between the respective magnets, and loss of thrust occurs due to leakage (LE) of the magnetic flux generated in each magnet.

In particular, in case of a high-magnification Zoom Actuator applied recently, there is a problem that not only magnetic field interference occurs between permanent magnets of the first lens assembly and the second lens assembly, which are moving lenses, but also the magnetic field interference (IF) with a magnet of the OIS actuator occurs.

Movement of each group is disturbed due to the magnetic field interference (IF), and as a result, there is a problem that an input current is also increased.

According to the embodiment, a yoke in a magnet driving part of the first lens assembly 110 or the second lens assembly 120 includes a side protruding portion extending to a side surface of the magnet, and thus there is a special technical effect that it is possible to provide a camera actuator capable of preventing a magnetic field interference between magnets mounted on each lens assembly when a plurality of lens assemblies are driven by an electromagnetic force between a magnet and a coil when AF or Zoom is implemented, and a camera module including the same.

For example, FIG. 32C shows data of a magnetic flux density distribution in Example.

Referring to FIG. 32C, it is magnetic flux density data between respective magnets mounted in the first lens assembly and the second lens assembly, and a yoke in a magnet driving part of the first lens assembly 110 and the second lens assembly 120 includes a side protruding portion extending to a side surface of the magnet, and thus the precision of camera control is improved significantly.

In addition, according to the embodiment, the yoke in the magnet driving part of the first lens assembly 110 or the second lens assembly 120 includes the side protruding portion extending to the side surface of the magnet to prevent leakage flux generated in the magnet, and the side protruding portion is disposed in a region having a high magnetic flux density so that the magnetic flux is concentrated (FC), and thus there is a technical effect that thrust is significantly improved by increasing a density between a flux line and the coil to increase the Lorentz Force.

Next, FIG. 33 is an illustrative view of an integrated body 315 of a camera module according to another embodiment.

A first camera actuator 100 may be disposed in a first body region 328A of the integrated body 315 of the camera module according to another embodiment, and a second camera actuator 300 may be disposed in a second body region 315b.

Next, FIG. 34 shows a mobile terminal 1500 to which a camera module according to an embodiment is applied.

As shown in FIG. 34, the mobile terminal 1500 according to the embodiment may include a camera module 1000, a flash module 1530, and an autofocus device 1510 provided on a back surface.

The camera module 1000 may include an image capturing function and an autofocus function. For example, the camera module 1000 may include an autofocus function using an image.

The camera module 1000 processes a still image or a moving image frame obtained by an image sensor in a photographing mode or a video call mode. The processed image frame may be displayed on a predetermined display unit, and may be stored in a memory. A camera (not shown) may be disposed on a front surface of the body of the mobile terminal.

For example, the camera module 1000 may include a first camera module 1000A and a second camera module 1000B, and OIS may be implemented together with an AF or zoom function by the first camera module 1000A.

The flash module 1530 may include a light-emitting device that emits light therein. The flash module 1530 may be operated by a camera operation of a mobile terminal or by user control.

The autofocus device 1510 may include one of packages of a surface emitting laser element as a light-emitting unit.

The autofocus device 1510 may include an autofocus function using a laser. The autofocus device 1510 may be mainly used in a condition in which an autofocus function using an image of the camera module 1000 is deteriorated, for example, in a close environment of 10 m or less or a dark environment. The autofocus device 1510 may include a light-emitting unit including a vertical cavity surface emitting laser (VCSEL) semiconductor device, and a light receiving unit that converts light energy into electric energy such as a photodiode.

Next, FIG. 35 is a perspective view of a vehicle 700 to which a camera module according to an embodiment is applied, For example, FIG. 35 is an appearance view of a vehicle having a vehicle driving assistance device to which a camera module 1000 according to the embodiment is applied.

Referring to FIG. 35, the vehicle 700 according to the embodiment may include wheels 13FL and 13FR that rotate by a power source, and a predetermined sensor. The sensor may be a camera sensor 2000, but the embodiment is not limited thereto.

The camera 2000 may be a camera sensor to which the camera module 1000 according to the embodiment is applied.

The vehicle 700 according to the embodiment may acquire image information through the camera sensor 2000 that photographs a front image or a surrounding image, and may determine an unidentified situation of a lane by using the image information and generate a virtual lane at the time of unidentification.

For example, the camera sensor 2000 may acquire the front image by photographing a front of the vehicle 700, and a processor (not shown) may acquire the image information by analyzing an object included in the front image.

For example, when an object such as a lane, a neighboring vehicle, a traveling obstacle, and a median strip, a curb, and a street tree corresponding to an indirect road marking is photographed in an image photographed by the camera sensor 2000, the processor detects such an object to include in the image information.

In this case, the processor may acquire distance information with the object detected through the camera sensor 2000 to further complement the image information. The image information may be information about an object captured in the image.

Such a camera sensor 2000 may include an image sensor and an image processing module. The camera sensor 2000 may process a still image or moving image obtained by the image sensor (e.g., CMOS or CCD). The image processing module may process the still image or moving image acquired through the image sensor to extract necessary information, and may transmit the extracted information to the processor.

At this time, the camera sensor 2000 may include a stereo camera so as to improve the measurement accuracy of the object and to secure more information such as a distance between the vehicle 700 and the object, but the embodiment is not limited thereto.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the embodiments.

The above description has been focused on the embodiment, but it is merely illustrative and does not limit the embodiment. A person skilled in the art to which the embodiment pertains may appreciate that various modifications and applications not illustrated above are possible without departing from the essential features of the embodiment. For example, each component particularly represented in the embodiment may be modified and implemented. In addition, it should be construed that differences related to such changes and applications are included in the scope of the present invention defined in the appended claims.

The invention claimed is:

1. A camera actuator comprising:
   a housing;
   a prism unit disposed in the housing;
   a driving part for tilting the prism unit; and
   a rotation unit for tilting the prism unit about a first axis and a second axis,
   wherein the rotation unit includes:
      a first rotation guide including a plurality of openings and tilting the prism unit to the first axis;
      a second rotation guide including a protrusion inserted into the opening of the first rotation guide and tilting the prism unit to the second axis; and
      a pin passing through the first rotation guide and the second rotation guide.

2. The camera actuator of claim 1 wherein the driving part is disposed on both sides of the housing, and
   wherein the rotation unit is disposed inside the housing between the driving parts.

3. The camera actuator of claim 1, wherein the first rotation guide includes a first opening, a second opening facing the first opening, a third opening, and a fourth opening facing the third opening, and
   wherein the second rotation guide includes a first protrusion, a second protrusion protruding in a direction opposite to the first protrusion, and a third protrusion disposed between the first protrusion and the second protrusion to be coupled to the prism unit.

4. The camera actuator of claim 3, wherein the first protrusion rotates inside the first rotation guide in correspondence with the first opening, and the second protrusion rotates inside the first rotation guide in correspondence with the second opening.

5. The camera actuator of claim 4, wherein when the second rotation guide tilts the prism unit about the second axis, the pin limits a maximum angle of tilting of the prism unit.

6. The camera actuator of claim 5, wherein the prism unit includes a prism mover including a recess corresponding to the third protrusion, and
   wherein the third protrusion of the second rotation guide is disposed in the recess of the prism mover.

7. The camera actuator of claim 3, wherein the second rotation guide includes a through-hole aligned with the third opening and the fourth opening, and
   wherein the pin is inserted into the third opening, the fourth opening, and the through-hole.

8. The camera actuator of claim 7, wherein a diameter of the through-hole is greater than a diameter of the third opening and the fourth opening, and
   wherein the diameter of the third and fourth openings is greater than a diameter of the pin.

9. The camera actuator of claim 7, wherein the through-hole includes an elongated hole having a long diameter in one direction.

10. The camera actuator of claim 9, wherein a diameter in a first direction connecting the first opening and the second opening is smaller than a diameter in a second direction perpendicular to the first direction in the through-hole.

11. The camera actuator of claim 10, wherein the through-hole includes a region in which a diameter is changed from an upper surface of the second rotation guide toward a lower surface of the second rotation guide.

12. The camera actuator of claim 11, wherein the through-hole includes a first region adjacent to an upper surface of the second rotation guide, a second region adjacent to a lower surface of the second rotation guide, and a third region between the first and second regions, and
    wherein a diameter of the third region is smaller than a diameter of each of the first and second regions.

13. The camera actuator of claim 1, wherein the prism unit includes:
    a prism mover having a seating portion; and
    a prism disposed on the seating portion of the prism mover.

14. The camera actuator of claim 13, wherein the prism mover includes a first outer surface and a second outer surface extending upward from both corners of the seating portion having an inclined surface,
    wherein the first outer surface includes a first recess, and
    wherein the second outer surface includes a second recess.

15. The camera actuator of claim 14, wherein the driving part includes:
    a first coil part disposed on a first side surface of the housing;
    a first magnet disposed at a position corresponding to the first coil part;
    a second coil part disposed on a second side surface of the housing;
    a second magnet disposed at a position corresponding to the second coil part, and
    a position sensor disposed at the first coil part.

16. The camera actuator of claim 15, wherein the first magnet and the second magnet are disposed on the prism mover of the prism unit.

17. The camera actuator of claim 15, wherein the first coil part includes a first-first coil part and a first-second coil part disposed on the first side surface of the housing,
    wherein the first magnet includes a first-first magnet and a first-second magnet at positions respectively corresponding to the first-first coil part and the first-second coil part, and
    wherein the position sensor includes a first hall sensor and a second hall sensor respectively disposed in the first-first coil part and the first-second coil part.

18. The camera actuator of claim 1, wherein the housing includes an insert portion into which the pin is inserted.

19. A camera device comprising:
    an optical sensor; and
    first and second camera actuators that change a path of light incident from the outside to provide the light to the optical sensor,
    wherein the first camera actuator includes:
       a housing;
       a prism unit disposed in the housing;
       a driving part for tilting the prism unit; and
       a rotation unit for tilting the prism unit about a first axis or a second axis,
    wherein the rotation unit includes:
       a first rotation guide including a plurality of openings and tilting the prism unit about the first axis;
       a second rotation guide including a protrusion inserted into the opening of the first rotation guide and tilting the prism unit about the second axis; and
       a pin passing through the first rotation guide and the second rotation guide.

20. The camera device of claim 19, wherein the first camera actuator changes the path of light incident from the outside to provide the light to the second camera actuator,
    wherein the light passing through the second camera actuator is provided to the optical sensor, and
    wherein the second camera actuator includes:

a base;
a rail guide part coupled to the base;
a first lens assembly coupled to and fixed to the base; and
second and third lens assemblies disposed in the base and moving along the rail guide part.

* * * * *